(12) United States Patent
Wical

(10) Patent No.: US 6,487,545 B1
(45) Date of Patent: *Nov. 26, 2002

(54) METHODS AND APPARATUS FOR CLASSIFYING TERMINOLOGY UTILIZING A KNOWLEDGE CATALOG

(75) Inventor: Kelly Wical, Redwood Shores, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/322,277

(22) Filed: May 28, 1999

Related U.S. Application Data

(63) Continuation of application No. 08/455,710, filed on May 31, 1995, now Pat. No. 6,061,675.

(51) Int. Cl.[7] .............................................. G06F 17/00
(52) U.S. Cl. ....................................................... 706/45
(58) Field of Search .............................. 706/45, 46, 60, 706/50, 118; 704/10

(56) References Cited

U.S. PATENT DOCUMENTS

| | | | | |
|---|---|---|---|---|
| 5,056,021 A | * | 10/1991 | Ausborn | 704/9 |
| 5,371,807 A | * | 12/1994 | Register et al. | 382/159 |
| 5,404,506 A | * | 4/1995 | Fujisawa et al. | 706/55 |
| 5,434,777 A | * | 7/1995 | Luciw | 706/45 |
| 5,497,319 A | * | 3/1996 | Chong et al. | 704/2 |
| 5,594,837 A | * | 1/1997 | Noyes | 706/55 |
| 5,608,624 A | * | 3/1997 | Luciw | 706/53 |
| 5,625,814 A | * | 4/1997 | Luciw | 707/5 |
| 5,630,025 A | * | 5/1997 | Dolby et al. | 706/46 |
| 5,724,594 A | * | 3/1998 | Pentherroudakis | 704/10 |
| 5,748,975 A | * | 5/1998 | Van De Vanter | 707/531 |
| 5,778,157 A | * | 7/1998 | Oatman et al. | 706/46 |
| 5,794,050 A | * | 8/1998 | Dahlgren et al. | 717/8 |
| 5,887,120 A | * | 3/1999 | Wical | 706/46 |
| 5,995,955 A | * | 11/1999 | Oatman et al. | 706/50 |
| 6,038,560 A | * | 3/2000 | Wical | 706/50 |

OTHER PUBLICATIONS

Conceptual Indexing: A Better What to Organize Knowledge, William A. Woods, Apr. 1997, Copyright Sun Microsystems.*

(List continued on next page.)

Primary Examiner—George B. Davis
Assistant Examiner—Michael B. Holmes
(74) Attorney, Agent, or Firm—Stattler, Johansen & Adeli LLP

(57) ABSTRACT

A knowledge catalog includes a plurality of independent and parallel static ontologies to accurately represent a broad coverage of concepts that define knowledge. The actual configuration, structure and orientation of a particular static ontology is dependent upon the subject matter or field of the ontology in that each ontology contains a different point of view. The static ontologies store all senses for each word and concept. A knowledge classification system, that includes the knowledge catalog, is also disclosed. A knowledge catalog processor accesses the knowledge catalog to classify input terminology based on the knowledge concepts in the knowledge catalog. Furthermore, the knowledge catalog processor processes the input terminology prior to attachment in the knowledge catalog. The knowledge catalog further includes a dynamic level that includes dynamic hierarchies. The dynamic level adds details for the knowledge catalog by including additional words and terminology, arranged in a hierarchy, to permit a detailed and in-depth coverage of specific concepts contained in a particular discourse. The static and dynamic ontologies are relational such that the linking of one or more ontologies, or portions thereof, result in a very detailed organization of knowledge concepts.

14 Claims, 8 Drawing Sheets

OTHER PUBLICATIONS

Bootstrapping knowledge representation: from entailment meshes via semantic nets to learning webs, Francis Heylighen (1997) International Journao of Human–Computer Studies.*

Beyond the Mirror World: Privacy and the Representation Practices of Computing, Philip E. Agre and Marc Rotenberg, eds, Technology and Privacy: The New Landscape, MIT Press, 1997.*

* cited by examiner

METHODS AND APPARATUS FOR CLASSIFYING TERMINOLOGY UTILIZING A KNOWLEDGE CATALOG

This is a continuation of U.S. patent application Ser. No. 08/455,710, filed, May 31, 1995, U.S. Pat. No. 6,061,675.

MICROFICHE APPENDICES

Appendix A, entitled "Theme Parser Code" contains five microfiche with a total number of two hundred and eighty two (282) frames.

Appendix B, entitled "Code Heading" contains two microfiche with a total number of eighty five (85) frames.

Appendix C, entitled "Theme Vector Code" contains one microfiche with a total number of sixty three (63) frames.

Appendix D, entitled "Content Indexing Code" contains one microfiche with a total number of seventy one (71) frames.

COPYRIGHT NOTICE

Appendices A, B, C and D contain material which is subject to copyright protection. The copyright owner has no objection to the facsimile reproduction by any one of the Appendices as they appear in the United States Patent and Trademark patent files or records, but otherwise reserves all copyright rights whatsoever.

FIELD OF THE INVENTION

The present invention relates to the field of classification, and more particularly to a knowledge catalog system.

BACKGROUND OF THE INVENTION

The ability to accurately define knowledge in terms of categories has a wide range of applications. For example, the ability to accurately classify documents based on the content of the document has application in document storage and retrieval systems. For example, the Library of Congress of the United States utilizes a document classification system to store and retrieve documents. Typically, such prior art classification systems are configured in fixed hierarchical structures. For such a system, a number of high level categories or subjects are defined. Beneath each of the high level categories are additional sub categories that break the high level category into more detailed categories. The more sub categories specified in the fixed hierarchical structure, then the more detailed the classification system becomes. A detailed prior art classification system may utilize up to ten hierarchical levels. For example, the Library of Congress classifies documents based on an average of nine or ten levels of sub categories within a particular area, topic or field of study.

In modern society, there is an increasing demand for use of vast amounts of information covering a wide range of topics. In order to best utilized the vast amounts of information, an accurate and detailed classification system is required for storage and retrieval of the information. However, due to the rigid nature and limitations in detail, prior art fixed hierarchical classification systems can not adequately classify vast amounts of information that covers a wide range of information. Therefore, a classification system that accurately classifies information in a wide range of topics is desirable. Furthermore, it is desirable to classify knowledge such that the classification system is independent of language and culture so that information derived from all parts of the world may be classified under a single system.

SUMMARY OF THE INVENTION

A knowledge catalog includes a plurality of independent and parallel static ontologies to accurately represent a broad coverage of concepts that define knowledge. Each static ontology contains a plurality of knowledge concepts for a particular area of knowledge. The knowledge concepts are arranged hierarchically such that knowledge concepts are organized from high level generalized concepts down to more specific concepts. The actual configuration, structure and orientation of a particular static ontology is dependent upon the subject matter or field of the ontology. Therefore, each ontology contains a different point of view. The static ontologies store all senses for each word and concept. In one embodiment, the static ontologies include, when applicable, a mass sense, a count sense, a noun form, and a nominal form. Although the static ontologies are broad to cover a wide range of knowledge concepts, they are not extremely detailed. In addition, the set of static ontologies do not contain concepts that are extremely volatile.

In one embodiment, the knowledge catalog further includes a dynamic level. The dynamic level adds details for the knowledge catalog by including additional words and terminology, arranged in a hierarchical structure, to permit a detailed and in-depth coverage of specific concepts contained in a particular discourse. Therefore, additional detailed concepts not contained in the static ontologies are included in the dynamic level. The static and dynamic ontologies are relational such that the linking of one or more ontologies, or portions thereof, result in a very detailed organization of knowledge concepts.

In one embodiment, the knowledge catalog has application for use in a knowledge classification system. A knowledge catalog processor accesses the knowledge catalog to classify input terminology based on the knowledge concepts in the knowledge catalog. Because the static ontologies store all senses for each concept, the knowledge catalog processor returns all concepts or categories associated with the input terminology, unless a specific sense of an ambiguous term is specified. Furthermore, the knowledge catalog processor processes the input terminology prior to attachment in the knowledge catalog.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

KNOWLEDGE CATALOG

A knowledge catalog of the present invention provides a unique infrastructure to accurately represent concepts that define knowledge. The knowledge catalog includes a set of static ontologies to define knowledge. The knowledge catalog may be characterized as including several static ontologies because the knowledge catalog provides multiple views, characterizations, and organizations of concepts. As is explained below, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other.

Figure 1:
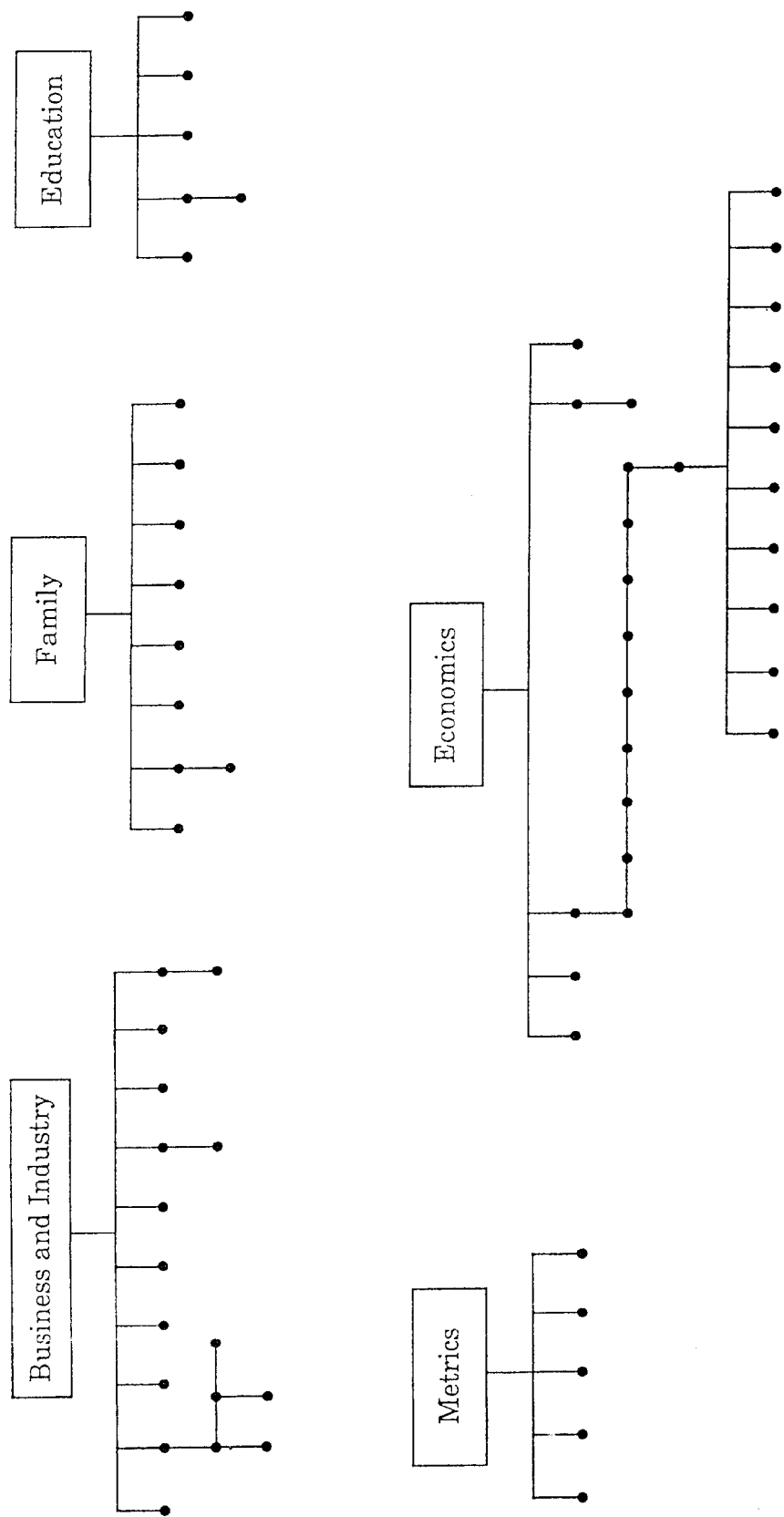
FIG. 1 illustrates several hierarchical structures for example static ontologies.

FIG. 1 illustrates several example static ontologies configured in accordance with one embodiment of the present invention. Specifically, FIG. 1 illustrates hierarchical structures for the "business and industry", "family", "education", "metrics", and "economics" static ontologies. As shown in FIG. 1, each static ontology contains a plurality of concepts, illustrated as nodes in the hierarchical structures for the respective static ontologies. For purposes of simplicity, the specific "concepts" are illustrated only as nodes. However, the specific concepts contained within each static ontology hierarchical structure are set forth below. The following list contains a plurality of static ontologies configured in accordance with the preferred embodiment of the present invention. Although this list provides a set of static ontologies for the preferred embodiment, modifications to the classification or concepts may be made without deviating from the spirit or scope of the invention.

```
TT abstract_ideas_and_concepts
NT1 metrics
NT2 area_measurement
NT2 distance_measurement
NT2 mass_and_weight_measurement
NT2 volume_measurement
NT2 time_measurement
NT1 space_1348
NT2 space_in_general_1365
NT3 abstract_space_1425
NT4 indefinite_spaces_1742
NT3 specific_space_1426
NT4 regions@areas_1743
NT4 rural_areas_1745
NT4 urban_dwellings@_cities_1746
NT3 relative_space_1427
NT4 general_locations@_positioning@_emplacing_1747
NT4 dislocation@_removal_1748
NT3 existence_in_space_1428
NT4 presence@_being_there_1749
NT4 absence_1750
NT4 inhabiting_1751
NT4 citizenship_1752
NT4 populations@_communities_1753
NT4 homes_1754
NT4 rooms@_chambers_1755
NT4 containers@_receptacles_1756
NT4 contents@_cargos_1757
NT2 dimensions_1366
NT3 general_dimensions_1429
NT4 smallness_of_size_1759
NT4 sizes@_largeness_of_size_313967
NT4 expansions@_increases_in_size_313968
NT4 contractions@_decreases_in_size_313969
NT4 remoteness@_distances_313970
NT4 nearness@_closeness_279932
NT4 intervals@_spaces_between_313971
NT3 linear_directions_1430
NT4 breadth@_thickness_1767
NT4 narrowness@_thinness_1768
NT4 filaments_1769
NT4 lowness_1771
NT4 shallowness_1773
NT4 verticalness@_steepness_1776
NT4 horizontalness@_flatness_1777
NT4 pendency_1778
NT4 support@_supports@_braces@_furniture_1779
NT4 shafts@_poles_1780
NT4 parallelism_1781
NT4 inclines@_diagonals_1782
NT4 inversions@_reversals_1783
NT4 intercrossing@_intersection_1784
NT4 weaving@_fabrics_1785
NT4 sewing@_knitting_1786
NT4 length@_longness_279966
NT4 shortness@brevity_313972

NT4 interiors@_internals@_insides_1788
NT4 centrality@_being_at_the_center_1789
NT4 layers@_stages_1790
NT4 coverings@_lids@_covering_1791
NT4 skins@_jackets_1792
NT4 hair@_feathers_1793
NT4 clothing@_garments_1794
NT4 exposure@_undressing_1795
NT4 environments@_encompassment_1796
NT4 definitions@_restrictions_1797
NT4 boundaries@_parameters_1798
NT4 enclosures@_enclosed_laces_1799
NT4 interpolation@_between_two_things@interposition_1800
NT4 intrusions@_invasions_1801
NT4 contrapositition@_opposites_1802
NT4 front@_at_the_front_of@_frontward_locations_1803
NT4 rear@_at_the_rear_of@_rearward_locations_1804
NT4 side@_at_the_side_of@_sideways_locations_1805
NT4 the_right_side@starboard_1806
NT4 the_left_side@_port_1807
NT2 structure_and_form_1367
NT3 general_form_1432
NT4 structure@_composition@_architecture_1808
NT4 forms@_shapes_1809
NT4 chaos@_confusion_1810
NT4 balance@_harmony_1811
NT4 distortion@_mutilations_1812
NT3 special_form_1434
NT4 straightness_1813
NT4 angularity@_angled_objects_1814
NT4 curvature@_curved_objects_1815
NT4 circularity@_circular_objects_1816
NT4 convolution@_complex_circular_objects_1817
NT4 spheres@_roundness_1818
NT3 superficial_form_1435
NT4 protuberances@_bulges_1819
NT4 concavity@_excavation_1820
NT4 sharpness@_pointed_objects_1821
NT4 bluntness@_not_sharp_1822
NT4 smoothness_1823
NT4 roughness_1824
NT4 notches_1825
NT4 grooves@_scratches_1826
NT4 folds@_creases_1827
NT4 openings@_passages@_making_openings@_puncturing_1828
NT4 closures@_barriers@_obstacles@_closing_1829
NT2 motion_1368
NT3 motion_in_general_1436
NT4 movement@_activity@_generalized_motions_1830
NT4 absence_of_motion_1831
NT4 speed@_velocity@_rate_of_motion_1832
NT4 delay@_slowness@_slow_motions_1833
NT3 change_of_lace_1437
NT4 transporting@_motions_of_transfer_1834
NT4 vehicles_1835
NT4 traveling_1836
```

-continued

NT4 height@_highness_284254
NT4 depths@_deepness_313973
NT4 tops@_topsides_313974
NT4 bottoms@_undersides_313975
NT3 external_and_internal_dimensions_1431
NT4 exteriority_1787
NT4 leverage@_mechanical_devices_of_moving_and_raising_1848
NT4 motions_of_attraction@_magnets_1849
NT4 motions_of_thrusting_away@_repelling_1850
NT3 motion_with_reference_to_direction_1439
NT4 compass_directions@_trends_1851
NT4 deviations@_motions_of_divergence_1852
NT4 leading_1853
NT4 following_1854
NT4 progress@_forward_motion_1855
NT4 regression@_return@_backwards_motion_1856
NT4 approaching@_motion_towards_1857
NT4 recessions@_withdrawals@_motion_away_from_1858
NT4 motions_of_convergence_1859
NT4 divergence@_motions_of_spreading_out@_deployments_1860
NT4 motions_of_arrival@_goals@_destinations_1861
NT4 departures@_motions_of_leaving_1862
NT4 entrances@_entering_1863
NT4 exits@_egress_1864
NT4 motions_of_insertion_1865
NT4 motions_of_extraction@_distilling_1866
NT4 reception@_taking_in_1867
NT4 eating@_drinking@_nutrition_1868
NT4 motions_of_expulsion_1871
NT4 excretions@_discharges_1872
NT4 secretions_1873
NT4 surplus@_excess_1874
NT4 shortages@_falling_short_1875
NT4 ascents@_upward_motions_1876
NT4 downward_motions@_descents_1877
NT4 raising@_lifting_1878
NT4 lowering@_sinking@_depressing_1879
NT4 leaping_1880
NT4 plunging@_submerging_1881
NT4 circling@orbiting@_meandering_1882
NT4 rotational_movements_1883
NT4 oscillations@_vibrations_1884
NT4 irregular_movement@perturbations@_spasms_1885
NT1 physics_1052
NT2 heat_in_general_313822
NT3 heat_1369
NT4 heat@_temperature_1888
NT4 heating_1889
NT4 cold@_freezing_1892
NT2 light_1370
NT3 lights@_lightness_313807
NT4 lighting@_illumination_1894
NT4 light_sources_1895
NT4 darkness@_dimness_1896
NT4 shades@_filters_1897
NT4 transparency@_transparent_objects@_glasses_1898
NT4 semitransparency_1899
NT4 opaqueness_1900
NT2 mechanics_1372
NT3 mechanics@_machines_313809
NT4 automation_1907
NT4 friction@_wear@_polishing@_rubbing_1908
NT2 physical_properties_1373
NT3 properties_of_physical_objects_313810
NT4 lightness@_buoyancy_1911
NT4 density@_congestion_1912
NT4 hardness@_rigidity_1914
NT4 elasticity@_resilience_1916
NT4 sensations_of_touch_1978
NT2 taste_in_general_313817
NT3 taste_1380
NT4 the_sense_of_taste_1979
NT4 mouth-watering_tastes_1980
NT4 disagreeable_tastes_1981
NT4 lack_of_flavor_1982
NT4 sweetness_1983
NT4 sourness_1984
NT4 strong_flavor@_spiciness_1985
NT2 smell_in_general_313816
NT4 travelers_1837
NT3 motion_conjoined_with_force_1438
NT4 striking_motions@_impacts_1844
NT4 reactions@_replies_1845
NT4 pushing_and_throwing_motions_1846
NT4 pulling_motions_1847
NT4 toughness@_strength_1917
NT4 brittleness@_fragility_1918
NT4 powderiness@_crumbliness_1919
NT4 texture_surface_quality_313959
NT4 weightiness@_mass_313960
NT4 rarity@_insubstantiality_313961
NT4 softness@_pliancy_313962
NT2 color_1374
NT3 colors@_having_color_313804
NT4 white_colors@_whiteness_1922
NT4 black_colors@_blackness_1923
NT4 gray_colors@_grayness_1924
NT4 brown_colors@_brownness_1925
NT4 red_colors@_redness_1926
NT4 orange_colors@_orangeness_1927
NT4 yellow_colors@_yellowness_1928
NT4 green_colors@_greenness_1929
NT4 blue_colors@_blueness_1930
NT4 purple_colors@_purpleness_1931
NT4 colors@_colorfulness_313963
NT4 lack_of_color@_colorlessness_313964
NT4 variegation@_multicoloredness_313965
NT1 matter_1349
NT2 matter_in_general_1375
NT3 matter_in-general@_substance_313808
NT4 universe@_heavens_1933
NT4 materiality_1934
NT4 intangibles@_otherworldliness@_the_supernatural_1935
NT4 materials@_building_materials_1936
NT2 inorganic_matter_1376
NT3 liquids_1442
NT4 liquids@_fluids_1943
NT4 semiliquidity_1944
NT4 pulpiness@_pastiness_1945
NT4 liquidization@_dissolving_1946
NT4 moisture@_humidity_1947
NT4 dryness@_aridness@_absence_of_water_1948
NT3 vapors_1443
NT4 vapors@_gases_1956
NT4 bubbles@_bubbling@_effervescence_1959
NT2 organic_matter_1377
NT3 vitality_1445
NT4 life@_living_1961
NT4 death@_dying_1962
NT4 killing@_bloodshed_1963
NT4 burials@_funerals@___burying_1964
NT3 mankind_1448
NT4 mankind@_humanity_1969
NT4 races@_cultures_1970
NT3 male_and_female_1449
NT4 sexes@_genders_1971
NT4 masculinity_1972
NT4 femininity_1973
NT1 sensation_1350
NT2 sensation_in_general___1378
NT3 feelings_in_general@_sensations_313815
NT4 sensations@_feelings_1974
NT4 lack_of_physical_feelings_1975
NT4 pain@_suffering_1976
NT2 touch_in_general_313818
NT3 touch_1379
NT4 the_sense_of_touch@_touching_1977
NT4 intellectuals@_scholars_2025
NT4 ignorance@_the_unknown_2026
NT3 functions_of_the_mind_1457
NT4 thoughts@_ideas@_thinking@_reasoning_2027
NT4 ideas@_notions@_impressions_2028
NT4 absence_of_thought_2029
NT4 intuition@_insight_2030
NT3 reasoning_processes_1458
NT4 reasoning@_logic_2031
NT4 sophistry@_deceptive_reasoning_2032
NT3 consideration_1459

-continued

NT3 smell__1381
NT4 odors__1987

NT4 fragrances@__perfumes__1988
NT4 bad__smells__1989
NT4 odorlessness__1990
NT2 sight__in__general__313821
NT3 sight__1382
NT4 sense__of__sight__1991
NT4 defective__vision@__blindness__1992
NT4 blindness__1993
NT4 witnesses@__audiences@__onlookers__1994
NT4 visibility@__capable__of__being__seen__1995
NT4 invisibility__1996
NT4 appearances__1997
NT4 disappearance__1998
NT2 heating__1383
NT3 perception__of__sound__1450
NT4 sense__of__hearing 1999
NT4 deafness__2000
NT3 sound__1451
NT4 sounds@__noises__2001
NT4 silence__2002
NT4 faintness__of__sound__2003
NT4 loudness__2004
NT3 specific__sounds__1452
NT4 reasonable__2005
NT4 repeated__sounds__2006
NT4 explosive__noises__2007
NT4 hissing__sounds__2008
NT4 shrill__sounds@__harsh__sounds__2009
NT4 cries@__calls@__exclamations__2010
NT4 animal__sounds__2011
NT3 unmusical__sounds__1453
NT4 dissonant__sounds@__out__of__tune@sounds__that__clash__2012
NT3 musical__sounds__1454
NT4 music__1148
NT4 harmonics@__music__theory__2013
NT1 intellect__1351
NT2 intellectual__faculties__and__processes__1384
NT3 faculties__1455
NT4 intellect@__reason__2015
NT4 intelligence@__wisdom__2016
NT4 philosophers@__thinkers__2017
NT4 stupidity@__acting__unintelligently@__mental__retardation__2018
NT4 foolishness__2019
NT4 fools__2020
NT4 healthy__minds__2021
NT4 unhealthy__minds__2022
NT4 eccentricities@__idiosyncrasies__2023
NT3 comprehension__1456
NT4 knowledge@__information__2024
NT4 attitudes@__viewpoints@__moods__2073
NT4 broad-mindedness__2074
NT4 bigotry@__prejudice__2075
NT4 curiosity__2076
NT4 boredom@__detachment@__lack__of__curiosity__2077
NT4 attentiveness@__concern@__undivided__attention__2078
NT4 thoughtlessness@__negligence__2079
NT4 distraction@__confusion__2080
NT4 carefulness@__vigilance@__thoroughness__2081
NT4 neglect@__carelessness__2082
NT3 creative__thought__1469
NT4 creative__thought@__imagination@__originality__2083
NT4 lack__of__imagination@__practicality__2084
NT3 recollection__1470
NT4 remembering@__memories__2085
NT4 forgetfulness__2086
NT3 anticipation__1471
NT4 expectations@__optimism__2087
NT4 surprise@__astonishment__2088
NT4 frustrations@__defeats@__disappointments__2089
NT4 looking__ahead@__prudence@__foreknowledge__2090
NT4 predictions@__forecasts__2091
NT4 warnings@__omens__2092
NT2 communication__of__ideas__1386
NT3 nature__of__ideas__communicated__1472
NT4 significance@__meaning__2093
NT4 implications@__inferences__2094

NT4 topics@__subjects__2033
NT4 questioning@__examinations@__investigations@__surveillance__2034
NT4 answers@__replies__2035
NT4 solutions@__outcomes__2036
NT4 discoveries@__discovering__2037
NT3 assessment__1460
NT4 experiments@__tests@__experimental__methods__2038
NT4 measurements@__estimations@__measuring__2039
NT4 comparisons@__correlations__2040
NT4 powers__of__analysis@__distinctions__2041
NT4 casual__judgements@__imprudence__2042
NT3 conclusion__1461
NT4 judgements@__opinions@__appraisals__2043
NT4 prejudgements@__prejuding@__preconceptions__2044
NT4 misjudgments__2045
NT4 overestimation@__exaggeration__2046
NT4 underestimation@__depreciation__2047
NT3 theory__1462
NT4 theories@__suppositions@__speculations__2048
NT4 philosophy__26
NT3 belief__1463
NT4 beliefs@__hopes@systems__of__belief__2049
NT4 credulity@__blind__faith__2050
NT4 unbelief@__denial@__disbelief__2051
NT4 skepticism__2052
NT3 grounds__for__belief__1464
NT4 evidence@proof__2053
NT4 disproving@__rebuttals__2054
NT3 qualifications__1465
NT4 limitations@__specifications__2055
NT4 explicitness__2056
NT4 possibility@__likelihood@__feasibility__2057
NT4 impossibility__2058
NT4 probability@__expectations__2059
NT4 improbability__2060
NT4 certainty@__truth__2061
NT4 uncertainty@__chance__2062
NT4 gambles@__risks@__gambling__2063
NT3 conformity__to__fact__1466
NT4 truth@__reality__2064
NT4 maxims@__proverbs__2065
NT4 errors@__illusions__2066
NT4 illusions@__deceptions__2067
NT4 disillusionment__2068
NT3 acceptance__1467
NT4 assent@__agreement__2061
NT4 dissent@__diversity@__objections__2070
NT4 assertions@__declarations@__guarantee__2071
NT4 negations@__denials__2072
NT2 states__of__mind__1385
NT3 mental__attitudes__1468
NT3 style@__mode__of__expression__1479
NT4 rhetoric__2135
NT4 clear__language__usage__2136
NT4 unclear__language__use__2137
NT4 plain__speech__2138
NT4 economy__of__language@__abbreviations@__epigrams__2139
NT4 wordiness@__verbosity__2140
NT3 spoken__language__1480
NT4 oral__language@__talking__2141
NT4 talkativeness__2143
NT4 conversations@__discussions__2144
NT4 soliloquies@__monologues__2145
NT4 public__speaking@__oratory__2146
NT4 speaking__well@__eloquence__of__speech__2147
NT4 pompous__remarks__2148
NT3 written__language__1481
NT4 correspondence@__letters__2151
NT3 uncommunicativeness@__secrecy__1483
NT4 uncommunicativeness__2157
NT4 secrecy@__privacy__2158
NT4 hiding@__hiding__places__2159
NT3 falsehood__1484
NT4 lies@__insincerity@__dishonesty@__hypocrisy__2160
NT4 exaggerations@__exaggerating__2161
NT4 deceptions@__illusions__2162
NT4 deceivers@__imposters__2163
NT4 dupes__2164

-continued

NT4 nonsense__2095
NT4 intelligibility__2096
NT4 complexity@__obscurity@__enigmas__2097
NT4 double__meanings__2098
NT4 figures__of__speech__2099
NT4 interpretations@__versions__2100
NT4 distortions@__errors__2101
NT3 modes__of__communication__1473
NT4 communication@__exchange__of__ideas__2102
NT4 manifestations@__displays__2103
NT4 disclosures@__confessions__2104
NT4 information@__data@__inside__information__2105
NT4 publications@__announcements@__statements__2107
NT4 messengers@__announcers__2109
NT3 education__135
NT4 instructions@__directions@__teaching__2110
NT4 misteaching@__propaganda__2111
NT4 learning@__education__2112
NT4 teachers@__masters@__instructors__2113
NT4 students@__disciples__2114
NT3 indication__1474
NT4 indications@__signs@__indicators__2116
NT4 badges@__emblems@__uniforms__2117
NT4 records@__documents@__reports@__logbooks__2118
NT4 recorders@__librarians@__historians__2119
NT3 representation__1475
NT4 representations@__depictions__2120
NT4 misrepresentations@__injustices__2121
NT3 language__1478
NT4 languages@__speech__acts@__language__2127
NT4 letters@__characters__2128
NT4 words__2129
NT4 terminology@__assigning__names__2130
NT4 anonymity__2131
NT4 phrases@__expressions__2132
NT4 informality__2190
NT3 motive__1492
NT4 motivations@__inducements__2191
NT4 pretexts@__excuses__2192
NT4 allurements@__enticements__2193
NT4 bribery__2194
NT4 warnings@__warning@__intimidation@__talking__out__of__2195
NT3 purpose__1493
NT4 intentions@__objectives__2196
NT4 plans@__arrangements__2197
NT4 hunting@__tracking__2198
NT4 activities@__occupations@__hobbies__2199
NT3 ways__and__means__1494
NT4 routes@__methods__2200
NT4 resources@__tools__2201
NT4 provisioning@__equipping@__providing__2202
NT4 storage@__places__of__storage__2203
NT4 enough@__plenty@__abundance__2204
NT4 inadequacy@__shortage@__not__enough__2205
NT4 excess@__saturation@__too__much__2206
NT4 overdose@__saturation@__much__too__much__2207
NT3 use__1495
NT4 uses@__applications__2208
NT4 consumption@__depletion@__expenditures__2209
NT4 misuse@__abuse__2210
NT4 obsolescence@__castoffs@__throwaways__2211
NT4 uselessness@__garbage__2212
NT2 conditions__1388
NT3 adaptation__to__ends__1496
NT4 expedience@__means__to__an__end__2213
NT4 wrongness@__disadvantages__2214
NT4 importance@__significance__2215
NT4 trivia@__insignificance__2216
NT4 goodness__2217
NT4 badness__2218
NT4 afflictions@__torments@__poisons__2219
NT4 perfection__2220
NT4 imperfection__2221
NT4 blemishes@__deformities__2222
NT4 mediocrity__2223
NT3 wholesomeness__1497
NT4 cleanness@__sanitation@__washing__2224
NT4 dirtiness@__squalor__2225
NT4 hygiene__2226

NT1 volition__1352
NT2 volition__in__general__1387
NT3 will__in__general__313820
NT4 will__1485
NT4 willingness__2165
NT4 unwillingness__2166
NT3 resolution@__determination__1486
NT4 resolve@__tenacity@__will-power__2167
NT4 perseverance@__stamina__2168
NT4 stubbornness__2169
NT3 irresolution@__caprice__1487
NT4 indecisiveness__2170
NT4 second-thoughts@__flip-flops__2171
NT4 caprice@__on__the__spur__of__the__moment__2172
NT4 impulses@__urges@__automatic__responses__2173
NT3 evasion__1488
NT4 avoidance@__evasion__2174
NT4 escapes@__loopholes__2175
NT4 abandonment@__surrendering__2176
NT3 inclination__1489
NT4 desires@preferences__2177
NT4 eagerness__2178
NT4 indifference@__apathy__2179
NT3 choice__1490
NT4 choices@__options__2180
NT4 rejections@__denials__2181
NT4 requirements@__necessity@__inevitability__2182
NT4 predestination@__fate@__determinism__2183
NT4 plans@__schedules__2184
NT3 custom__1491
NT4 customs@__habits__2185
NT4 inexperience__2186
NT4 fashions@__novelties@__fads__2187
NT4 social__conventions__2188
NT4 formalities@__ceremonies@__rituals__2189
NT4 remedies@__medicinal__drugs__2229
NT4 therapy@treatments__2231
NT2 voluntary__actions__1389
NT3 action__1501
NT4 actions@__operations@__voluntary__actions__2247
NT4 inaction@__inertia@__voluntary__inaction__2248
NT4 activity@__proceeding@__doers__2249
NT4 inactivity@__inaction@__nonworkers__2250
NT4 haste@__speed__2251
NT4 leisure@__repose__2252
NT4 relaxation@vacations__2253
NT4 sleeping@__hypnosis__2254
NT4 wakefulness@__insomnia__2255
NT3 exertion@__endeavor__1502
NT4 endeavors@__trying__one's__best__2256
NT4 projects@__ventures@__missions__2257
NT4 exertion@__energy__2258
NT4 fatigue@__strain__2259
NT4 workers@__doers__2260
NT4 places__of__employment@__workshops__2261
NT3 preparation__1503
NT4 preparation@__planning__2262
NT4 vulnerability@__negligence__2263
NT3 accomplishment__1504
NT4 accomplishment@__completion__313801
NT4 leaving__it__undone@__loose__ends@__noncompletion__2264
NT4 success@__victory__2265
NT4 failures@__defeats__2266
NT4 victories@__conquests__2267
NT4 defeats@__collapses@__defeating__2268
NT4 prosperity@__success__2269
NT4 adversity@__disaster__2270
NT4 hindrance@__resistance@__hindering__2271
NT4 difficulties@__troubles__2272
NT4 ease__of__accomplishment@__effortlessness__2273
NT3 adroitness__1505
NT4 skills@__abilities__2274
NT4 incompetence@__ignorance@__inexperience__2275
NT4 cleverness@__strategies__2276
NT4 naivety@__innocence__2277
NT3 conduct__1506
NT4 behavior__2278
NT4 misbehavior__2279
NT2 authority@__control__1390

-continued

NT3 physical_progress_1499
NT4 improvements@_progress@_reforms_2233
NT4 impairment@_deterioration_2234
NT4 destruction@_ruin_2235
NT4 restoration@_improvement_2236
NT4 rejuvenation@_renewal_2237
NT4 relapses@_setbacks_2238
NT3 security_1500
NT4 dangers@_crises_2239
NT4 safety@_security_2240
NT4 safekeeping@_insurance@_protection_2241
NT4 sanctuaries@_shelters_2242
NT4 preservation@_conservation_2243
NT4 rescue@_release_2244
NT4 warnings@___notices_2245
NT4 alarms@_alerts_2246
NT3 health_48855
NT4 health@_fitness@_wellness_2228
NT3 constraint_1511
NT4 compulsion@_necessity_2296
NT4 strictness@_discipline_2297
NT4 laxness@_imprecision_2298
NT4 leniency@_mercy@_indulgence_2299
NT3 restraint_1512
NT4 restraint@_inhibition_2300
NT4 confinement@_isolation_2301
NT3 unrestraint_1513
NT4 freedom@_rights_2392
NT4 liberation@_rescue_2303
NT3 subjugation_1514
NT4 domination@_control_2304
NT3 compliance_1515
NT4 submission@_compliance_2305
NT4 obedience@_service_2306
NT4 disobedience@_rebelliousness_2307
NT4 observance@practice@_compliance_2308
NT4 nonobservance_2309
NT3 pledge_1516
NT4 promises@_assurances_2310
NT4 contracts@_agreements@_understandings_2311
NT4 guarantees@_deposits@_pledges_2312
NT3 proposal_1517
NT4 offers@_bids_2313
NT4 requests@petitions_2314
NT3 consent_1518
NT4 consenting@_agreement@_willingness@permission_2315
NT4 refusal@_rejection@_repudiation_2316
NT4 permission@_authorization_2317
NT4 forbidding@_refusing@_prohibition_2318
NT4 repealing@_rescinding@_cancellation_2319
NT3 commission_1519
NT4 commissioning@_delegating_2320
NT4 deputies@_agents@proxies_2321
NT4 promotions@_upgrades_2322
NT4 demotions@_downgrades_2323
NT4 retirement_from_position_of_authority_2324
NT2 support_and_opposition_1391
NT3 support_1520
NT4 aid@_support@_patronage_2325
NT4 cooperation@_harmony_2326
NT4 associates@_companions_2327
NT4 associations@_societies@_coalitions_2328
NT3 opposition_1521
NT4 opposition@_contention@_hostility_2330
NT4 opponents@_adversaries@_enemies_2331
NT4 resistance@_defiance_2332
NT4 defiance@_arrogance_2333
NT3 concord_1522
NT4 accord@_rapport@_harmonious_relationships_2334
NT4 disharmony@_conflicts@_strained_relationships_2335
NT3 contention_1523
NT4 contention@_competition@_martial_arts_2336
NT4 warfare_1256
NT4 attacks@_assaults@_offensive_warfare_2337
NT4 defenses@_defensive_warfare_2338
NT4 combatants_2339
NT4 battlegrounds@_theaters_of_operations_2341
NT3 peace_1524
NT4 peace@ nonviolence_2342

NT3 prerogative_1507
NT4 authority@_competency_2280
NT4 lawlessness@_anarchy_2281
NT3 politics_and_government_1508
NT4 government@_management_2282
NT4 politics_556
NT4 politicians_2286
NT3 direct-ion_1509
NT4 direction@___management_2287
NT4 directors@_overseers@_guidebooks_2288
NT4 masters@_patrons@_rulers@_military_officers_2289
NT4 servants@_employees_2290
NT3 directions_1510
NT4 precepts@_rules_2291
NT4 commands@_orders_2292
NT4 demands@_stipulations_2293
NT4 advice@proposals@_suggestions_2294
NT4 councils@_committees_2295
NT4 mediation⅝_intervention@_peacemakers_2344
NT3 mid-course_1525
NT4 neutrality@_impartiality_2345
NT4 compromises@_settlements@_give-and-take_2346
NT2 possessive_relations_1392
NT3 possession_1526
NT4 possessing@_owning@_ownership_2347
NT4 possessors@_owners_2348
NT4 property@_real_estate_2349
NT4 acquisition@_profits_2350
NT4 loss@_losses@_waste_2351
NT4 retention___keeping_2352
NT4 relinquishment@_disposal_2353
NT3 sharing_1527
NT4 participation@_sharing@_partnership_2354
NT4 apportion_sent@_budgeting@_ear_marking_2355
NT3 transfer_of_property_1528
NT4 transfer_of_property_or_right_313819
NT4 donations@_endowments@_giving_2356
NT4 receiving@_getting@_inheritance_2357
NT4 lending@_loans_2358
NT4 borrowing@_money-raising_2359
NT3 appropriation_1529
NT4 taking@_takeovers_2360
NT4 restitution@_reparations_2361
NT4 theft_2362
NT4 thieves_2363
NT4 illicit_businesses@_blackmarkets@_organized_crime_2364
NT3 interchange_of_property_1530
NT4 commerce@_economics_2365
NT4 purchases@_buying_2366
NT4 sales@selling@_merchandising@_marketing_2367
NT3 monetary_relations_1531
NT4 money@_currency_2373
NT4 finances@_investments_2374
NT4 wealth@_riches_2375
NT4 poverty_2376
NT4 financial_credit@_borrowing_power_2377
NT4 debts@_liabilities_2378
NT4 payments@_settlements_2379
NT4 nonpayment@_defaulting@_bankruptcy_2380
NT4 expenditures@_disbursements@_spending_2381
NT4 receipts@___income_2382
NT4 accounts@_assets_2383
NT4 prices@_fees@_taxes_2384
NT4 discounts@_reductions_2385
NT4 expensiveness@_highprices_2386
NT4 cheapness@_lowprices_2387
NT4 no_charge@_gifts_2388
NT4 economy@_cost-effectiveness_2389
NT4 stinginess@_hoarding_2390
NT4 generosity_2391
NT4 overgenerosity@_wastefulness_2392
NT5 affections_1353
NT2 personal_affections _1393
NT3 emotion_1532
NT4 feelings@_emotions_2393
NT4 lack_of_feelings_2394
NT3 excitability_1533
NT4 excitement@_exhilaration@_thrills_2395
NT4 inexcitability@_stoicism_2396

-continued

```
NT4 pacification@__disarmament@__demilitarization__2343
NT4 calmness@__nerves__of__steel__2398
NT4 patience__2399
NT4 impatience__2400
NT3 pleasure__and__pleasurableness__1534
NT4 pleasantness__2401
NT4 unpleasantness__2402
NT4 pleasure@__enjoyment@__happiness__2403
NT4 discontent@__unhappiness@__torture__2404
NT4 hatred@__loathing@__disapproval__2405
NT4 contentment__2406
NT4 discontent@__dissatisfaction__2407
NT4 cheerfulness__2408
NT4 solemnity@__seriousness__2409
NT4 sadness__2410
NT4 sorrow@__regretting__2411
NT4 unregretfulness__2412
NT4 lamentation@__grieving__2413
NT4 rejoicing@__laughing__2414
NT4 celebrating@__festivities__2415
NT4 amusements@__entertainments@__sports@__games__2416
NT4 dancing__2417
NT4 humor__2418
NT4 wit@__humor__2419
NT4 joking@__kidding@__teasing__2420
NT4 dullness@__unoriginality@__cliches__2421
NT4 tedious@__monotony__2422
NT4 aggravations__2423
NT4 relief@__feelings__of__relief__2424
NT4 comfort@__contentment__2425
NT3 anticipative__emotions__1535
NT4 hopes@__desires@__hopefulness__2426
NT4 hopelessness__2427
NT3 concern__1536
NT4 anxiety__2428
NT4 fears@__misgivings__2429
NT4 cowardice__2430
NT4 courage__2431
NT4 rashness@__recklessness__2432
NT4 caution@__cautiousness__2433
NT3 discriminative__affections__1537
NT4 exacting@__fussy@__perfectionism__2434
NT4 good__taste@__tastefulness__2435
NT4 vulgarity@__rudeness__2436
NT4 ugliness__2437
NT4 beauty@__charm__2438
NT4 ornamentation@__decorations@__ornaments__2439
NT4 plainness@__naturalness@__simplicity__2440
NT4 affectation@__pretense@__hypocrisy__2441
NT4 ostentation@__showiness@__luxuriousness__2442
NT3 affections__of__ego__313814
NT4 pride__1538
NT4 humility@__humiliation__2443
NT4 servility@__submissiveness@__ingratiation__2444
NT4 modesty__2445
NT4 vanity@__egotism__2446
NT4 boasting__2447
NT4 blustering@__bravado__2448
NT4 arrogance__2449
NT4 insolence__2450
NT3 esteem__1539
NT4 reputation@__fame__2451
NT4 dishonor@__degradation__2452
NT3 moral__sentiments__1552
NT4 respect@__appreciation__2501
NT4 disrespectfulness@__ridicule__2502
NT4 contempt__2503
NT4 ridicule__2504
NT4 approval@__endorsement@__compliments__2505
NT4 disapproval@__censure@__criticism__2506
NT4 flattery__2507
NT4 disparagement@__verbal__abuse__2508
NT4 curses@__oaths@__obscene__language__2509
NT4 threats@__menaces__2510
NT3 moral__conditions__1553
NT4 honesty@__integrity@__loyalty__2511
NT4 dishonesty@__treachery@__unfaithfulness__2512
NT4 justice@__fairness@__impartiality__2513
NT4 injustice@__unfairness@__favoritism__2514
NT4 nervousness__2397
NT4 honor@__glory__2453
NT4 titles@__honors@__academic__degrees__2454
NT4 the__aristocracy__2455
NT4 the__common__person__2456
NT3 contemplative__esteem__1540
NT4 sense__of__wonder__2457
NT4 composure__2458
NT2 sympathetic__affections__1394
NT3 social__relations__1541
NT4 friendliness__2459
NT4 unfriendliness__2460
NT4 seclusion__withdrawal___solitude__2461
NT4 hospitality@__greetings__2462
NT4 inhospitality 2463
NT3 social__affection__1542
NT4 friendship__2464
NT4 friends__2465
NT4 enmity@__hatred__2466
NT4 hatred@__bigotry__2467
NT4 love@__affection@__devotion__2468
NT4 lovemaking__2469
NT4 marriage__2470
NT4 celibacy__2471
NT4 loss__of__a__spouse__2472
NT3 civility__1543
NT4 courtesy__2473
NT4 discourtesy@__rudeness__2474
NT3 benevolence__1544
NT4 kindness@__acts__of__kindness__2475
NT4 brutality@__acts__of__brutality@__cruelty__2476
NT4 antisocial__attitudes__2477
NT4 public__spirit@__citizenship__2478
NT4 benefactors@__liberators__2479
NT4 criminals@__delinquents__2480
NT3 sympathy__1545
NT4 pity@__sympathy__2481
NT4 lack__of__pity@__ruthlessness__2482
NT4 comforting@__sharing__of__grief__2483
NT4 forgiveness@__kindness__2484
NT4 congratulations@__compliments@__good__wishes__2485
NT3 gratefulness__1546
NT4 gratitude__2486
NT4 ungratefulness__2487
NT3 ill__humor__1547
NT4 ill__humor@__grumpiness__2488
NT4 resentment@__anger__2489
NT3 selfish__resentment__1548
NT4 jealousy__2490
NT4 envy__2491
NT3 reprisal__1549
NT4 retaliation__2492
NT4 revenge__2493
NT2 morality__1395
NT3 morals__1550
NT4 ethics@__morals__2494
NT4 the__right__thing@__goodness@__decorum@__human__rights__2495
NT4 wrong__2496
NT3 moral__obligation__1551
NT4 entitlements@__what__one__deserves__2497
NT4 false__claims@__what__one__does__not__deserve__2498
NT4 duty@__moral__obligations__2499
NT4 impositions@__demands__2500
NT4 atheism@__agnosticism__2568
NT3 religious__practice__1561
NT4 worship@__devotion__2569
NT4 idolatry@__paganism__2570
NT3 supernaturalism__1562
NT4 occultism__2571
NT4 sorcery@__magic__2572
NT4 magic__spells@__charms__2573
NT3 churchdom__1563
NT4 laity__2576
NT4 religious__rites__2577
NT3 supernatural__regions__1557
NT1 abstract__relations__1355
NT2 relation__1356
NT3 absolute__relation__1401
NT4 relationships@__relevance@__pertinence__1572
```

-continued

NT4 selfishness__2515
NT4 unselfishness@__altruism__2516
NT4 virtues@__morals__2517
NT4 vice@__evil__2518
NT4 wrongdoing@__misconduct@__sin__2519
NT4 guilt__2520
NT4 innocence__2521
NT4 good__people@__gentlemen@__ladies__2522
NT4 bad__people@__criminals__2523
NT3 moral__practice__1554
NT4 sensuality__2524
NT4 sexual__innocence__2525
NT4 promiscuity@__loss__of__sexual__innocence__2526
NT4 indecency@__immodesty@__earthiness@__obscene__2527
NT4 asceticism@__self-denial__2528
NT4 self-restraint@__self-control@alcohol-free__2529
NT4 self-indulgence__2530
NT4 greed__2531
NT4 fasting__2532
NT4 intoxication@__drunkenness@__alcoholic__beverages__2533
NT4 sobriety__2534
NT3 moral__observance__1555
NT4 accusations@__complaints@__indictments__2542
NT4 justification@__vindication__2543
NT4 acquittal@__exoneration__2544
NT4 condemnation@__guilty__verdicts__2545
NT4 penalties@__punishments__2546
NT4 disciplinary__measures@__punishment__2547
NT4 atonement@__reparation@__restitution__2549
NT2 religion__30
NT3 supernatural__beings__1556
NT4 deities@__god__2550
NT4 angels@__saints__2552
NT4 evil__spirits__2553

NT4 ghosts__2554
NT3 religious__beliefs__1558
NT4 theology@__religion__2560
NT4 orthodoxy@__traditionalism__2561
NT4 unorthodoxy@__heresy__2562
NT3 religious__quality__1559
NT4 sanctity@__holiness__2563
NT4 the__profane__2564
NT3 religious__sentiments __1560
NT4 piety@__religion__2565
NT4 sanctimony@__hypocrisy__2566
NT4 impiety@__atheism__2567
NT4 cohesion@__consistency@__tenacity__1613
NT4 noncohesion@__looseness__1614
NT4 combinations@__unions__1615
NT4 disintegration@__decay__1616
NT3 wholeness__1407
NT4 portions@__segments__1618
NT4 completeness@__thoroughness__1619
NT4 incompleteness@__deficiencies@__immaturity@__shortages__1620
NT4 organizing@__structuring__1621
NT4 totality@__the__whole__amount__313920
NT2 order__1358
NT3 order__in__general__1408
NT4 order@__harmony@__regularity__1622
NT4 placement@__arrangement__1623
NT4 classifications@__ratings__1624
NT4 chaos@__confusion@__disorder__1625
NT4 disarrangement@__disorganization__1626
NT3 consecutive__order__1409
NT4 priorities__1627
NT4 logical__sequences@progressions__1628
NT4 forerunners@__guides@__readers@__introductions__1629
NT4 sequels@__logical__continuations__1630
NT4 beginnings__1631
NT4 middles__1632
NT4 ends__1633
NT4 continuity@__uninterrupted__progressions__1634
NT4 interruptions@__interrupted__sequences__1635
NT3 collective__order__1410
NT4 togetherness@__communities@__escorts__1636
NT4 groups@__assemblies__1637
NT4 decentralization__1638
NT3 distributive__order__1411

NT4 unrelatedness@__irrelevance@__inapplicability__1573
NT4 family__relationships__1574
NT4 marital__relationships__1575
NT4 correlations@__interrelationships__1576
NT4 identity@__indistinguishability@__carbon__copy__1577
NT4 opposition@__opposites__1578
NT4 differences@__differentiations@__distinctions__1579
NT4 uniformity@__homogeneity__1580
NT4 nonuniformity@__diversification__1581
NT4 variety@__diversity__1582
NT3 partial__relation__1402
NT4 similarities@__approximations__1583
NT4 dissimilarities@__contrasts__1584
NT4 imitations@__counterfeits 1585
NT4 originality@__newness@__uniqueness__1586
NT4 representation@__reproductions__duplicates__1587
NT4 models@__patterns@__examples 1588
NT3 correspondence__of __relationship 1403
NT4 agreements@__cooperation__consensus__1589
NT4 disagreements@__inconsistencies@__incongruities__1590
NT2 quantity__1357
NT3 simple__quantity__1404
NT4 quantities@amounts__1591
NT4 degrees@__ranks@__levels@proportions__1592
NT3 comparative__quantity__1405
NT4 equality@__parity__1593
NT4 inequalities@__disparities__1594
NT4 midpoints@__mediocrity__1595
NT4 reparations@__counterbalances__1596
NT4 greatness__1597
NT4 smallness__1598
NT4 excellence@__expertise@__leadership__1599
NT4 insignificance@__incompetence@__subservience__1600
NT4 increases@__augmentations@__proliferations@__intensifications__1601
NT4 decreases@__declines@__reductions@__curtailments__1602
NT3 conjunctive__quantity__1406
NT4 addition@__annexations__1603
NT4 adjuncts@__additions@annexes__1604
NT4 subtractions@__reductions@__deletions@__amputations__1605
NT4 remainders@__balances@__leftovers__1606
NT4 mixtures@__mergers@__blends__1607
NT4 simplicity@__the__basics__1608
NT4 complexity@__complications@__entanglements__1609
NT4 connections@__junctions@__fasteners@__joining__1610
NT4 analysis@__dissections__1611
NT4 separation@__removal@__severance@__dismantlement__1612
NT4 unspecified__large__numbers__1664
NT4 fewness__1665
NT4 repetitions__1666
NT4 infinity__1667
NT2 time__1360
NT3 absolute__time__1416
NT4 time@__passage__of__time__1668
NT4 eternity__1669
NT4 intervals__of__time__1670
NT4 spells@__periods__of__duty__1671
NT4 interludes__1672
NT4 longevity@__durability__1673
NT4 transience@__short__durations__1674
NT4 perpetuity@__forever__1675
NT4 instants@__minute__durations__of__time__1676
NT4 measurement__of__time__1677
NT4 anachronisms__1678
NT3 relative__time__1417
NT4 previous__times@__formerly__1679
NT4 later__times@__afterwards__1680
NT4 simultaneity__1681
NT4 former__times@-memories@__history__1682
NT4 the__here__and__now__1683
NT4 future__times@__expectations@__prospects__1684
NT3 time__with__reference__to__age__1418
NT4 newness@__innovation__1685
NT4 the__ancient@__traditions@__archaeology__1686
NT4 childhood@__adolescence__1687
NT4 young__people@__plants@__animals@__insects__1688
NT4 age@__maturity__1689
NT4 adults__1690
NT3 time__with__reference__to__season__1419

-continued

NT4 inclusion@__involvement__1639
NT4 exclusion__1640
NT4 foreignness@__newcomers__1641
NT4 generalizations@__prevalence__1642
NT4 specifics@__uniqueness@__specifications__1643
NT4 areas__of__expertise@__experts__1644
NT3 conformity__to__rule__1412
NT4 conformity__1645
NT4 nonconformity@__nonconformity__1646
NT4 normality@__the__usual__1647

NT4 abnormality@__the__unusual__1648
NT2 number__1359

NT3 number__in__general__1413
NT4 numbers@__mathematics__1649
NT4 numeration@__assignment__of__numbers__1650
NT4 lists__1651
NT3 determinate__number__1414
NT4 unity__1652
NT4 divisions__and__multiples__of__two__1653
NT4 duplication@__repetition__1654
NT4 bisection@__halving@__dichotomies__1655
NT4 threesomes__1656
NT4 triplication__1657
NT4 trisection__1658
NT4 foursomes__1659
NT4 quadruplication__1660
NT4 quadrisection__1661
NT4 five__and__over__1662
NT3 indeterminate-number__1415
NT4 pluralities@__majorities__1663
NT2 causation__1363
NT3 causes@__effects__313802
NT4 causes@__stimuli@__explanations__1716
NT4 effects@__results@__consequences__1717
NT4 attribution@__placing__responsibility__1718
NT4 chance@__luck__1719
NT2 power__1364
NT3 power__in__general__1421
NT4 power@__force@ability__1720
NT4 ineffectiveness@__lack__of__power@power__vacuums__1721
NT4 strength@__force@__strengthening__1722
NT4 weakness__1723
NT4 energy@__vigor__1724
NT4 violence@__rage@__explosions@__extreme__measures__1725
NT4 moderation@__control__1726
NT3 power__in__operation__1422
NT4 operation@__management__making__it__work__1727
NT4 productivity__1728
NT4 nonproductivity__1729
NT4 manufacturing@__childbearing__1730
NT4 products@__creations__1731
NT4 procreation__1732
NT4 ancestry@__lineage__1733
NT4 posterity@__descendants__1734
NT3 indirect__power__1423
NT4 influence@authority__1735
NT4 lack__of__influence__1736
NT4 tendencies@__inclinations__1737
NT4 likelihood__of__occurrence@__the__odds__1738
NT4 commitments@__making__commitments__1739
NT3 combination__of__forces__1424
NT4 teamwork__1740
NT4 lack__of__teamwork@__conflicts@__interferences__1741
NT2 existence__1354
NT3 being__in__the__abstract__1396
NT4 existence@__reality__1564
NT4 nonexistence@__nothing__1565
NT3 being__in__the__concrete 1398
NT4 substantiality@__substances__1566
NT4 unsubstantiality@__intangibility__1567
NT3 formal__existence__1399
NT4 essence@__gist__1568
NT4 nonessentials@__extraneousness__1569
NT3 modal__existence__1400
NT4 status@__conditions__1570
NT4 circumstances@__occurrences__1571
TT business__and__economics NT4 seasons__of__the__year__1691
NT4 timeliness@__the__right__time__1692
NT4 untimeliness@__the__wrong__time__1693
NT4 earliness@__anticipation__1694
NT4 delays@postponements__1695
NT4 mornings@__days__1696
NT4 evenings@__nights__1697
NT3 recurrent__time__1420
NT4 common__occurrences@__the__usual@__the__expected__1698
NT4 uncommon__occurrences@__the__unusual@__the__unexpected__1699
NT4 clockwork__regularity@predictable__cycles__1700
NT4 irregularity__of__recurrence@__the__sporadic@__non-predicable__cycles__1701
NT2 change__1361
NT3 change@__states__of__change__313803
NT4 changes@__alterations__1702
NT4 permanence@__the__unchanging__1703
NT4 flexibility@__the__capacity__to__change__1704
NT4 stability@__security@__reliability__1705
NT4 continuation__of__actions__1706
NT4 cessation__of__actions__1707
NT4 changes@__switching__to__something__different__1708
NT4 reversion@__regression@__about-faces__1709
NT4 major__changes__1710
NT4 developmental__changes__1711
NT4 substitutions__1712
NT4 interchanges@__exchanges@__trading__1713
NT2 events__79925
NT3 events@__imminence__313806
NT4 events@__occurrences__1714
NT4 forthcoming__events__1715
NT3 machinery__manufacturers
NT2 industrialists__and__financiers
NT2 international__trade__and__finance
NT2 labor__and__unions
NT3 employment__agencies
NT2 manufacturing
NT2 marketing
NT2 office__products
NT1 economics
NT2 economists
NT2 finance__and__investment
NT3 banking
NT3 credit__cards
NT3 currencies
NT3 financial__news__services
NT3 insurance__industry
NT3 precious__metals__market
NT3 real__estate__industry
NT3 stocks@__bonds@__and__commodities
NT4 mutual__funds
NT5 balanced__funds
NT5 foreign__stock__funds
NT5 global__bond__funds
NT5 global__stock__funds
NT5 junk__bond__funds
NT5 municipal__bond__funds
NT5 stock__funds
NT5 tax-free__money__funds
NT5 taxable__bond__funds
NT5 taxable__money__funds
NT2 taxes__and__tariffs
TT general__classification
TT geography
NT1 cartography
NT2 explorers
NT1 political__geography
NT2 Africa
NT3 Central__Africa
NT4 Angola
NT4 Burundi
NT4 Central__African__Republic
NT4 Congo
NT4 Gabon
NT4 Kenya
NT4 Malawi
NT4 Rwanda
NT4 Tanzania -continued

```
NT1 business_and_industry
NT2 business_services_industry
NT2 commerce_and_trade
NT3 retail_trade_industry
NT4 convenience_stores
NT3 wholesale_trade_industry
NT2 consulting_industry
NT2 customer_service
NT2 corporations_and_business_practices
NT3 corporate_and_industrial_management
NT2 diversified_companies
NT2 entrepreneurship
NT2 industrial_engineering
NT3 production_methods
NT2 industrial_goods_manufacturing
NT4 Botswana
NT4 Lesotbo
NT4 Mozambique
NT4 Namibia
NT4 South_Africa
NT4 Swaziland
NT4 Zimbabwe
NT3 West_Africa
NT4 Benin
NT4 Burkina
NT4 Cameroon
NT4 Equatorial_Guinea
NT4 Gambia
NT4 Ghana
NT4 Guinea
NT4 Guinea-Bissau
NT4 Ivory_Coast
NT4 Liberia
NT4 Mali
NT4 Mauritania
NT4 Niger
NT4 Nigeria
NT4 Sao_Tome_and_Principe
NT4 Senegal
NT4 Sierra_Leone
NT4 Togo
NT2 Antarctica
NT2 Arctic
NT3 Greenland
NT3 Iceland
NT2 Asia
NT3 Central_Asia
NT4 Afghanistan
NT4 Bangladesh
NT4 Bhutan
NT4 India
NT4 Kazakhstan
NT4 Kyrgyzstan
NT4 Nepal
NT4 Pakistan
NT4 Tajikstan
NT4 Turkmenistan
NT4 Uzbekistan
NT3 East_Asia
NT4 China
NT4 Hong_Kong
NT4 Japan
NT4 Macao
NT4 Mongolia
NT4 North_Korea
NT4 South_Korea
NT4 Taiwan
NT3 Southeast_Asia
NT4 Brunei
NT4 Indonesia
NT4 Kampuchea
NT4 Laos
NT4 Malaysia
NT4 Myanmar
NT4 Papua_New_Guinea
NT4 Philippines
NT4 Singapore
NT4 Germany
NT4 Faeroe_Island
NT4 Uganda
NT4 Zaire
NT4 Zambia
NT3 North_Africa
NT4 Algeria
NT4 Chad
NT4 Djibouti
NT4 Egypt
NT4 Ethiopia
NT4 Libya
NT4 Morocco
NT4 Somalia
NT4 Sudan
NT4 Tunisia
NT3 Southern_Africa
NT4 Thailand
NT4 Vietnam
NT2 Atlantic_area
NT3 Azores
NT3 Bermuda
NT3 Canary_Islands
NT3 Cape_Verde
NT3 Falkland_Islands
NT2 Caribbean
NT3 Antigua_and_Barbuda
NT3 Bahamas
NT3 Barbados
NT3 Cuba
NT3 Dominica
NT3 Dominican_Republic
NT3 Grenada
NT3 Haiti
NT3 Jamaica
NT3 Netherlands_Antilles
NT3 Puerto_Rico
NT3 Trinidad_and_Tobago
NT2 Central_America
NT3 Belize
NT3 Costa_Rica
NT3 El_Salvador
NT3 Guatemala
NT3 Honduras
NT3 Nicaragua
NT3 Panama
NT2 Europe
NT3 Eastern_Europe
NT4 Albania
NT4 Armenia
NT4 Azerbaijan
NT4 Belarus
NT4 Bulgaria
NT4 Czech_Republic
NT4 Czechoslovakia
NT4 Estonia
NT4 Greece
NT4 Hungary
NT4 Latvia
NT4 Lithuania
NT4 Moldava
NT4 Poland
NT4 Republic_of_Georgia
NT4 Romania
NT4 Russia
NT4 Slovakia
NT4 The_Soviet_Union
NT4 Ukraine
NT4 Yugoslavia
NT5 Bosnia_and_Herzegovina
NT5 Croatia
NT5 Macedonia
NT5 Montenegro
NT5 Serbia
NT5 Slovenia
NT3 Western_Europe
NT4 Austria
NT4 Belgium
NT4 Denmark
NT4 Delaware
NT4 Florida
```

-continued

NT4 Finland
NT4 France
NT4 Iberia
NT5 Andorra
NT5 Portugal
NT5 Spain
NT4 Ireland
NT4 Italy
NT4 Liechtenstein
NT4 Luxembourg
NT4 Monaco
NT4 Norway
NT4 San_Marino
NT4 Sweden
NT4 Switzerland
NT4 The_Netherlands
NT4 United_Kingdom
NT5 England
NT5 Northern_Ireland
NT5 Scotland
NT5 Wales
NT2 Indian_Ocean_area
NT3 Comoros
NT3 Madagascar
NT3 Maldives
NT3 Mauritius
NT3 Seychelles
NT3 Sri_Lanka
NT2 Mediterranean
NT3 Corsica
NT3 Cyprus
NT3 Malta
NT3 Sardinia
NT2 Middle_East
NT3 Bahrain
NT3 Iran
NT3 Iraq
NT3 Israel
NT3 Jordan
NT3 Kuwait
NT3 Lebanon
NT3 Oman
NT3 Qatar
NT3 Saudi_Arabia
NT3 Socotra
NT3 Syria
NT3 Turkey
NT3 United_Arab_Emirates
NT3 Yemen
NT2 North_America
NT3 Canada
NT3 Mexico
NT3 United_States
NT4 Alabama
NT4 Alaska
NT4 Arizona
NT4 Arkansas
NT4 California
NT4 Colorado
NT4 Connecticut
NT3 Tuvalu
NT3 Vanuatu
NT3 Western_Samoa
NT2 South_America
NT3 Argentina
NT3 Bolivia
NT3 Brazil
NT3 Chile
NT3 Columbia
NT3 Ecuador
NT3 French_Guiana
NT3 Guyana
NT3 Paraguay
NT3 Peru
NT3 Suriname
NT3 Uruguay
NT3 Venezuela
NT1 physical_geography
NT2 bodies_of_water
NT4 Georgia
NT4 Hawaii
NT4 Idaho
NT4 Illinois
NT4 Indiana
NT4 Iowa
NT4 Kansas
NT4 Kentucky
NT4 Louisiana
NT4 Maine
NT4 Maryland
NT4 Massachusetts
NT4 Michigan
NT4 Minnesota
NT4 Mississippi
NT4 Missouri
NT4 Montana
NT4 Nebraska
NT4 Nevada
NT4 New_Hampshire
NT4 New_Jersey
NT4 New_Mexico
NT4 New_York
NT4 North_Carolina
NT4 North_Dakota
NT4 Ohio
NT4 Oklahoma
NT4 Oregon
NT4 Pennsylvania
NT4 Rhode_Island
NT4 South_Carolina
NT4 South_Dakota
NT4 Tennessee
NT4 Texas
NT4 Utah
NT4 Vermont
NT4 Virginia
NT4 Washington
NT4 Washington_D._C.
NT4 West_Virginia
NT4 Wisconsin
NT4 Wyoming
NT2 Pacific_area
NT3 American_Samoa
NT3 Australia
NT4 Tasmania
NT3 Cook_Islands
NT3 Fiji
NT3 French_Polynesia
NT3 Guam
NT3 Kiribati
NT3 Mariana_Islands
NT3 Marshall_Islands
NT3 Micronesia
NT3 Nauru
NT3 New_Caledonia
NT3 New_Zealand
NT3 Palau
NT3 Solomon_Islands
NT3 Tonga
NT3 legal_bodies
NT3 legal_customs_and_formalities
NT3 legal_judgments
NT3 legal_people
NT3 legal_proceedings
NT3 prisons_and_punishments
NT2 municipal_government
NT3 cities
NT4 cities@_towns@_and_environs
NT4 urban_phenomena
NT4 urban_structures
NT3 municipal_infrastructure
NT2 politics
NT3 elections_and_campaigns
NT3 political_parties
NT3 political_practices_and_functions
NT3 political_principles_and_philosophies
NT3 politicians_and_activists
NT3 revolution_and_subversion -continued NT3 lakes
NT3 oceans
NT3 rivers
NT2 land_forms
NT3 continents
NT3 deserts
NT3 islands
NT3 mountains
TT government_and_military
NT1 government_and_law
NT2 acts@_powers@_and_procedures
NT2 county_government
NT2 fores_and_philosophies_of_government
NT2 government_bodies_and_institutions
NT3 executive_branch
NT4 cabinet
NT4 U.S._presidents
NT3 judiciary_branch
NT4 supreme_court
NT5 chief_justices
NT5 landmark_cases
NT3 legislative_branch
NT4 house_of_representatives
NT4 senate
NT2 government_officials
NT3 famous_leaders
NT3 royalty_and_aristocracy
NT2 government_programs
NT3 social_programs
NT4 welfare
NT2 international_relations
NT3 Cold_War
NT3 diplomacy_and_diplomats
NT3 immigration
NT2 law
NT3 courts
NT3 crimes_and_offenses
NT4 substance_abuse
NT3 criminals
NT3 law_enforcement
NT3 law_firms
NT3 law_systems
NT4 constitutional_law
NT4 books
NT2 speech_communications
NT5 education
NT2 colleges_and_universities
NT3 academic_degrees
NT2 curricula_and_methods
NT2 schools
NT2 teachers_and_students
NT1 hard_sciences_and_technology
NT2 aerospace_industry
NT3 satellite_technology
NT3 space_exploration
NT4 space_explorers
NT4 spacecraft_and_space_stations
NT2 astronomy
NT3 astronomers
NT3 celestial_bodies
NT4 comets
NT4 constellations
NT4 galaxies
NT4 moons
NT4 nebulae
NT4 planets
NT4 celestial_stars
NT3 celestial_phenomena
NT2 biology
NT3 biologists
NT3 biological_evolution
NT3 biotechnology
NT4 genetic_engineering
NT5 genetics_and_heredity
NT3 botany
NT4 botanists
NT4 plant_diseases
NT4 plant_physiology
NT5 plant_parts NT2 postal_communications
NT2 public_facilities
NT2 state_government
NT1 military
NT2 air_force
NT2 armored_clothing
NT2 army
NT2 cryptography
NT2 military_buildings
NT2 military_equipment
NT2 military_honors
NT2 military_intelligence
NT2 military_leaders
NT2 military_ranks
NT3 army@_air_force@_and_marine_ranks
NT3 navy_and_coast_guard_ranks
NT2 military_wars
NT3 American_Civil_War
NT3 American_Revolution
NT3 warfare
NT3 World_War_I
NT3 World_War_II
NT2 military_weaponry
NT3 bombs_and_mines
NT3 chemical_and_biological_warfare
NT3 military_aircraft
NT3 nuclear_rockets@_and_torpedoes
NT3 nuclear_weaponry
NT3 space-based_weapons
NT2 navy
NT3 warships
NT2 service_academics
TT science@_technology@_and_education
NT1 communications
NT2 advertising_industry
NT2 journalism
NT3 broadcast_journalism
NT3 journalism
NT3 prior_journalism
NT4 newspapers
NT2 publishing_industry
NT3 printing
NT3 types_of_publications
NT6 grooming_aids
NT5 nutrition
NT6 vitamins
NT5 treatments_and_activities
NT4 healthcare_industry
NT5 medical_business_and_practices
NT5 medical_equipment_manufacturers
NT4 injuries
NT4 medical_disciplines_and_specialties
NT5 dentistry
NT5 medical_personnel
NT5 ophthalmology
NT4 medical_equipment
NT4 medical_facilities
NT4 medical_procedures
NT5 medical_diagnosis
NT6 medical_imaging
NT5 surgery
NT4 medical_treatments
NT4 pharmacology
NT5 anesthetics
NT6 general_anesthetics
NT6 local_anesthetics
NT5 antagonists_and_antidotes
NT5 antigout_agents
NT5 antimicrobials_and_antiparasitics
NT6 amebicides_and_antiprotozoals
NT6 aminoglycosides
NT6 anthelmintics
NT6 antifungals
NT6 antimalarials
NT6 antituberculars_and_antiluprotics
NT6 antivitals
NT6 cephalosporins
NT6 penicillins
NT6 quinolones

```
NT5 plant_development
NT4 plant_kingdom
NT5 ferns
NT5 mosses
NT5 non-flowering_plants
NT6 conifers
NT5 flowering_plants
NT6 cacti
NT6 grasses
NT6 deciduous_plants
NT6 palm_trees
NT6 trees_and_shrubs
NT3 ecology
NT4 conservation
NT4 environmental_pollution
NT3 health_and_medicine
NT4 afflictions_and_conditions
NT4 artificial_limbs_and_organs
NT4 carcinogens
NT4 defects_and_disabilities
NT4 diseases
NT4 dressings_and_supports
NT4 fitness_and_health
NT5 fitness_equipment
NT5 fitness_technology
NT5 grooming
NT6 vasodilators
NT5 central_nervous_system_drugs
NT6 antianxiety_agents
NT6 anticonvulsants
NT6 antidepressants
NT6 antiparkinsonian_agents
NT6 antipsychotics
NT6 cerebral_stimulants
NT6 narcotic_and_opioid_analgesics
NT6 nonnarcotic_analgesics_and_antipyretics
NT6 nonsteroidal_anti-inflammatory_drugs
NT6 sedative-hypnotics
NT5 dermatomucosal___agents
NT6 scabicides_and_pediculicides
NT6 topical_corticosteroids
NT5 digestive_system_drugs
NT6 antacids@_adsorbents@_and_antiflatulents
NT6 antidiarrheals
NT6 antiemetics
NT6 antiulcer_agents
NT6 digestants
NT6 laxatives
NT5 eye@_ear@_nose@_and_throat_drugs
NT6 nasal_agents
NT6 ophthalmics
NT7 ophthalmic_anti-infectives
NT7 ophalmic_anti-inflammatory_agents
NT7 ophthalmic_vasoconstrictors
NT7 miotics
NT7 mydriatics
NT6 otics
NT5 fluid_and_electrolyte_drugs
NT6 diuretics
NT6 electrolytes
NT5 gold_salts
NT5 hormonal_agents
NT6 androgens_and_anabolic_steroids
NT6 antidiabetic_agents_and_glucagon
NT6 corticosteroids
NT6 estrogens_and_progestins
NT6 gonadotropins
NT6 parathyroid-like_agents
NT6 pituitary_hormones
NT6 thyroid_hormone_antagonists
NT6 thyroid_hormones
NT5 immune_system_drugs
NT6 antitoxins_and_antivenins
NT6 biological_response_modifiers
NT6 immune_serums
NT6 immunosuppressants
NT6 vaccines_and_toxoids
NT5 oxytocics
NT5 pharmaceutical_industry
NT6 sulfonamides
NT6 tetracyclines
NT5 antineoplastic_agents
NT6 alkylating_agents
NT6 antibiotic_antineoplastic_agents
NT6 antimetabolites
NT6 antineoplastic_hormone_drugs
NT5 autonomic_nervous_system_drugs
NT6 adrenergic_blockers
NT6 adrenergics
NT6 anticholinergics
NT6 cholinergics
NT6 neuromuscular_blockers
NT6 skeletal_muscle_relaxants
NT5 blood_drugs
NT6 anticoagulants
NT6 blood_derivatives
NT6 hematinics
NT6 hemostatics
NT6 thrombolytic_enzymes
NT5 cardiovascular_drugs
NT6 antianginals
NT6 antiarrhythmics
NT6 antihypertensives
NT6 antilipemics
NT6 inotropics
NT4 algae
NT4 bacteria
NT4 fungi
NT5 ascomycota
NT5 basidiomycota
NT5 deuteromycota
NT5 zygomycota
NT4 viruses
NT3 physiology
NT4 anatomy
NT5 cardiovascular_systems
NT5 digestive_systems
NT5 extremities_and_appendages
NT5 glandular_systems
NT5 head_and_neck
NT6 ears
NT6 eyes
NT6 mouth_and_teeth
NT5 immune_systems
NT6 antigens_and_antibodies
NT5 lymphatic_systems
NT5 muscular_systems
NT5 nervous_systems
NT5 reproductive_systems
NT5 respiratory_systems
NT5 skeletal_systems
NT5 tissue_systems
NT5 torso
NT5 urinary_systems
NT4 cell_structure_and_functions
NT4 enzymes
NT4 hormones
NT4 reproduction_and_development
NT3 zoology
NT4 invertebrates
NT5 arachnids
NT5 crustaceans
NT5 insects
NT5 mollusks_and_aquatic_invertebrates
NT5 worms
NT4 prehistoric_animals
NT5 dinosaurs
NT4 vertebrates
NT5 amphibians
NT5 birds
NT6 accentors
NT6 antbirds
NT6 bee_eaters
NT6 birds_of_paradise
NT6 birds_of_prey
NT7 owls
NT6 blackbirds_and_orioles
NT6 bowerbirds
```

-continued

NT5 respiratory_drugs
NT6 antihistamines
NT6 bronchodilators
NT6 expectorants_and_antitussives
NT5 spasmolytics
NT5 topical_agents
NT5 toxins
NT4 veterinary_medicine
NT3 lower_life_forms
NT6 honey_eaters
NT6 honeycreepers
NT6 honeyguides
NT6 hoopoes
NT6 hornbills
NT6 hummingbirds
NT6 jacamars
NT6 jays@_crows@_and_magpies
NT6 kingfishers_and_motmots
NT6 larks
NT1 manakins
NT6 mimic_thrushes
NT6 moundbirds
NT6 nightjars
NT6 nuthatches_and_creepers
NT6 ovenbirds_and_allies
NT6 parrots_and_parakeets
NT6 penguins
NT6 pigeons_and_doves
NT6 pipits_and_wagtails
NT6 pittas
NT6 potoos
NT6 puffbirds
NT6 shrikes
NT6 silky_flycatchers
NT6 starlings
NT6 swallows
NT6 swifts
NT6 tanagers
NT6 thrushes
NT6 tinamous
NT6 titmice_and_chickadees
NT6 toucans
NT6 trogons
NT6 vireos
NT6 warblers_and_sparrows
NT6 water_birds
NT7 albatrosses
NT7 auks_and_puffins
NT7 cormorants_and_anhingas
NT7 ducks@_geese@_and_swans
NT7 frigatebirds
NT7 gannets_and_boobies
NT7 grebes
NT7 gulls_and_terns
NT7 loons
NT7 pelicans
NT7 rails@_gallinules@_and_coots
NT7 shearwaters_and_petrels
NT7 shorebirds
NT7 tropicbirds
NT7 wading_birds
NT6 waxwings
NT6 weavers_and_weaver_finches
NT6 woodcreepers
NT6 woodpeckers
NT6 wrens
NT5 fish
NT5 mammals
NT6 anteaters_and_sloths
NT7 aardvarks
NT6 bats
NT4 construction_equipment
NT4 construction_materials
NT5 paneling_and_composites
NT5 surfaces_and_finishing
NT4 construction_workers
NT4 types_of_buildings
NT5 dwellings
NT5 outbuildings
NT6 bulbuls
NT6 cotingas_and_becards
NT6 cuckoos_and_anis
NT6 dippers_and_ouzels
NT6 finches
NT6 flycatchers
NT6 frogmouths
NT6 game_birds
NT7 chickens
NT6 carnivores
NT7 cats
NT7 dogs
NT6 elephants
NT6 even-toed_hoofed_animals
NT7 cattle
NT7 goats
NT7 pigs
NT7 sheep
NT6 hyraxes
NT6 monotremes
NT6 marsupials
NT6 odd-toed_hoofed_mammals
NT7 horses
NT6 primates
NT7 lemurs
NT6 rabbits_and_hares
NT6 rodents
NT6 seals_and_walruses
NT7 manatees
NT6 whales_and_porpoises
NT5 reptiles
NT6 crocodilians
NT6 lizards
NT6 snakes
NT6 turtles
NT2 chemistry
NT3 branches_of_chemistry
NT4 chemists
NT3 chemical_constants@_theories@_and_values
NT3 chemical_elements
NT3 chemical_measures
NT3 chemical_particles_and_molecular_structures
NT3 chemical_products
NT4 chemical_explosives
NT4 plastics_and_rubber
NT4 synthetic_textiles
NT3 chemical_properties_and_reactions
NT3 chemical_tests
NT3 chemicals
NT3 chemistry_tools
NT2 civil_engineering_and_architecture
NT3 architects
NT3 construction_industry
NT4 building_components
NT5 exterior_structures
NT1 entryways_and_extensions
NT6 landscaping
NT6 ornamental_parts
NT6 roofs_and_towers
NT6 structural_framework
NT6 windows@_walls@_and_facades
NT5 interior_structures
NT6 building_foundations
NT6 building_systems
NT7 electrical_systems
NT7 fireproofing_and_insulation
NT7 plumbing
NT6 rooms
NT7 interior_structural_parts
NT7 room_parts
NT4 carpentry
NT5 coal_industry
NT5 petroleum_products_industry
NT4 nuclear_power_industry
NT2 environment_control_industries
NT3 heating_and_cooling_systems
NT3 pest_control
NT3 waste_management
NT2 explosives_and_firearms

```
NT4 types_of_construction
NT3 civil_engineers
NT3 schools_of_architecture
NT2 computer_industry
NT3 computer_hardware_industry
NT4 computer_components
NT5 computer_memory
NT5 computer_sound
NT5 microprocessors
NT4 computer_peripheralism
NT5 computer_video
NT5 data_storage_devices
NT4 types_of_computers
NT5 hand-held_computers
NT5 laptops
NT5 mainframes
NT5 personal_computers
NT5 work-stations
NT3 computer_multimedia
NT3 computer_networking
NT4 Internet_technology
NT3 computer_science
NT4 artificial_intelligence
NT4 natural_language_processing
NT3 computer_software_industry
NT4 CAD-CAM
NT4 client-server_software
NT4 computer_programming
NT5 programming_development_tools
NT5 programming_languages
NT4 databases_and_spreadsheets
NT4 document_management_and_workflow_software
NT5 desktop_publishing_and_wordprocessing
NT4 computer_viruses_and_protection
NT4 graphics_software
NT4 operating_systems
NT3 computer_standards
NT3 voice_recognition_technology
NT2 electronics
NT3 electrical_and_electronic_engineering
NT3 electronic_circuits_and_components
NT3 microelectronics
NT3 radar_technology
NT3 retail_electronics_industry
NT3 semiconductors_and_superconductors
NT3 telecommunications_industry
NT4 data_transmission
NT4 fiber_optics
NT4 voice_transmission_and_telephony
NT2 energy_industry
NT3 electric_power_industry
NT3 energy_sources
NT4 alternative_energy_sources
NT4 fossil_fuels_industry
NT3 heat_physics
NT3 motion_physics
NT3 nuclear_and_radiation_physics
NT4 subatomic_articles
NT3 optical_technology
NT4 holography
NT4 laser_technology
NT5 high-energy_lasers
NT5 low-energy_lasers
NT4 optical_instruments
NT2 textiles
NT2 tools_and_hardware
NT3 adhesives_and_binders
NT3 hand_and_power_tools
NT4 digging_and_lifting_tools
NT4 drills_and_bits
NT4 edged_and_pointed_tools
NT4 fasteners
NT4 gripping_and_tightening_tools
NT4 hammers
NT4 measuring_and_marking_tools
NT4 power_tools_manufacturers
NT4 smoothing_and_shaping_tools
NT4 wrenches
NT4 machine_tools
NT3 firearm_parts_and_accessories
NT3 recreational_firearms
NT2 geology
NT3 ages_and_eras
NT3 branches_of_geology
NT4 geologists
NT3 geologic_formations
NT3 geologic_substances
NT4 minerals
NT5 gemstones
NT4 rocks
NT5 igneous_rocks
NT5 metamorphic_rocks
NT5 sedimentary_rocks
NT3 meteorology
NT4 atmospheric_science
NT4 clouds
NT4 cyclical_events
NT4 storms
NT4 weather_modification
NT4 weather_phenomena
NT4 winds
NT3 oceanography
NT3 seismology
NT3 vulcanology
NT2 inventors
NT3 materials_technology
NT3 industrial_ceramics
NT3 steel_industry
NT4 aluminum_industry
NT4 metallurgy
NT4 steel_industry
NT3 mining_industry
NT2 mathematics
NT3 algebra_and_arithmetic
NT4 linear_algebra
NT3 calculus
NT3 geometry
NT4 analytic_geometry
NT3 math_tools
NT3 mathematicians
NT3 number_theory
NT3 statistics
NT3 symbolic_logic
NT3 trigonometry
NT2 mechanical_engineering
NT3 machine_components
NT3 robotics
NT3 types_of_machines
NT4 internal_combustion_engines
NT2 physics
NT3 acoustics
NT3 cosmology
NT3 electricity_and_magnetism
NT4 manias
NT4 phobias
NT3 psychological_tools_and_techniques
NT3 schools_and_doctrines_of_psychology
NT4 psychologists
NT3 states_and_behaviors
NT2 sociology
NT3 attitudes_and_behavior
NT3 social_movements_and_institutions
NT4 civil_rights
NT4 feminism
NT3 social_structures
NT3 social_types
NT4 senior_citizens
NT4 social_stereotypes
NT1 transportation
NT2 aviation
NT3 aircraft
NT4 aircraft_parts
NT3 airlines
NT4 airline_companies
NT3 airports
NT3 aviation_occupations
NT3 avionics_and_instrumentation
NT2 freight_and_shipping
```

-continued

NT1 social_sciences
NT2 anthropology
NT3 archaeology
NT4 ages_and_periods
NT4 prehistoric_humanoids
NT3 branches_of_anthropology
NT4 anthropologists
NT3 customs_and_practices
NT3 kinship_and_marriage
NT3 peoples
NT3 races_of_people
NT2 history
NT3 ancient_history
NT3 ancient_Rome
NT4 Roman_emperors
NT3 historians
NT3 historical_eras
NT3 U.S._history
NT4 slavery_in_the_U.S.
NT2 human_sexuality
NT2 linguistics
NT3 descriptive_linguistics
NT4 grammar
NT5 parts_of_speech
NT4 phonetics_and_phonology
NT3 historical_linguistics
NT3 languages
NT3 linguistic_theories
NT3 linguists
NT3 rhetoric_and_figures_of_speech
NT3 sociolinguistics
NT4 dialects_and_accents
NT3 writing_and_mechanics
NT4 punctuation_and_diacritics
NT4 writing_systems
NT2 psychology
NT3 psychological_disorders
NT4 Celtic_gods
NT4 Egyptian_gods
NT4 Greek_gods
NT4 Japanese_gods
NT4 Mesopotamian_gods
NT4 Norse_and_Germanic_gods
NT4 Roman_gods
NT3 myths_and_legends
NT3 utopias
NT2 philosophy
NT3 philosophers
NT3 philosophical_ideas
NT3 schools_of_philosophy
NT2 religion
NT3 doctrines_and_practices
NT3 God_and_divinity
NT3 history_of_religion
NT3 neo-Paganism
NT4 astrology
NT5 signs_of_zodiac
NT3 religious_institutions_and_structures
NT3 religious_personnel
NT3 sacred_texts_and_objects
NT3 world_religions
NT4 Christianity
NT5 Bible
NT5 Christian_denominations
NT5 Christian_heresies
NT5 Christian_theologians
NT5 evangelism
NT5 liturgical_garments
NT5 protestant_reformation
NT5 Roman_Catholicism
NT6 religious_orders
NT6 popes
NT4 eastern_religions
NT5 Buddhism
NT5 Hinduism
NT6 Hindu_deities
NT4 Islam
NT4 Judaism
NT4 sects
NT3 trucking_industry
NT3 package_delivery_industry
NT2 ground_transportation
NT3 animal_powered_transportation
NT3 automotive_industry
NT4 car_rentals
NT4 automobiles
NT4 automotive_parts
NT4 automotive_repair
NT4 motorcycles
NT4 trucks_and_buses
NT5 bus_companies
NT3 human_powered_vehicles
NT3 rail_transportation
NT4 railroad_industry
NT5 railroad_cars
NT5 railroad_jargon
NT5 railroad_personnel
NT5 trains
NT4 subways
NT3 roadways_and_driving
NT3 sleds_and_sleighs
NT2 marine_transportation
NT3 boat_parts
NT3 boats_and_ships
NT3 nautical_occupations
NT3 seamanship
NT3 waterways
TT social_environment
NT1 belief_systems
NT2 folklore
NT2 mythology
NT3 mythological_beings
NT4 mythological_creatures
NT4 mythological_humans
NT3 mythological_gods
NT4 Aztec_gods
NT4 dresses_and_skirts
NT4 pants_and_shorts
NT4 shirts_and_tops
NT4 sporting_wear
NT4 suits_and_uniforms
NT4 sweaters_and_vests
NT3 sewing_terms
NT3 undergarments
NT4 hosiery
NT4 lingerie_and_support
NT4 men's_underwear
NT4 nightclothes_and_deshabille
NT2 cosmetics
NT3 cosmetics_industry
NT3 facial_hair
NT3 hair_styling
NT2 jewelry
NT1 family
NT2 contraception_and_fertility
NT2 death_and_burial
NT3 funeral_and_burial_industry
NT2 infancy
NT2 kinship_and_ancestry
NT2 marriage_and_divorce
NT2 pregnancy_and_birth
NT2 upbringing
NT1 food_and_agriculture
NT2 agricultural_equipment
NT2 agricultural_technology
NT3 fertilizers
NT3 pesticides
NT4 fungicides
NT4 herbicides
NT2 aquaculture
NT2 cereals_and_grains
NT2 condiments
NT2 dairy_products
NT2 drinking_and_dining
NT3 alcoholic_beverages
NT4 beers
NT4 liqueurs
NT4 liquors NT1 clothing_and_appearance
NT2 clothing
NT3 clothing_accessories
NT4 belts
NT4 functional_accessories
NT4 gloves
NT3 fabrics
NT4 cloth
NT4 laces
NT4 leather_and_fur
NT3 footwear
NT3 garment_parts
NT4 garment_fasteners
NT4 garment_trim
NT3 headgear
NT4 hats
NT3 helmets_and_headdresses
NT3 neckwear
NT3 outer_garments
NT4 coats_and_jackets
NT3 seafood
NT2 nuts_and_seeds
NT2 pastas
NT2 prepared_foods
NT3 breads_and_crackers
NT3 candies
NT3 desserts
NT4 cakes
NT4 cookies
NT4 pies
NT3 pastries
NT3 sauces
NT3 soups_and_stews
NT2 ranching
NT2 soil_management
NT2 spices_and_flavorings
NT3 sweeteners
NT2 supermarkets
NT5
NT2 home_furnishings
NT3 beds
NT3 carpets_and_rugs
NT3 cases@_cabinets@_and_chests
NT3 chairs_and_sofas
NT3 curtains@_drapes@_and_screens
NT3 functional_articles
NT3 home_appliances
NT3 lamps_and_mirrors
NT3 linens_and_fabrics
NT3 ornamental_objects
NT3 stools_and_stands
NT3 tables_and_desks
NT2 kitchen
NT3 cookers
NT3 cooking
NT3 fine_china
NT3 flatware
NT3 glassware
NT3 kitchen_appliances
NT3 kitchen_utensils
NT3 pots_pans
NT3 serving_containers
NT2 hotels_and_lodging
NT1 leisure_and_recreation
NT2 arts_and_entertainment
NT3 cinema
NT4 movie_people
NT4 movie_stars
NT4 movie_terms
NT4 movie_tools_and_techniques
NT3 entertainments_and_spectacles
NT4 entertainers
NT4 theater_types
NT3 literature
NT4 authors
NT4 classical_literature
NT4 literary_devices_and_techniques
NT4 poetry
NT5 classical_poetry NT4 mixed_drinks
NT4 wines
NT5 wineries
NT3 meals_and_dishes
NT3 non-alcoholic_beverages
NT4 soft_drinks
NT2 farming
NT2 fats_and_oils
NT2 food_and_drink_industry
NT3 food_service_industry
NT3 meat_packing_industry
NT2 forestry
NT3 forest_products
NT2 fruits_and_vegetables
NT2 mariculture
NT2 meats
NT3 beef
NT3 pate_and_sausages
NT3 pork
NT3 poultry
NT5 fiction
NT6 horror_fiction
NT6 mystery_fiction
NT5 non-fiction
NT6 biographers
NT6 biographies
NT6 reference_books
NT5 satire
NT4 styles_and_schools_of_literature
NT3 performing_arts
NT4 dance
NT5 ballet
NT5 dancers_and_choreographers
NT5 folk_dancers
NT5 modern_dance
NT4 drama
NT5 drama_types
NT5 dramatic_structure
home NT5 dramatists
NT5 stage_actors
NT5 stagecraft
NT4 music
NT5 blues_music
NT5 classical_music
NT6 classical_composers
NT6 opera_and_vocal
NT5 composition_types
NT5 folk_music
NT5 jazz_music
NT5 music_industry
NT5 music_terminology
NT5 musical_instruments
NT6 keyboard_instruments
NT6 percussion_instruments
NT6 string_instruments
NT6 wind_instruments
NT7 brass_instruments
NT7 woodwinds
NT5 musicians_and_groups
NT5 popular_music_and_dance
NT3 television_and_radio
NT3 cartoons@_comic_books@_and_superheroes
NT3 science_fiction
NT3 visual_arts
NT4 photography
NT5 cameras
NT5 photographic_lenses
NT5 photographers
NT5 photographic_processes
NT5 photographic_techniques
NT5 photographic_tools
NT4 art_galleries_end_museums
NT4 graphic_arts
NT4 printing
NT5 painters
NT5 painting_tools_and_techniques
NT5 painting_types
NT5 styles_and_schools_of_art
NT4 sculpture -continued

| | |
|---|---|
| NT5 poetic_styles_and_techniques | NT5 sculptors |
| NT5 poets | NT5 sculpture_tools_and_techniques |
| NT4 prose | NT5 sculpture_types |
| NT2 games | |
| NT3 indoor_games | |
| NT4 board_games | |
| NT4 cardgames | |
| NT4 video_games | |
| NT3 outdoor_games | |
| NT2 gaming_industry | |
| NT3 gambling | |
| NT2 gardening | |
| NT3 gardens | |
| NT2 hobbies | |
| NT3 crafts | |
| NT3 pets | |
| NT2 outdoor_recreation | |
| NT3 hunting_and_fishing | |
| NT2 restaurant_industry | |
| NT2 smoking_and_tobacco | |
| NT2 sports | |
| NT3 baseball | |
| NT3 basketball | |
| NT3 bicycling | |
| NT3 bowling | |
| NT3 boxing | |
| NT3 equestrian_events | |
| NT4 horse_racing | |
| NT3 football | |
| NT3 golf | |
| NT3 hockey | |
| NT3 martial_arts | |
| NT3 motor_sports | |
| NT3 skiing | |
| NT3 soccer | |
| NT3 sports_equipment | |
| NT3 swimming_and_diving | |
| NT3 tennis | |
| NT3 track_and_field | |
| NT2 tourism | |
| NT3 places_of_interest | |
| NT3 resorts_and_spas | |
| NT3 cruise_lines | |
| NT2 toys | |

Each ontology shown in FIG. 1 contains a plurality of levels that form the hierarchical structure. For example, the "business and industry" static ontology contains three levels of concept classifications under the highest level concept, and the "economics" contain four levels of concept classifications. Generally, the static ontologies of the present invention include no more than six to ten levels. However, the number of levels in the static ontologies is not limited in the range of six to ten levels.

The actual configuration, structure and orientation of a particular ontology is dependent upon the subject matter or field of the ontology. Therefore, each ontology in the set of static ontologies of the present invention contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit combining "like" forms of knowledge with "unlike" forms of knowledge through linking of one or more static ontologies.

Although the set of static ontologies are broad to cover a wide range of concepts, they are not extremely detailed. In addition, the set of static ontologies do not contain concepts that are extremely volatile. For an example ontology, a classification for "computers", may contain a sub classification for "operating systems." However, particular types of operating systems, such as "Windows" and "OS/2", are too volatile, and therefore would not be contained in the example computer ontology. Because the static ontologies define a broad range of concepts but not in great detail, they remain relatively stable over time. Therefore, the static ontologies do not require frequent updates.

Figure 2:
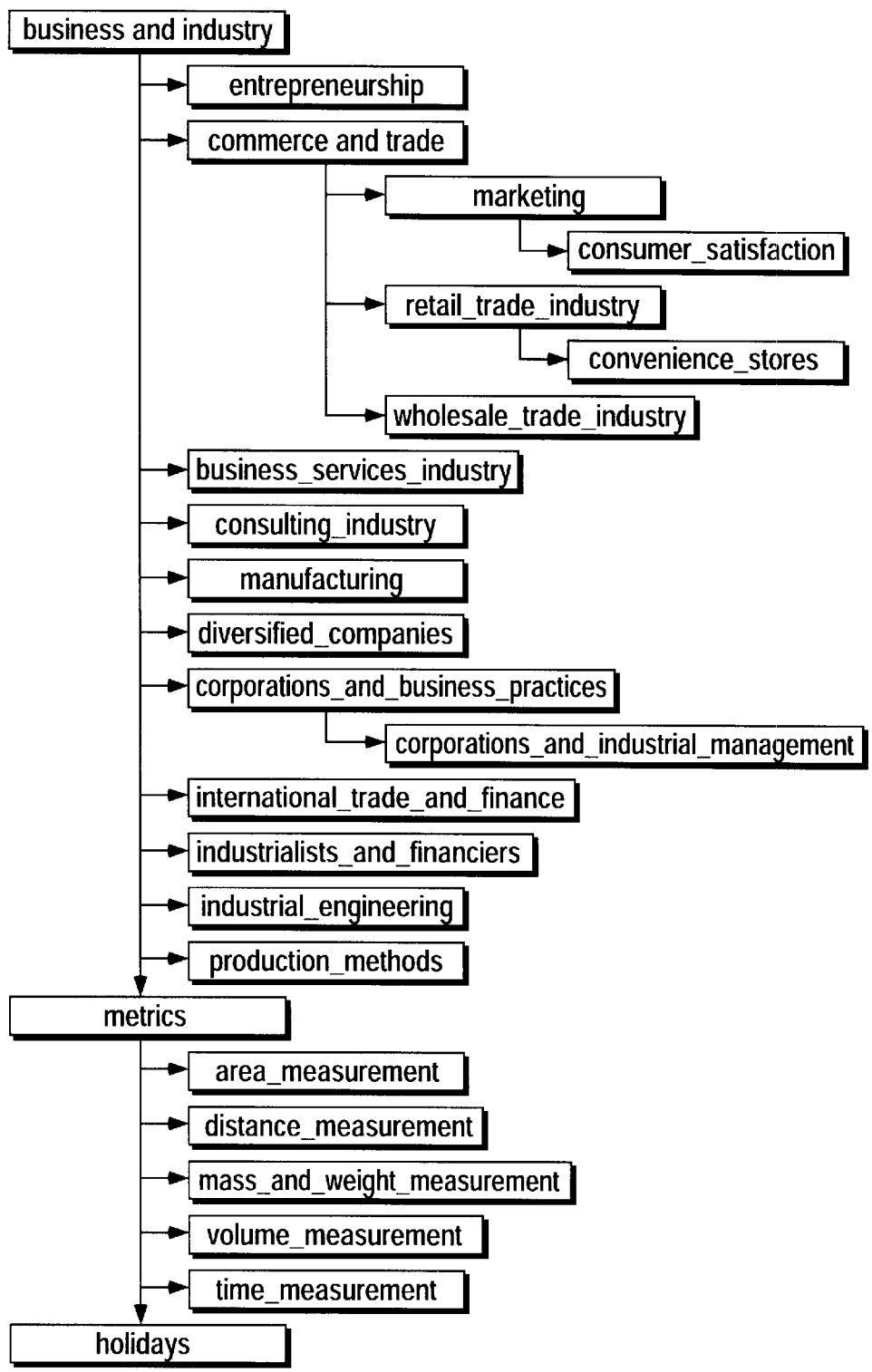
FIG. 2 illustrates an example ontology for "business and industry."

The ontologies contained within the knowledge catalog of the present invention are organized such that the concepts are independent of language and culture. Therefore, the set of static ontologies in the knowledge catalog of the present invention provide a world view of knowledge. FIG. 2 illustrates an example ontology for "business and industry." As shown in FIG. 2, the "business and industry" ontology includes a hierarchical structure of four levels. The knowledge concepts in the static ontologies are applicable to all cultures and languages. For example, in the "business and industry" ontology, the concept "commerce and trade" is a sub classification of the top level "business and industry" concept. Under the concept "commerce and trade", the ontology includes the concepts "marketing", "retail trade industry", and "wholesale trade industry." For this example, all cultures engaging in commerce and trade have concepts in marketing, retail trade industry, and wholesale trade industry. Although different words in different languages are used to describe the concepts of "marketing", "retail trade industry", and "wholesale trade industry", these concepts exist in all cultures. Therefore, the "business and industry" ontology, similar to all of the static ontologies, is not dependent on language or culture.

The "business and industry" ontology illustrated in FIG. 2 contains three levels of concepts in the hierarchical structure. With only three levels, the "business and industry" ontology does not contain too much detail by including low level concepts or words that are specific to the business and industry field. For example, an additional category for "Wallmart" may be desired to more specifically classify knowledge beyond the concept of "convenience stores." However, the concept of "Wallmart" is too detailed for the business and industry static ontology because "Wallmart" does not translate across cultures and languages. For this example, in order to classify "Wallmart", the concept is placed in a dynamic level as is explained below.

The static ontologies in the knowledge catalog are in essence a new type of book. For example, a thesaurus provides words with their linguistic connotations. However, a thesaurus does not provide real world culturally independent knowledge concepts, including both semantic and linguistic derivatives of the knowledge concepts. Also, as is explained below, the knowledge catalog of the present invention distinguishes between ambiguous and non ambiguous terminology, concrete and abstract terminology, mass and count sense, and noun and nominals. The thesaurus does not provide these important distinctions. Similarly, a dictionary, which provides definitions and origins of words, does not provide such an organization of knowledge concepts. Also, an encyclopedia, which provides detailed information on a variety of subject matters, does not provide a world view of knowledge as the knowledge catalog of the present invention.

As is explained below, one application for the knowledge catalog of the present invention is classification of documents. One implementation of the document classification application permits a user to browse through concepts in one or more ontologies that have been classified for that document. For such an application, the static ontologies contained in the knowledge catalog of the present invention permit navigation through concepts independent of language. A document classified utilizing the knowledge catalog of the present invention may be presented in any language because the concepts in the static ontologies are applicable across languages. For example, if a Japanese document were classified in the "business and industry" ontology, then an English language user could navigate through the Japanese document by viewing selected concepts in the "business and industry" ontology without ever realizing the document is in Japanese. For this example, the English language user may note that the document contains information on "marketing", and more specifically on "customer satisfaction."

Figure 3:
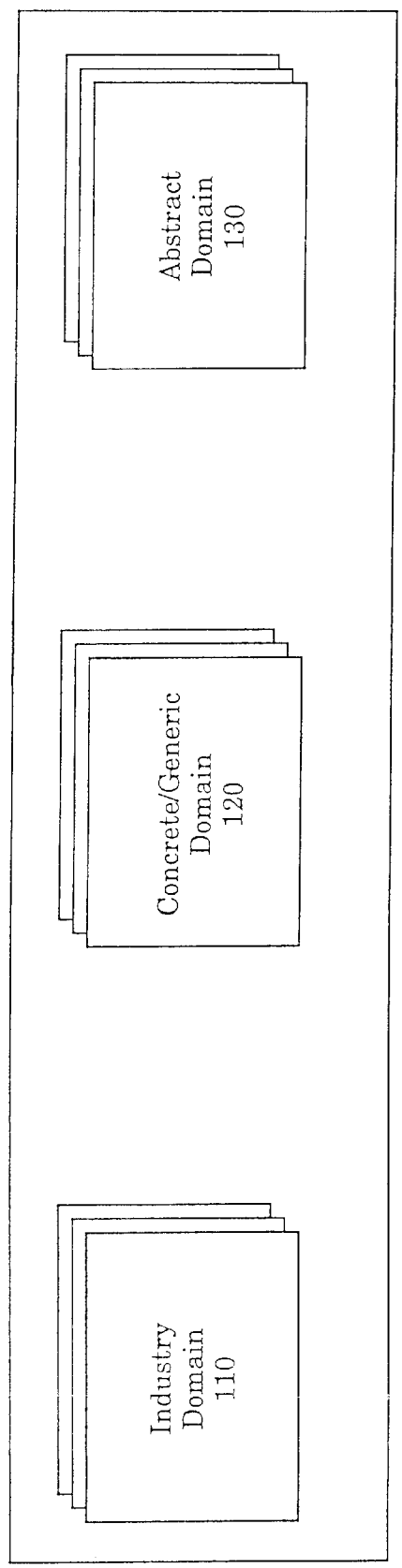
FIG. 3 illustrates a high level conceptualization for a set of static ontologies.

A high level conceptualization for a set of static ontologies are shown in FIG. 3. For this embodiment, a set of static ontologies 105 are organized in an industry domain 110, a concrete/generic domain 120, and an abstract domain 130. The industry domain 110 includes a plurality of the static ontologies to represent words that define concrete terminology specific to one or more industries or fields of study. There are different types of industry domain 110 ontologies. For example, a classification for "electronics" includes sub-classifications for "computers" and "micro electronics." Other classifications, such as "geography", are separated into two high level classifications, "political" and "physical" geography. The industry domain 110 separates the political and physical geography classifications because the concepts of political and physical geography are very different, and each classification includes different sub-classifications beneath them.

Some of the set ontologies in the industry domain 110 are not as much industries but rather concrete concepts. For example, "clothing" represents a specific concrete ontology. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

As shown in FIG. 3, for the preferred embodiment, the static ontologies 105 further include the concrete/generic domain 120 and abstract domain 130. The concrete/generic domain 120 contains static ontologies to represent knowledge concepts that have concrete definitions, but may be applicable to one or more specific industries or categories (e.g. the terms are generic). For example, the word "plant", when used to describe a manufacturing plant, is a concrete term that applies to many industries. Therefore, a classification for "plant" is located in the concrete/generic domain 120. The abstract domain 130 contains representations of words that are not concrete, but rather describe abstract concepts. For example, the concepts of "knowledge" and "methods" do not describe material items, but are "abstract" concepts. Although the present invention is described in conjunction with a specific domains (e.g. industry, concrete/generic, and abstract domains), other organizations may be used to define the static ontologies without deviating from the spirit and scope of the invention.

The static ontologies of the present invention are relational such that the linking of one or more static ontologies, or portions thereof, result in a very detailed organization of knowledge concepts. As described above, each static ontology provides a high level view of a particular subject; however, linking or cross referencing among two or more static ontologies results in many combinations of knowledge hierarchical structures. For example, for the static ontologies shown in FIG. 1, if a particular classification included concepts in "business and industry" and "economics", then the combination of the "business and industry" and "economics" ontologies provides seven hierarchical levels for that classification. Therefore, the parallel and independent nature of static ontologies, when linked or cross referenced, provides an extremely detailed and comprehensive coverage of knowledge concepts. In order to provide a complete classification hierarchy without cross referencing the independent and parallel ontologies of the present invention, it would require developing a hierarchy that anticipated every combination of knowledge concepts. As can be realized, if this approach is taken for each subject, then setting forth every conceivable breakdown becomes impossible. The groupings of independent and parallel ontologies provide a relational knowledge catalog.

The parallel and independent ontologies of the present invention allow for the greatest amount of flexibility in developing a detailed classification breakdown. For example, a first ontology may include a concept for "geography", and a second ontology may include a concept for "computers." Geography and computers are very different topics, and seemingly unrelated. The "geography" and the "computers" concepts are located in different ontologies due to the very different nature of the subject matter.

However, the cross referencing of the "geography" and the "computers" ontologies permits linking the two different subject matters. For example, for the document classification application, a document may be about how different computers are used in different geographical areas.

Figure 4:
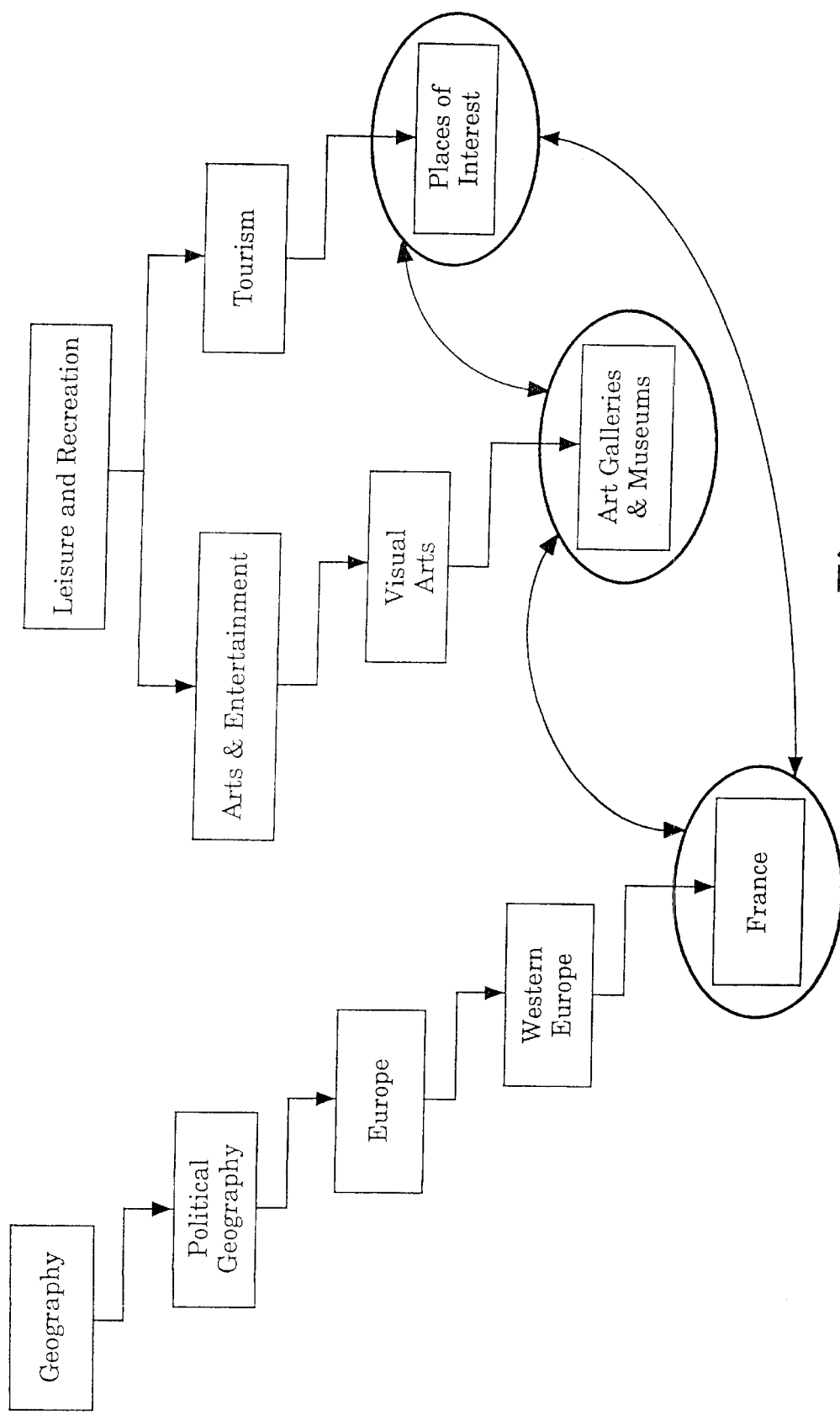
FIG. 4 illustrates two static ontologies for classifying an example input discourse.

The following example illustrates the use of cross referencing or cross linking ontologies to generate a very detailed hierarchical classification. The following example illustrates classifying a document on travel or tourism, and more specifically on traveling to France and visiting museums. For a non-relational hierarchical system (e.g. one that does not contain parallel and independent ontologies), the classification system includes travel or tourism as a high level topic, and the entire geographical regions of the world underneath the travel topic. Furthermore, underneath each of the geographical regions, a list of activities for each of them would be required. FIG. 4 illustrates two static ontologies for classifying the above example. As shown in FIG. 4, a separate "geography" ontology includes the sub classifications for "political geography", "Europe", "Western Europe", and "France." To further classify the concepts, the "leisure and recreation" ontology includes sub classifications for "tourism" and "places of interest", as well as for "arts and entertainment", "visual arts", and "art galleries and museums." As shown by the arrows in FIG. 4, by linking or cross referencing the concepts "France", "art galleries and museums", and "places of interest", these two static ontologies classify information on traveling to France, and visiting art galleries and museums.

Other classification systems do not provide the level of detail provided by cross referencing the concepts in the ontologies of the present invention. For example, the Library of Congress classifies documents based on an average of nine or ten levels of sub classifications within a particular area, topic or field of study. In the preferred embodiment of the static ontologies, the average number of levels in a hierarchical ontology is approximately five or six. As illustrated by the above example, the knowledge catalog is actually much more detailed than a nine or ten level system, such as the classification system utilized by the Library of Congress. Through use of cross referencing and linking, three static ontologies, containing six levels each, linked together generate eighteen levels of hierarchical structure. Therefore, the knowledge catalog is much more detailed than other classification systems.

The hierarchically structured concepts contained within the static ontologies may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. The knowledge catalog of the present invention provides the framework or structure to generate hierarchical classifications including both semantic derivatives and/or linguistic derivatives of high level concepts. Utilizing the static ontologies of the present invention, a knowledge map may be generated that links both concepts representing articles placed within a house and concepts representing types of houses to the higher level "house" concept. Consequently, the flexibility provided by the structure of the knowledge catalog permits generation of a true knowledge map.

DYNAMIC LEVEL

The words used in to describe an industry are dynamic such that new words and terminology are constantly be added to convey new concepts relating to the industry. For example, in the computer industry, new terminology is developed to describe new emerging concepts. In order to accommodate this, the knowledge catalog of the present invention includes a detailed coverage of concepts through use of a dynamic level. As discussed above, the static ontologies represent a world view of knowledge by including a broad, but not extremely detailed, coverage of knowledge concepts. The dynamic level adds details for the knowledge catalog 100 by including additional words and terminology to permit a detailed and in-depth coverage of specific concepts contained in a particular discourse. Therefore, additional detailed concepts not contained in the static ontologies are contained in the dynamic level.

Although the static ontologies are not extremely detailed, they provide enough context to expand the static ontologies into the dynamic level. In general, the dynamic level learns words and terminology in relationship to the static ontologies. In this way, detailed concepts and terminology are mapped from the static ontologies into the dynamic level. Specifically, the dynamic level attaches words to the static ontologies, and enables learning of specific words and terms from a given input discourse. The specific words and terms are used to further describe and define the higher level concepts. Therefore, the world view of the knowledge catalog 100 is completed in detail through the use of the dynamic level.

Figure 5:
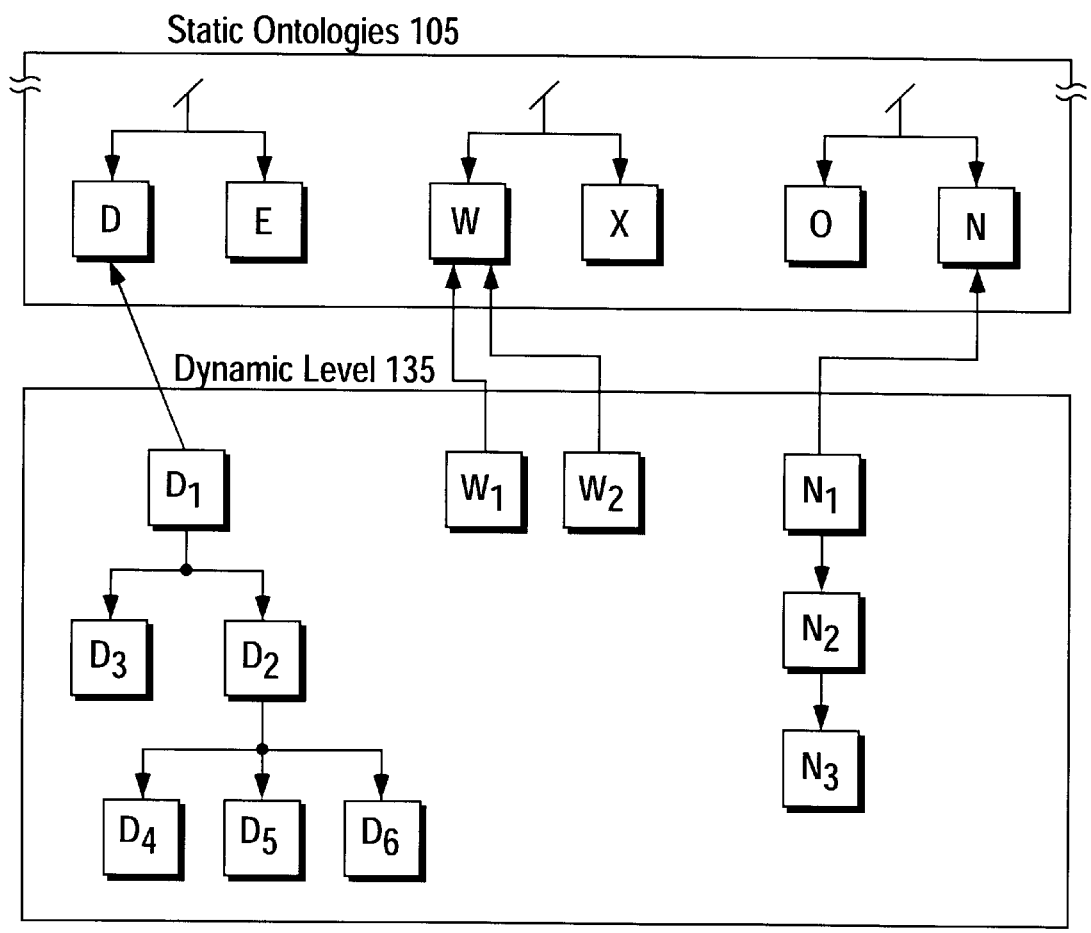
FIG. 5 illustrates an example of expanding static ontologies into a dynamic level.

FIG. 5 illustrates an example of expanding static ontologies 105 into a dynamic level 135. For the example illustrated in FIG. 5, the static ontologies 105 contain a plurality of concepts, such as concepts "D", "E", "W", "X", "O", and "N." The dynamic level 135 is expanded such that the concept "D" is expanded into the sub classifications $D_1$, $D_2$, $D_3$, $D_4$, $D_5$, and $D_6$. Similarly, for the concept "W" is expanded to include additional sub classifications $W_1$ and $W_2$, and the concept "N" is expanded to include additional sub classifications $N_1$, $N_2$, and $N_3$.

For purposes of explanation, the static ontologies 105 may be characterized as including classifications or topics found in a bookstore. For this analogy, the dynamic level 135 may be characterized as concepts and information found within the index of books. For example, to find a book on semiconductor manufacturing plants in a bookstore, one first searches to locate books in the general categories of electronics or semiconductors instead of searching under the category of plants. To specifically locate information on semiconductor manufacturing plants, the index of books in the electronic and semiconductor category are searched.

A single static representation that attempts to cover all categories of knowledge in great detail requires constant updating to keep up with the dynamic nature of industry terminology. As discussed above, the static ontologies provide the basic framework for which the concepts in the dynamic level may be expanded. The division of knowledge catalog 100 into the set ontologies 105 and the dynamic level 135 results in a comprehensive yet manageable means to represent knowledge.

The knowledge catalog 100 of the present invention does not require frequent updating because the concepts defined in the set ontologies 105 change infrequently. In addition, the introduction of new terminology is automatically defined in the dynamic level 135 and subsequently linked into the set ontologies 105. The levels of detail in the dynamic level 135 are adaptable. Also, if the static ontologies 105 and dynamic level 135 were combined, it would be easy to lose the content in such a long and complex static hierarchical structure. Furthermore, the knowledge catalog 100 of the present invention separates the abstract with the concrete, without such a distinction, the hierarchical classifications would become extremely confusing.

The following describes generating the dynamic level in accordance with one embodiment of the present invention.

DYNAMIC CLASSIFICATION SYSTEM

In general, a dynamic classification system receives input discourse, and generates, as output, a dynamic classification index. The classification index contains hierarchical knowledge representations of the input discourse integrated to the static ontologies. The dynamic classification system contains a morphology section coupled to a linguistic engine. The linguistic engine receives the input discourse for processing. In general, the linguistic engine processes the input discourse by analyzing the grammatical or contextual aspects, as well as the stylistic and thematic attributes of the input discourse. Specifically, the linguistic engine generates contextual, thematic, and stylistic tags that characterize the input discourse. The linguistic engine generates a structured output containing, in part, the contextual, thematic, and stylistic tags. Furthermore, the linguistic engine extracts the topic and content for each sentence in the input discourse.

The morphology includes a lexicon and the knowledge catalog of the present invention. In general, the lexicon contains definitional characteristics for a plurality of words and terms. For example, the lexicon defines whether a particular word is a noun, a verb, an adjective, etc. The linguistic engine utilizes the definitional characteristics stored in the lexicon to generate the contextual, thematic, and stylistic tags in the structured output. The generation of thematic tags is described more fully below. A document entitled "Lexicon Documentation", provides a description of the definitional characteristics in accordance with one embodiment. The "Lexicon Documentation" is incorporated herein by reference.

The dynamic classification system further includes a knowledge catalog processor, theme vector processor, and content indexing processor. The knowledge catalog processor, theme vector processor and content indexing processor are coupled to the lexicon and knowledge catalog. In general, the knowledge catalog processor receives, as inputs, the structured output including the extracted content, the knowledge catalog, and the lexicon, and processes the extracted content for use with the knowledge catalog. The theme vector processor receives, as inputs, the structured output, the processed output from the knowledge catalog processor, the knowledge catalog, and the lexicon. The theme vector processor identifies the most important themes in the input discourse, and maps these themes into the knowledge catalog.

The content indexing processor receives as inputs, the definitional characteristics in the lexicon, the structured output, and theme information from the theme vector processor. The content indexing processor, in accordance with the dynamic classification system of the present invention, extends the static ontologies into the dynamic level based on the specific terminology contained in the input discourse. Furthermore, the content indexing processor attaches the dynamic level terminology into the concepts in the static ontologies 105 that were mapped by the theme vector processor.

As described above, the knowledge catalog describes all senses for a particular word or term. In a preferred embodiment, the content and topic of sentences is extracted in the linguistic engine, and is input to the knowledge catalog processor in the form of content carrying words. The dynamic classification system only operates on the content carrying words for which the sense has been determined with a large degree of certainty (e.g. the non ambiguous content carrying words). After determining the sense of content carrying words, the dynamic classification system determines the expressions of content for the input discourse.

The dynamic classification system may be implemented in either hardware or software. For the software implementation, the dynamic classification system is software that includes a plurality of computer executable instructions for implementation on a general purpose computer system. Prior to loading into a general purpose computer system, the dynamic classification system software may reside as encoded information on a computer readable medium, such as a magnetic floppy disk magnetic tape, and compact disc read only memory (CD - ROM). In one hardware implementation, the linguistic engine, the knowledge catalog processor, the theme vector processor and the content indexing processor may each comprise dedicated processors including processor instructions for performing the functions described herein. Circuits may also be developed to perform the functions described herein. The lexicon and the knowledge catalog may be implemented as databases stored in memory for use by the dynamic classification system 200.

The sense of content carrying words in the input discourse are determined. For all words in which the sense has been determined, the relative importance of these words, with respect to each other, are determined. Based on the relative importance, the words are mapped to the static ontologies to reflect the high level or general concepts disclosed in the input discourse. Based on words contained in the input discourse, the static ontologies are expanded to include dynamic ontologies that contains more detailed concepts. The static ontologies and the dynamic ontologies provide a detailed world view of knowledge. The input discourse is dynamically classified using the static and dynamic ontologies.

In general, the concepts mapped to the static and dynamic ontologies capture the overall world view content classification of the input discourse. However, through discourse of a document, a combination of the abstract expressions of the knowledge catalog elements represent the actual content of the particular document. Therefore, the concepts from the static ontologies are an abstract representation of input discourse themes in time. The combination of these themes in time represent the actual content of the input discourse.

The knowledge catalog processor processes content carrying words for use by the theme vector processor. Specifically, the knowledge catalog processor generates the noun or nominal forms of the content carrying words in the input discourse. The knowledge catalog processor parses the knowledge catalog 100 to compare the content carrying words with the knowledge concepts stored in the static ontologies. If the content carrying word is not contained in at least one domain in the static ontologies, then the word is noted as being not yet understood. If the word is stored more than once in the static ontologies, then the word is classified as ambiguous. If the word is stored only once in the static ontologies, then the word is classified as non ambiguous. If a word is classified as non ambiguous, then the theme vector processor determines the concept of the word from the static ontologies. In a preferred embodiment, a minimum of 50% of the content carrying words must be recognized as non ambiguous.

As discussed above, the knowledge catalog processor generates noun and nominal forms of content carrying words for look-up in the knowledge catalog. In order to accomplish this, the knowledge catalog processor reads the grammatical tags in the structured output to determine which words are the content carrying words. The contextual tags determine whether a word carries content. For example, the word "will" could be an auxiliary verb or it could be a noun (e.g. a legal term). As an auxiliary verb, the word "will" carries no content. Using the content carrying words, the knowledge catalog processor separates nouns and non nouns. The non noun content carrying words, such as adjectives, adverbs, and verbs, etc., are converted into nouns or nominal forms. For example, the verb "fishing" is converted to "to fish." The content carrying nouns are further analyzed to determine whether the word has a mass sense and/or a count sense. For example, the word "baseball", which is the mass sense of the word, has a completely different meaning than the count sense "baseballs."

In the preferred embodiment, because the noun sense of a word may be different than the nominal sense, and the mass sense may be different than the count sense, a separate classification or tree attachment exists for nominal and noun forms as well as for mass and count senses. Therefore, the knowledge catalog 100 stores all possible senses of a content carrying word. For example, the noun "a fish" has a different meaning than the verb "fishing" which was nominalized to "to fish." Based upon the above criteria, every content carrying word contains up to four potential pointers into one or more categories in the static ontologies. Specifically, each content carrying word may contain a pointer to the static ontologies 105 for the noun form, the nominal form, the mass sense, and the count sense.

In addition to nouns and regular content carrying words discussed above, words in the input discourse may also be characterized as special words. These special words include orienters and global classifiers. Orienter words guide the reader to a field of study regardless of the use of the word. A global classifier word carries the essence of a particular category, wherein the category may include sub categories beneath the category defined by the global classifier. In generating the pointers to the static ontologies, if there is not a concept for the nominal, then the concept of the noun is attached to the concept of the nominal. The special words may be mapped directly into the static ontologies.

After the sense of a majority of the content carrying words has been determined, the dynamic classification system maps key content carrying words into the static ontologies. In order to accomplish this, the theme vector processor determines the relative importance of content carrying words in relationship to other content carrying words. The most important content carrying words are mapped to the knowledge catalog elements in the static ontologies 105.

For purposes of explanation, the static ontologies of the knowledge catalog have three classification hierarchies. Specifically, the database element "A" represents the highest level for the classification hierarchy, and the database element "B" and "C" are sub classifications of "A." Also, the classification hierarchy includes sub classifications "D" and "E" linked to the database element "C." Furthermore, the classification hierarchies contain the database elements "U" and "L", respectively, as the high level classifications.

The theme vector processor receives, as an input, the structured output that contains contextual and thematic tags. In addition, the theme vector processor receives the definitional characteristics from the lexicon. With this information, the theme vector processor executes a plurality of heuristic routines to generate the relative importance of content carrying words in the input discourse. The theme vector processor only operates on non ambiguous content carrying words or ambiguous words that have been disambiguated. In a preferred embodiment, the theme vector processor generates a theme strength based on the output of the heuristic routines. The theme strength of a particular content carrying word is then used in conjunction with the theme strength of another word to generate a ratio of relative thematic importance between all words.

A theme vector output illustrates several relative theme strengths for a number of words in an example input discourse. A ninth word "W9" received a relative weight of 35, and the first word "W1" received a relative weight of 27. Therefore, "W9" has a relative importance of 35/27 in relationship to "W1." The theme vector processor links the most important content carrying words into the ontologies of the static ontologies. As discussed above, the theme vector processor only operates on non ambiguous content carrying words. Therefore, the content carrying words are directly mapped into the database elements of the static ontologies. For this example, the most important word, "W9", has the "D" concept, and therefore is mapped to the "D" knowledge concept in the static ontologies. Note that for this example, the three most important words tie into the ontologies in three separate classification hierarchies. Accordingly, the theme vector processor determines that the three most important concepts in the input discourse are "D", "W", and "N".

In a preferred embodiment, the theme vector processor uses the sixteen most important words of each sentence to map the concepts into the static ontologies. If the input discourse consists of a single paragraph, the sixteen concepts are more than enough to capture the content of the document. For a larger document consisting of many paragraphs, the sixteen most important concepts captures the verbal content, and extending beyond the sixteen concepts typically only reinforces the high level concepts that were deemed most important.

After the most important concepts are mapped into the static ontologies, the content indexing processor expands additional concepts into the dynamic level of the knowledge catalog. In general, the content indexing processor learns how to use content for tie-ins. Terms that fall within the concrete/generic domain and abstract domain are not learned, only terms falling within the industry domain are learned. For example, in a document containing the word "bear", the content indexing processor determines that the sense of bear was used as an animal. Accordingly, the term is attached from the dynamic level up into the animal category in the static ontologies.

The following illustrates an example of expanding the static ontologies into the dynamic level. The content indexing processor receives, as inputs, contextual and thematic tags from the structured output as well as the output of the theme vector processor. From this information, the content indexing processor generates the dynamic classification hierarchies. This example extends the conceptualize example static ontologies discussed above. The knowledge concept "D" is expanded into the sub classifications $D_1$, $D_2$, $D_3$, $D_4$, $D_5$, and $D_6$. Similarly, for the knowledge concepts "W" and "N", the content indexing processor generates additional sub classifications.

THEME PARSING OVERVIEW

As discussed above, the dynamic classification system utilizes the contextual tags stored in the structures output. In one embodiment, the linguistic engine generates the contextual tags via a chaos loop process. A document, entitled "Chaos Processor for Text", contains an explanation for generating contextual or grammatical tags. The document "Chaos Processor for Text" is incorporated herein by reference. All words in a text have varying degrees of importance in the text, some carrying grammatical information, and others carrying the meaning and content of the text. In general, the chaos loop process identifies, for words and phrases in the input discourse, grammatical aspects of the input discourse including identifying the various parts of speech. In order to accomplish this, the chaos loop process ascertains how the words, clauses and phrases in a sentence relate to each other. By identifying the various parts of speech for words, clauses, and phrases for each sentence in the input discourse, the context of the input discourse is defined. The chaos loop process stores information in the form of the contextual tags. For a detailed explanation of the contextual or grammatical tags, seethe document, entitled "Analysis Documentation." The document "Analysis Documentation" is incorporated herein by reference.

The theme vector processor also utilizes the thematic tags stored in the structures output. Each word carries thematic information that conveys the importance of the meaning and content of the input discourse. In general, the thematic tags identify thematic context of the input discourse, such as text. Each word is discriminated in the text identifying the type of importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria define which of the discriminated words are to be selected for each thematic analysis unit. The text is then output in a predetermined thematic format.

In addition to the grammatical tags and thematic tags, the structured output also includes outputs for extracted topics, kernel sentences, and extracted content. The knowledge catalog processor utilizes these output areas to generate the content carrying words found in the input discourse. The linguistic engine further includes a topic extractor, that identifies the topics of the input discourse, a kernel generator, that generates summarized versions of the input discourse, and a content extractor that identifies key content of the input discourse. In addition, Appendix A, entitled "Theme Parser Code" contains a source code listing for implementing the Theme Parser. Appendix B, entitled "Code Headings", contains a list of defined source code headers corresponding to the theme parser source code of Appendix A.

THEME VECTOR PROCESSING

As discussed above, the theme vector processor identifies the most important theme terms and theme concepts for the input discourse for use by the dynamic classification system of the present invention. In order to generate the theme vector output, the theme vector processor receives thematic tags and contextual tags from the structured output. In addition, the theme vector receives the content carrying words from the knowledge catalog processor. The content carrying words may include single words or phrases. Note that the content carrying words output from the knowledge catalog processor are converted to the noun or nominal form. In turn, the theme vector processor generates a theme vector output. In a preferred embodiment, the theme vector output contains, for each theme term, an importance number (#), a theme strength, and a theme concept.

The theme vector output presents a thematic profile of the contents of input discourse (e.g. a sentence, paragraph, or document). The theme vector output contains a list of nominalized words that represent the major themes in the input discourse. In a preferred embodiment, the theme vector output includes up to sixteen of the most important themes for each sentence, paragraph and document. A theme term in a theme vector is typically based on an actual word or phrase that is contained in the text of the input discourse, or a nominal or plural form of a word. However, the word defining the theme concept may not appear in the input discourse. Instead, the theme concept is conceptualized from the theme term as set forth in a particular ontology stored in the knowledge catalog.

In a preferred embodiment, each theme in the theme vector output is assigned a normalized or relative theme strength. The normalized theme strength is calculated using the theme strengths of each theme term in the text that contribute to the particular theme. At the sentence level, the theme vector processor calculates a theme strength for each word in the sentence. The theme strength of the word measures the thematic weight of the word within the context of the sentence in which it appears. Prior to processing, each word receives a default theme strength that varies depending upon the word. As the theme vector processor analyzes the surrounding text in the sentence to determine the thematic role of the word, it increases or decreases the default theme strength for the word. For example, a theme grading determines how each word in a sentence is functioning within the context and structure of the sentence. The theme grading assigned to a word affects the theme strength for the word.

In the preferred embodiment, the theme vector processor executes a plurality of heuristic routines to generate the theme strengths for each theme. Appendix C, entitled "Theme Vector Code", contains a source code listing for implementing theme vector processing in accordance with one embodiment. Although the generation of the theme strengths is disclosed as computer source code, the theme strengths may be generated by any means, such as through a hardware implementation, without deviating from the spirit or scope of the invention. Thus, a theme vector identifies the 16 strongest themes in a sentence, paragraph or document in proportion to the sentence, paragraph or document for which the theme vector output is generated.

The theme vector processor returns the concept, if one exists, for each theme term in the theme vector. Similar to the theme terms, the theme concepts in the theme vector output contain a theme strength. As the theme vector processor identifies themes that have the same concept in the input discourse, the theme strength for the theme concept increases. This indicates that the theme concept is significantly developed in the input discourse. As a result, the theme vector processor may promote the theme concept to a separate theme in the theme vector output for the corresponding input discourse. For example, if the theme vector processor determines that "printing press" is one of the theme terms in a paragraph, then the theme concept "printing" is assigned to the theme term "printing press." In addition, the theme vector processor assigns a theme strength to the theme concept. The theme vector processor increases the theme strength for "printing" if the paragraph contains other words such as "bold face" and "typesetting", that conceptualize to "printing." The theme concept "printing" may then appear as a theme term for the paragraph, along with its own theme concept, "publishing industry." In a preferred embodiment, the theme vector processor includes input adjustments (not shown) to prevent promoting theme concepts in a theme vector output to additional theme terms.

The following example illustrates a theme vector output generated by the theme vector processor for input discourse, such as a paragraph. The example paragraph is from a document about commercial banks lowering interest rates based on changes to the Federal funds rate.

> Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 1 illustrates the theme vector output for the example paragraph. As shown in Table 1, for each theme term the theme vector output includes a theme strength and a theme concept.

TABLE 1

| # | Theme Strength | Theme Terms | Theme Concept |
|---|---|---|---|
| 1 | 43 | banking | finance and investment |
| 2 | 25 | basis points | stocks, bonds, and commodities |
| 3 | 24 | treasury bill yields | banking |
| 4 | 22 | stocks, bonds, and commodities | finance and investment |
| 5 | 22 | points | stocks, bonds, and commodities |
| 6 | 21 | yields | banking |
| 7 | 17 | bills | bills |
| 8 | 12 | federal funds rates | banking |
| 9 | 11 | reductions | banking |
| 10 | 10 | rates | banking |
| 11 | 9 | discount equivalent rates | commerce and trade |
| 12 | 9 | three-month | three-month |
| 13 | 8 | 1-year | 1-year |
| 14 | 8 | rates | commerce and trade |
| 15 | 7 | discounts | commerce and trade |
| 16 | 7 | equivalents | equivalencies |

Based on the theme strength, the theme terms are listed in the order of importance or strength in the paragraph. Table 2 illustrates a portion of an ontology for "economics", and Table 3 illustrates a portion of an ontology for "business and industry." For this example, the theme vector processor maps the theme terms to the above ontologies. This example illustrates the fact that a theme vector output may contain words that are not in the original input discourse. For example, the theme term "basis points" is conceptualized by the theme vector processor to "stocks, bonds, and commodities." The term "stocks, bonds, and commodities" does not appear in the original input example. The theme vector processor also determines that the theme concept "stocks, bonds, and commodities" is developed significantly enough to be designated as the fourth most important theme for the paragraph.

TABLE 2

Economics
    Finance & Investment
        Banking
        Stocks, Bonds, Commodities

TABLE 3

Business & Industry
    Commerce & Trade

If a theme concept becomes a theme term in the theme vector output, the higher level category from the corresponding ontology is returned as a theme concept. For example, the concept of "banking" is categorized under "finance and investment." If "banking" is a theme concept in the theme vector output, but is also promoted to a theme concept in the theme vector output, then "finance and investment" is returned as the theme concept in the theme vector output.

DYNAMIC CLASSIFICATION

The lower level concepts contained in the input discourse, which are not contained in the static ontologies 105, are classified for the dynamic level 135 (FIG. 5). The classification in the dynamic level 135 may include several independent and unrelated concepts. Once the lower level theme concepts are generated in the dynamic level 135, these lower level concepts are mapped into the higher level concepts previously mapped in the static ontologies 105. Furthermore, the content indexing processor generates cross references in the dynamic level 135 to reference independent concepts found in the static ontologies 105 or dynamic level 135.

The content indexing processor receives high level theme concepts from the theme vector processor. In the preferred embodiment, the static ontologies 105 and dynamic level 135 are based on noun concepts. Based on the grammatical tags and thematic tags, the content carrying words in the input discourse are identified. The head words represent all content carrying words in the input discourse. Generally, all nouns contained in the input discourse are candidates for head words. The content indexing processor utilizes grammatical and thematic tags to determine nouns that contain little or no content value. For example, the noun "copies", without any additional support, carries little content alone. Therefore, if a noun is characterized as "weak" from the grammatical or thematic tags, then the noun is not utilized as a head word.

At this point, the content indexing processor generates a plurality of head words, wherein each head word carries content. For each head word, at least one contextual relationship is noted. In a preferred embodiment, the context for each head word is listed hierarchically such that a second contextual relationship to the head word is a more detailed relationship than the first contextual relationship for that head word. From these contextual relationships, the content indexing processor develops the dynamic set. Specifically, the dynamic hierarchies are generated based on head words and contextual relationships to the head word. After developing the dynamic hierarchies, the content indexing processor maps the dynamic hierarchies into the static ontologies forming the world view when complete for all documents. In this way, the dynamic classification system of the present invention classifies the theme concepts presented in the input discourse in the static ontologies 105 and dynamic level 135.

The following indented paragraphs contain an example input discourse for the dynamic classification system. The content of the text is provided as an example only.

> Computers execute computer software programs to provide functionality. In general, computer software programs include applications programs and operating systems. Examples of computer operating systems include UNIX, Windows and OS/2 operating systems. The OS/2 operating system is a proprietary operating system developed by International Business Machines (IBM) Corporation. In general, the OS/2 operating system may be installed on a variety of computer system platforms.

Windows applications, which are directly compatible for use with the Windows operating systems, are not directly compatible for use with the OS/2 operating system. However, due to the large amount of Windows applications software currently available, ways of converting Windows applications for direct compatibility with the OS/2 operating system are under current development.

In recent years, software patents have become increasingly more popular in the computer industry. Due to the potential commercial value of the Windows applications, applications for OS/2 software patents, which cover methods of converting Windows applications for use with the OS/2 operating system, will be made.

The preceding example paragraphs are input to the linguistic engine for generation of the grammatical, stylistic, and thematic tags. The grammatical, stylistic, and thematic tags are provided in the structured output for access in content processing. The knowledge catalog process is executed, and the results are input to the theme vector processor. The theme vector processor generates the high level theme concepts contained in the input discourse. For the example input discourse, the high level theme concepts in the first two paragraphs include "computers", "software", and "operating systems." Also, the example input discourse refers to specific operating systems, namely UNIX, OS/2, and Windows. Furthermore, in the third paragraph of the example input discourse, the main theme is "patents", including methods of converting Windows applications to OS/2.

The theme vector processor maps the high level concepts extracted from the example input discourse into the static ontologies. For the example input discourse, the industry domain 110 contains two separate ontologies, wherein a first ontology is for "computers", and the second ontology is for "law." For this example, the specific level of detail concludes at a fairly high level. For example, for the classification "computers", three levels of sub classifications are provided: software, operating systems, and specific operating systems. For this ontology, the theme concepts "computers", "software", "operating systems", "UNIX", "OS/2", and "Windows" map into the static ontologies. However, if the level of depth in the static ontology only included up to the level of "operating systems", then all high level theme concepts up to and including operating systems are mapped. The high level theme concept "patents" is mapped into the "law" ontology. For the abstract theme concepts located in the abstract domain 130, the theme vector processor maps the concepts "ways" and "methods."

The content indexing processor generates, for the example input discourse, a list of head words that represent the content carrying words in the three paragraphs. Table 4 is a dynamic classification index generated from the example input discourse. The dynamic classification index includes a list of head words generated from the example input discourse. The head words listed in the dynamic classification index of Table 4 are located in each entry at the left margin (e.g. the head words are not indented). As discussed above, the head words are the content carrying words contained in the example input discourse.

As shown in Table 4, for certain head words, the content indexing processor generates one or more contextual relationships to that head word. For example, for the head word "applications", the content indexing processor generates the contextual relationships "for OS/2 software" and "Windows." The contextual relationships generated for the head words are hierarchical such that a first contextual relationship indicates the highest level contextual relationship to the head word, and subsequent contextual relationships indicate more specific contextual relationships for both the head word and the higher level contextual relationship. For the example "applications" head word, "Windows" is a first level contextual relationship and "methods for converting for use" is a second level contextual relationship. For this example, "Windows" is one context in which the head word "applications" refers to in the example input discourse (e.g. the example input discourse refers to Windows applications). More specifically, Windows applications are referred to in the context of methods for converting for use (e.g. the example input discourse refers to methods for converting Windows applications for use).

As shown in the dynamic classification index of Table 4, the content indexing processor also generates references to other theme concepts from the static ontologies. For example, because the example input discourse refers to "applications" in the context of being compatible with operating systems, the content indexing processor references the "operating systems" theme concept.

TABLE 4

Dynamic Classification Index

| | |
|---|---|
| applications | operating systems |
| for OS/2 software | installation |
| Windows | OS/2 |
| methods of converting | proprietary |
| for use | [see also] applications |
| [see also] operating systems | [see also] computer software industry |
| | [see also] softwares |
| | [see also] systems |
| applications programs | OS/2 operating systems |
| applications softwares | OS/2 software |
| | applications for |
| commercial values | patents |
| | software |
| | [see also] legal customs and formalities |
| computer hardware industry | platforms |
| [see also] platforms | computer system |
| | [see also] computer hardware industry |
| computer industries | programs |
| | applications |
| | computer software |
| | [see also] computer software industry |
| computer industry | proprietary operating systems |
| [see also] computers | |
| computer software industry | software |
| [see also] operating systems | OS/2 |
| [see also] programs | [see also] computer software industry |
| [see also] software | |
| [see also] systems | |
| computer software programs | software patents |
| computer system platforms | software programs |
| | computer |
| computers | softwares |
| examples of | Windows applications |
| [see also] computer industry | amounts of |
| | [see also] operating systems |
| converting | system platforms |
| methods of | computer |
| examples | UNIX, Windows and OS/2 |
| of computers | inclusion |
| | [see also] operating systems |
| industries | Windows applications |
| computer | methods of converting |
| [see also] electronics | for use |
| legal customs and formalities | |
| [see also] patents | |

For an example input discourse, the content indexing processor generates the dynamic hierarchy in the dynamic level 135. For this example, in the first sentence of the second paragraph, the head word "Windows Applications" is discussed in relationship to the compatibility of the Windows applications, and is specifically discussed in the context of compatibility with the OS/2 operating system. Based on the grammatical and thematic tags, the content indexing processor determines that the phrase, "which are directly compatible for use with the Windows operating systems", is not the main focus of the sentence. Instead, the focus lies in the "are not directly compatible for use with the OS/2 operating system" portion of the sentence. Based on these relationships, the content indexing processor generates the hierarchical relationship between "Windows Applications" and "Compatibility."

Appendix D, entitled "Content Indexing Code", contains a source code listing for implementing content indexing processing in accordance with one embodiment of the present invention. The document entitled "Creating a Virtual Bookshelf", discloses examples and use of a classification system. The document "Creating a Virtual Bookshelf" is incorporated herein by reference.

CLASSIFICATION USING THE KNOWLEDGE CATALOG

Figure 6:
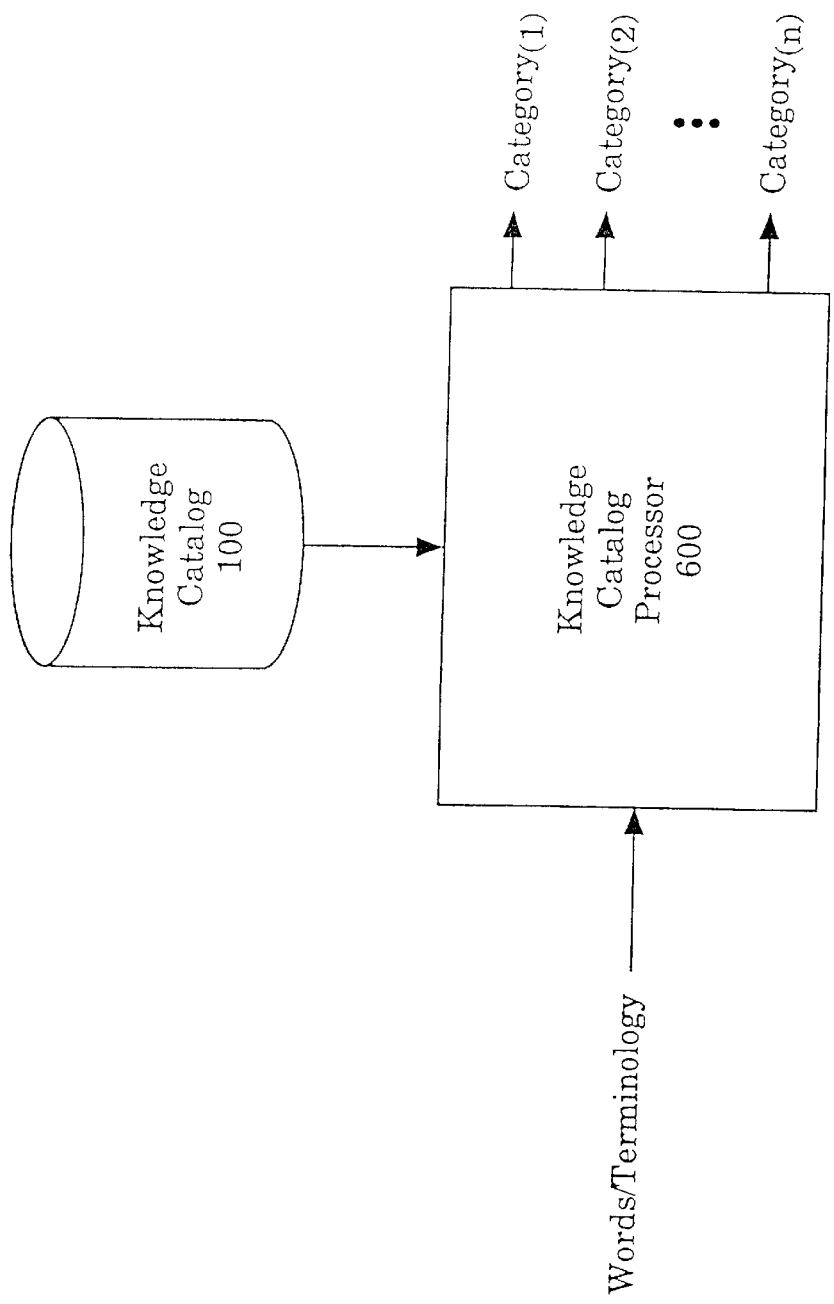
FIG. 6 illustrates a knowledge classification system utilizing the knowledge catalog of the present invention.

FIG. 6 illustrates a knowledge classification system utilizing the knowledge catalog of the present invention. The knowledge classification system contains the knowledge catalog 100 and a knowledge catalog processor 600. In general, the knowledge catalog processor 600 classifies words and terminology through use of the knowledge catalog 100. The knowledge catalog processor 600 receives, as inputs, words and terminology for classification, and generates, as outputs, concepts or categories associated with the words and terminology input. In essence, the knowledge catalog processor 600 and the knowledge catalog 100 classify input words based on the ontologies of the present invention.

The knowledge classification system may be implemented in either hardware or software. For the software implementation, the knowledge classification system is software that includes a plurality of computer executable instructions for implementation on a general purpose computer system. Prior to loading into a general purpose computer system, the knowledge classification system software may reside as encoded information on a computer readable medium, such as a magnetic floppy disk, magnetic tape, and compact disc read only memory (CD-ROM). In one hardware implementation, the knowledge catalog processor 600 may comprise a dedicated processor including processor instructions for performing the functions described herein. Circuits may also be developed to perform the functions described herein. The knowledge catalog 100 may be implemented as a database stored in memory for use by the knowledge classification system.

The static ontologies in the knowledge catalog 100 store all senses for each concept. In general, words and terminology, contained in the knowledge catalog 100, are characterized as ambiguous or non ambiguous. Terminology is ambiguous if the terminology appears more than once in the knowledge catalog 100 (e.g. there is more than one sense to the word). Conversely, a term is non ambiguous if the term only appears in the knowledge catalog 100 once. The same terminology may be included in more than one domain, as well as in more than one static ontology within the industry domain. For example, the term "plant" appears in an ontology in the concrete/generic domain, and appears in more than one ontology in the industry domain 110 (e.g. plant as in the biological sense, and plant in the manufacturing plant sense). The knowledge catalog 100 is generated by researching words or concepts in all ontologies to determine which words are ambiguous to that ontology.

The use of the ambiguous and non ambiguous characterization in the classification system recognizes that some terms have one or more senses. In order to properly classify words and terminology, each sense of the input words and terminology are determined. The concepts or categories are output as $category_1$ through $category_n$ as shown in FIG. 6. For example, the word "bank" is ambiguous because it may refer to a river bank as well as a financial institution. For this example, the knowledge catalog processor returns the categories of physical geography as well as banking. In one embodiment, the knowledge catalog processor 600 receives additional information (not shown) to select a sense for the input terminology if the input terminology is ambiguous.

The knowledge catalog of the present invention enables natural ambiguity resolution of ambiguous terminology. As discussed above, if a word or terminology has more than one sense, then it is characterized as ambiguous. In order to resolve the ambiguity for such a word, prior art systems utilize statistical concordances to select a sense for a word from all the possible senses of the word. Because the knowledge catalog consistently identifies higher level categories, lower level definitions can be derived from the higher level categories. For example, if the term "Paris" was found within the document, a determination that Paris is in France, as opposed to Texas, is made if France or other cities in France appear in the input discourse. Because the ontologies identify "France", then Paris, France is thus identified.

Figure 7:
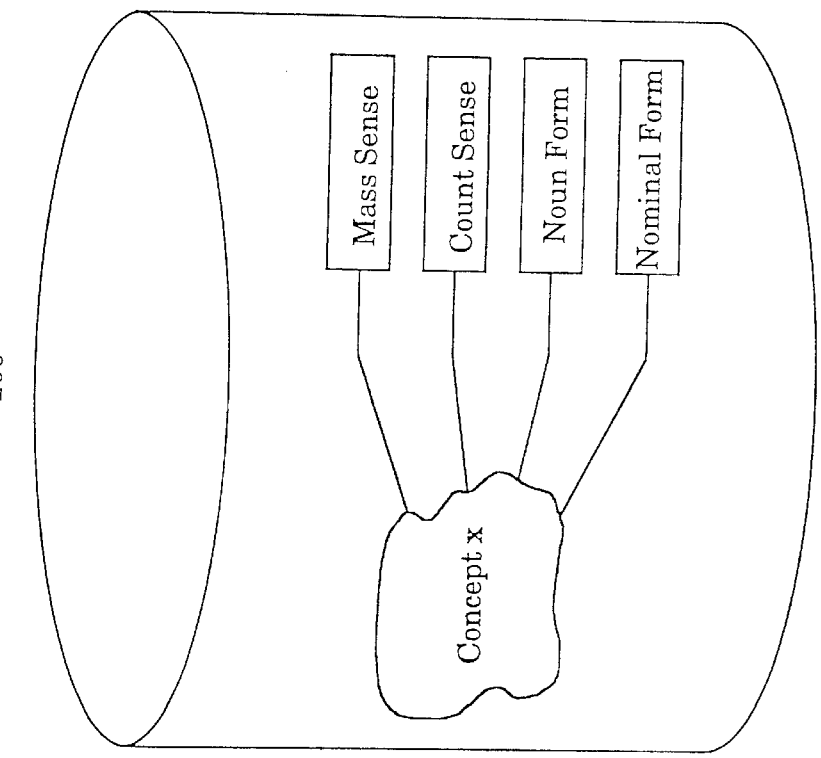
FIG. 7 illustrates the process for converting the form of the input words for attachment into the knowledge catalog.
Figure 7:
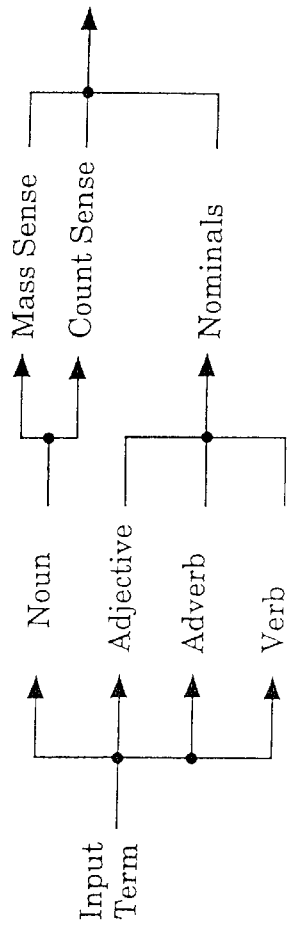

The knowledge catalog processor 600 processes words prior to attachment in the knowledge catalog 100. FIG. 7 illustrates the process for converting the form of the input words for attachment into the knowledge catalog 100. The input terminology to the knowledge catalog processor 600 for classification are content carrying words (e.g. the words convey meaning of a concept). Typically, the input terminology consists of nouns, adjectives, adverbs, or verbs. As shown in FIG. 7, if the input terminology consists of an adjective, adverb or verb, then the knowledge catalog processor 600 converts the input terminology to a nominal form. For example, the verb "to fish" is converted to "fishing", and the verb "performing" is converted to "performance." If the input terminology consists of a noun, then the word is in the proper form for attachment into the knowledge catalog 100.

As shown in FIG. 7, the knowledge catalog processor 600 further analyzes nouns to determine whether the noun has a mass sense and/or a count sense. For example, the word "baseball", which is the mass sense of the word, has a completely different meaning than the count sense "baseballs." If the word has both a mass sense and a count sense, then the knowledge catalog processor 600 attaches both the mass sense and a count sense into the knowledge catalog 100. The noun form of a word may have a different meaning than the nominal form of the word. For example, the noun form of "fish" has a different meaning than the nominal form "to fish", which refers to the sport of fishing. When applicable, the knowledge catalog processor 600 attaches both the noun and the nominal into the knowledge catalog 100. If there is not a concept for the nominal, then the concept of the noun is attached to the concept of the nominal.

Because the noun sense of a word may be different than the nominal sense, and the mass sense may be different than the count sense, a separate classification or tree attachment exists for nominal and noun forms as well as for mass and count senses. For each concept, the knowledge catalog 100 potentially stores the noun form, the nominal form, the mass sense, and the count sense as shown for Concept$_x$ in FIG. 7. Therefore, the knowledge catalog 100 stores, when applicable, the noun form, the nominal form, the mass sense, and the count sense for a concept.

Some input terminology may also be characterized as special words. These special words include orienters and global classifiers. Orienter words guide the reader to a field of study regardless of the use of the word. For example, the word "linguistically" guides the reader toward the field of linguistics. A global classifier word carries the essence of a particular category, wherein the category may include sub categories beneath the category defined by the global classifier. For example, the word "programmer" is a global classifier. The knowledge catalog processor 600 maps the special words directly into the knowledge catalog 100.

In a preferred embodiment, the knowledge catalog processor 600 attaches phrases in the knowledge catalog 100 such that the longest form of the phrase is retained. The longest form of phrases includes all content carrying words that further identify a sense for the phrase. Therefore, by retaining content carrying words in phrases, the phrases, when attached into the knowledge catalog, are typically unambiguous. The following sentence provide an example of attaching the longest form of a phrase.

The Federal Reserve Board has lowered the prime interest rate. For this example, the knowledge catalog processor 600 attaches the phrase "prime interest rate" for use with the knowledge catalog. The phrase "prime interest rate" is retained because it is more specific than both prime and prime rate because prime may refer to "prime beef" or "prime interest." The prime beef attaches into ontologies for food or cows, and "prime interest" attaches into an ontology for real estate. However, "prime interest rate" attaches into ontologies for banking. Therefore, because two or more words typically render a term non ambiguous, the knowledge catalog processor 6900 reduces ambiguity by attaching the longest phrase. The knowledge database processor also expands abbreviated terminology to the full or complete form prior to attaching into the knowledge catalog so that a formal or legal name of a word or term is always utilized. For example, the word "Oracle" is extended to the fall name of the corporation "Oracle Corporation."

In general proper nouns are naturally ambiguous because any particular person, location or item may have any name. However, the knowledge catalog processor 600 realizes that although proper nouns are naturally ambiguous, there is a realistic level of recognition for some proper nouns. The knowledge catalog processor 600 operates under a reputable presumption for some commonly recognized proper nouns. For example, the proper noun "Paris" is typically associated with Paris, France. Therefore, when attaching "Paris" in the knowledge catalog 600, a presumption exists that "Paris" relates to the concept of "France." However, if during the classification, no additional corroborating topics are generated, then "Paris" is no longer associated with France.

The document entitled "Creating a Virtual Bookshelf", contains a description for configuring a classification system utilizing the knowledge catalog of the present invention.

THEME PARSER

After the grammatical context, the base thematic context, and the style have been ascertained, the full thematic parse can be implemented. The grammatical context is needed in order to establish the grammatical relationships that exist in a sentence. The style assessments are needed in order to establish the general tone and writing methods used by the author, and the base thematic context is the initial thematic analysis that makes simple decisions about the basic components of the theme when using only the grammatical context for clues. In addition to these contextually calculated aspects of a sentence, additional lexical information that is attached to each word will also be used.

The full thematic context of the document in now produced by checking each word against all possible thematic constructions, and recording either the existence or non-existence of each thematic aspect, or a scale of how much of a thematic aspect each word carries, or what specific sub-classification of a general thematic aspect the word contains. Each word in a sentence is then subjected to a series of tests to determine and record its thematic aspects.

As the detail for the thematic parser is discussed, certain examples will be used to indicate why a particular assessment is useful. Many of these examples will be based on the ability to generate a new, summarized version of a sentence. This assumes that any sentence contains a certain amount of information that can be removed without removing the main 'gist' of the sentence. An example of this would be:

Each word in a sentence is then subjected to a series of tests.

Each word subjected to series of tests.

Each word subjected to tests.

Word subjected to tests.

The subsequent sentences can progressively paraphrase the first, full version. While not fully grammatical, they can be read correctly and easily, without misinterpretation. A common example that will be used in any discussion of weak/strong words will be the ability to readily remove parts of a linguistic constituent group without rendering the sentence unintelligible.

Default Setup

Eight default setup operations are performed before the full thematic parsing can commence:

1. Weak/Strong Noun Initialization
2. Sentence Structure Checking
3. Grammatical Ambiguity Analysis
4. Industry-Specific Terminology Identification
5. Possessive Contextual Form Analysis
6. Dual Gender Noun Initialization
7. Verb Modification Attachment
8. Noun Support Attachment The first processing step sets the default conditions of each thematic aspect of each word to a zero condition (does not contain this thematic aspect).

Weak/Strong Noun Initialization

A default condition is placed on each noun in the sentence. Each noun carries a thematic aspect recording the strength of the noun. 'Weak' and 'strong' refer to the strength of the word's content-carrying sense. Some nouns are very descriptive when used in isolation, while others are very vague. 'Windmill' is very specific, but 'place' is very vague, and needs some additional information to help define the type of 'place' to which the author is referring. A noun can be encoded in the lexicon as 'strong' or 'weak', or can be computed in the thematic analysis as 'strong' or 'weak'. But each noun initially starts in its thematic processing by assuming it is 'strong'.

The strong/weak labels are referring only to the noun in isolation. A noun that is 'weak' in isolation can still be 'strong' as a unit, as long as it has some strong supporting words, such as adjectives or prepositional phrases. And there can be a number of levels of supporting prepositional phrases. But as long as one of the nouns in one of the prepositional phrases that modifies a particular noun can be classified as 'strong', the whole chain from that point up to the originating noun head can be classified as strong because of this strong support.

There are four conditions that must be thought of together when ascertaining a noun's content value.

1. A noun can be weak, with no support.
2. A noun can be weak with strong support.
3. A noun can be strong with weak support.
4. A noun can be strong with strong support.

Each noun is coded with a thematic aspect tag indicating whether it has supporting content, in the form of strong modifying adjectives or strong postposed prepositional phrases. A noun's initial default condition assumes it does not have strong supporting content.

Basic thematic analysis is highly concerned with the content-strength of words, especially nouns and adjectives. Nouns are the most focal part of a sentence, and can be thought of as carrying a certain amount of content in them. Some nouns are very rich in content and need no additional supporting information to be complete. A word such as 'sonar' is very strong in its content-senses. But words such as 'list' are very weak and do not convey much information in isolation. Instead they look for other supporting information to help deliver the content of the noun phrase.

'Employee list' or 'list of employees' uses a stronger content word, such as 'employee,' to complete the full content- representation of the word 'list'. Eventually, one aspect of thematic analysis will determine if a noun phrase group (a noun plus its adjectives and supporting prepositional phrases) must be kept intact in order to convey its content properly, or if parts of the phrase can be removed without altering the basic meaning. An example would be 'electric guitar'. 'Electric' conveys additional information about 'guitar', but 'guitar' on its own still provides the basic thematic content. So 'electric' could be removed, which would remove some descriptive detail from the sentence, but would not diminish the basic understanding of the sentence. However, removing 'employee' from 'employee list' would remove the basic content-carrying word, leaving only an empty shell. This would seriously detriment the understanding of the sentence.

Each assessment of theme must understand the gradient levels of content in a sentence, where they exist, and where and when they could be removed without excessive problems. This will be discussed in detail later. But there are some default operations that are performed initially on a word that override certain types of strong/weak analyses.

Sentence Structure Checking

The sentence as a whole is checked for the existence of at least one predicate. If the sentence does not contain a single predicate, it is assumed to be a heading or part of a sentence that cannot be analyzed for thematic content. The entire sentence is therefore marked for removal from the thematic processing routines.

Grammatical Ambiguity Analysis

Each word in the sentence is checked for any grammatical ambiguity. One such condition occurs when the grammar parser cannot assign any parts of speech to a word. In this case, if the word is in a noun phrase, it is defaulted to an adjective. If the word is not in a noun phrase, it is defaulted to a noun. This causes naturally ambiguous grammatical conditions to be focused on more heavily by the thematic routines (since nouns and noun phrases are the most content-rich parts of thematic analysis).

Industry-Specific Terminology Identification

Additional default conditions are based on the existence of certain pieces of lexical information for a word. One such default is based on the use of special industry-specific terminology. Any word that is marked in the lexicon as 'industry oriented' should keep its supporting information, even if the word is deemed to be strong. For example, the word 'yield' may be marked as an important industry-specific term in banking. This would cause phrases such as 'yield on certificates of deposit' to remain together as a complete content unit, when otherwise it may have been logical to think that 'yield' could stand alone. In this case, a default test sets the industry-specific word to 'weak' whenever it has strong supporting information. This helps any application interested in reducing the content of the sentence to keep the supporting terms attached to the head term.

Possessive Contextual Form Analysis

Another default condition arises with the use of strong head nouns with strong, postposed, supporting terms in a possessive-style prepositional phrase. For example, in 'the theft of automobiles', 'theft' could be thought of as being 'strong', but 'of automobiles' is a strong indicator of content and usually needs to be kept associated with the head word. Head words in this context are by default marked as 'weak', but with strong supporting information. They are also marked with a special strong-content code that specifically identifies the head word as conveying strong content, but wants the supporting words to be kept associated with the head word. This helps applications that summarize text to keep the phrase together, but also indicates to content-abstraction applications that the head term conveys strong content in isolation.

Dual Gender Noun Initialization

Another default condition sets the strength of certain dual-gender nouns to 'weak'. If a word is marked as dual-gender, if it has no additional strong supporting context, if it is not in the simple subject position of a clause, and if it is not in a prepositional phrase, then the word is marked as 'weak.' An example is 'They allow manufacturers to offer large discounts'. 'Manufacturers' is marked as 'weak' in this particular context.

Verb Modification Attachment

This thematic aspect concerns itself with the attachment of additional modifying information to verbs. Some verbs require additional adverbial information in order to be fully understood. This additional information could be available in the form of an adverb, an adverbial prepositional phrase, or an adverbial clause. Other verbs accept this additional information when available, and specifically look for it, but can still function properly without it. And still other verbs do not care if it is included or not. These verbs are specifically marked in the lexicon as 'obligatory-adverb required' and 'optional-adverb acceptable'.

The verb 'put' is an example of an obligatory-adverb verb. A sentence such as 'He put the book.' leaves us naturally wanting to know where the book was placed, such as 'on the desk'. But other verbs with the same grammatical context do not convey the same experience. 'He read the book.' does not cause the reader to be looking for additional information modifying 'read', such as 'in a chair' or 'at the office'.

As with the 'weak' and 'strong' nouns, applications that look to summarizing these sentences must be aware of the information that can be easily removed, and the information that causes problems for the reader when it is removed.

In our initial default analysis, before the full thematic assessments begin, several conditions naturally cause verbs to be defaulted to an 'obligatory' or 'optional' condition.

Any monotransitive verb that does not have a direct object but that does have an adverbial phrase is coded by default as an obligatory-adverb verb. This causes the adverbial phrase to be retained longer, as would an object to the verb.

Intransitive verbs should have the obligatory-adverb setting, causing any adverbial phrases to be linked more directly to the verb. And verbs that signal 'unmarked' infinitive clauses are marked as optional-adverbial, causing the infinitive clause to be carried with the verb. An example of this type of sentence is 'Bob had three people guard the door.'. 'Had' signals the allowance of the unmarked infinitive 'guard'. This sentence would feel very incomplete if this clause were removed when a summary of the sentence is generated.

Finally, ditransitive verbs with only one object set the optional-adverb flag to indicate that any adverbial information be strongly attached to the verb, filling in for the missing object.

Noun Support Attachment

As a last stage in the pre-processing theme section, each word is analyzed to determine if strong support exists for it. The strong support assessment will be used along with the strong/weak noun thematic assessments to determine if the word is a focal point for a strong point as a whole.

MAIN THEMATIC ASSESSMENTS

After the initial setup routines are complete, each word is processed through the main thematic assessment routines. These routines attach flags to each word/phrase that indicates its thematic character. Each theme routine will have a short explanation, examples where needed, and sample abstract syntactic representations that indicate the abstract nature of the sentence context that is necessary for the routine.

The thematic assessments are a series of tests made against each word/phrase in the exact context of the sentence. Each test records the existence or degree of applicability of each of the theme routines to the word/phrase. The collection of the grammar, style, base theme, and these thematic assessments together will provide the necessary information that applications need to re-write sentences and extract group of content. There are three main types of thematic assessments:

1. Major Thematic Assessments
2. Theme-Relational Tagging
3. Theme-Location Identification Major Thematic Assessments Major thematic assessments contain all of the routines necessary to make major assessments about the overall theme of the sentence. There are 210 such routines, each of which produces an output to be stored for each word/phrase in the thematic context output.

AddAdv: Identifies 'additive adverbs' functioning in an adverbial role. Additive adverbs indicate that the predication is additionally true about the referent under focus. Based on the exact context of the sentence, this flag is set when an additive adverb is not essential to the meaning. The adverb may occur in any contextual position in the sentence.

ex: Mary also could play the banjo.
The banjo similarly has the dynamic range of a chainsaw.

AdjAdvSubordination: Identifies adjectival and adverbial clauses that are not essential to the meaning or to the grammatical integrity of the sentence. Most non-contrastive type sentence level adverbial clauses are tagged, and most adjectival clauses that modify strong nouns are tagged. If the adjectival clause carries strong content information and the noun it modifies is weak, then the clause is not tagged. Adjectival clauses that have no strong elements are tagged even if the noun being modified is weak and needs support.

ex: After they had voted, the race was run on Sunday.
The main idea that he had was never implemented.

AdjDeterminer_b: Identifies determiners that modify plural count nouns or mass nouns, and that are not essential to the meaning or to the grammatical integrity of the sentence. They must be used as a determiner in the context of the sentence.

ex: I don't have enough strength to lift the box.

AdjectiveNotDet: Identifies adjectives that are not determiners, and that are not essential to the meaning. The adjective must occur in a noun phrase, and be marked as a weak adjective in the lexicon.

ex: A large cat jumped off the roof.

AdjectivalClause: Identifies adjectival clauses that are not essential to the meaning. If the adjectival clause carries strong content information and the noun it modifies is weak, then the clause is not tagged. If the clause contains no strong information, then it is tagged, even when the noun being modified is weak.

ex: The main idea that he had was never implemented.

AdjectivalPrepPhrase: Identifies adjectival prepositional phrases that are not necessary to the meaning. If the noun being modified by the prepositional phrase is weak and the prepositional phrase carries strong content, the phrase is not tagged. If the prepositional phrase contains no strong information, it is tagged, even if the noun it modifies is weak.

ex: My physics book with the torn pages was lost.

AdjSubjComp: Identifies adjectives functioning as subject complements that are not essential to the grammatical integrity of the sentence. These adjectives will be marked as weak in the lexicon.

ex: The box was large.

Adverbs: Identifies adjunctive adverbs that are not essential to the meaning or to the grammatical integrity of the sentence. The adverb may appear in any position in the sentence, and may modify any valid constituent.

ex: The bear quickly ran into the forest.

AdverbAfterVerb: Identifies adverbs (usually adjuncts) directly following verbs where the adverb is not essential to the meaning. It is essential only when the verb it modifies is marked in the lexicon as an obligatory or optional adverb-type verb.

ex: The bear ran quickly into the forest.

AdverbEndMc: Identifies adverbs (usually adjuncts) ending a main clause where the adverb is not essential to the meaning (when the verb in its clause is not an obligatory or optional adverb type verb).

ex: The bear ran into the forest quickly.

AdverbialNpInit: Identifies introductory noun phrases of time. The noun phrase may occur at the start of any main clause, must have a time noun as its head, and must be only a noun phrase, not a prepositional phrase or any other constituent.

ex: Early that morning, we set off for camp.

AdverbInit: Identifies adverbs (usually disjuncts) that start a main clause where the adverb is not essential to the meaning. It is essential to the meaning only when marked in the lexicon as an orienter, such as the words 'economically' or 'linguistically' which name industries or specific fields of study.

ex: Actually, they left for the store.

AdvClauseInit: Identifies adverbial clauses at the beginning of a main clause that are not necessary to the meaning. Only those clauses that contrast to the information in the main clause will not be tagged.

ex: After they had voted, the race was run on Sunday.

AdvInNp: Identifies adverbs in noun phrases that are not essential to the grammatical integrity of the sentence. This includes any adjverb but those marked as orienters.

ex: It was an unusually comical movie.

AdverbSplitInfin: Identifies adverbs in split infinitives.

ex: . . . to boldly go where . . .

AdverbialBetweenCommas: Identifies adverbial phrases set off by commas, which are not essential to the meaning or to the grammatical integrity of the sentence. This includes all adverbials that are not orienters.

ex: The bear was, at least partially, standing on its hind legs.

AdverbialClause: Identifies adverbial clauses that are not necessary to the meaning. These include most non-contrastive adverbials.

ex: When the right times comes, I am going to learn to fly a plane.

AgoAdverbial: Identifies time representations that end in 'ago' or similar words, which are not necessary to the grammatical integrity of the sentence.

ex: I took the test some years ago.

Appositive: Identifies all appositives in any context.

ex: Bob Smith, a market analyst, said . . .

ApproxPrep: Identifies 'approximator prepositions' such as 'around, about, close to' where the prepositional phrase is not essential to the meaning. The phrase will be necessary only when it modifies a verb marked as obligatory or optional adverbial, or when the prepositional phrase contains strong content and the noun it modifies is weak.

ex: Bob left the party around ten o'clock.

Article: Identifies articles (determiner type).

ex: The bear ran down the road.

AttitudeAdv: Identifies 'attitudinal adverbs' functioning in an adverbial role where the adverb is not essential to the meaning.

BeVerb: Identifies all forms of the 'be' verb in certain contextual positions where the sense of the clause can be understood without the 'be' verb.

ex: The student is taking too many courses.

BeVp: Identifies the entire non-lexical section of a verb phrase that involves a 'be' verb, where the verb phrase section is not essential to the meaning or to the grammatical integrity of the sentence.

ex: Doug must be willing to invest in the future.

BogusSubject: Identifies subjects that carry no content.

ex: The level increased because the knob kept moving forward.

CommentInit: Identifies initial sentence comments that are not marked as orienters.

ex: Pound for pound, Bill Bates is the hardest hitter in the league.

ComparativeInSubjComp: Identifies comparatives in subject complements that are not essential to the meaning or to the grammatical integrity of the sentence.

ex: These cars are faster than mine.

ComparativeInSubject: Identifies comparative expressions in the subject that are not essential because they do not contain significant content.

ex: The faster planes will leave last.

Compromiser: Identifies 'compromiser adverbs' that are not essential to the meaning, where the conjunction is not essential to the meaning or to the grammatical integrity of the sentence.

ex: Men both young and old were invited.

ConcessiveAdv: Identifies 'concessive adverbs' that are not orienters.

ConjInNp: Identifies conjunctive and adjunctive adverbs that start main clauses and which are not orienters.

ex: Additionally, we may have to spend more money.

CorrelConj: Identifies 'correlative conjunctions' with following prepositional phrases.

CryptoAdjClause: Identifies clauses that syntactically appear adjectival but grammatically function adverbially.

ex: It came from the French, which also . . .

CryptoAdv: Identifies syntactic adverbs that are not necessary to the meaning.

CryptoClause: Identifies clauses of any type that appear syntactically isolated. Identifies a syntactic subject that is grammatically an adverbial.

ex: Actually, a few days prior to the interview, they had . . .

CryptoPrepPhrase: Identifies prepositional phrases of time that are not part of verbs that are marked as obligatory or optional adverbials.

ex: We met on that day.

DemonsAdj: Identifies 'demonstrative adjectives' that donot carry strong content (marked weak in the lexicon).

DemonsSubjBe: Identifies 'demonstrative pronouns' that are the grammatical subject of 'be' verbs.

DemonstrativeModifier: Identifies demonstrative adjectives that do not carry strong content (marked weak in the lexicon).

DemonstrativeSubject: Identifies demonstrative pronoun subjects that are not necessary to the grammatical integrity of the sentence.

Determiner_d: Identifies determiners that modify only plural count nouns, and that are not essential to the meaning.

DoVerb: Identifies the 'do' verbs that are not negated and that are not essential to the meaning.

ex: The students did understand the lesson.

ElliptedPassive: Identifies ellipted passives clauses that are not essential to the meaning.

ex: The language supports several color spaces based on this standard.

EmptyVerb: Identifies verbs with an empty meaning, such as 'try, begin, ought', that are not essential to the meaning.

ex: He tries to maintain a good balance.

ExtractTopicWord: Returns the actual word from the initial sentence that represents the topic of the sentence.

Factive: Identifies 'noun particles' that are measurements, such as 'gallon, piece, few' that are not essential to the meaning.

ex: He added several gallons of water.

FinalPrep: Identifies prepositions that occur at the end of the sentence.

ex:

FindTopic: Identfifies the main thematic topic in the sentence.

ex: A list of employees was printed.
The judge ruled that they were innocent.

FocusAdv: Identifies 'focusing adverbs' that are not orienting words.

HaveAux: Identifies the 'have' verb where it is not essential to the meaning or to the grammatical integrity of the sentence.

ex: The students have learned their lesson.

HaveTo: Identifies the phrasal forms of 'have+to' when functioning as a full lexical verb. This sequence would be replacable by single words, such as 'must'.

ex: We have to leave soon.

HedgingWd: Identifies 'hedging' words, such as 'partially' that do not carry strong content.

ex: He was partially finished with the job.

HedgingVerb: Identifies hedging verbs whose subject is plural with a following infinitive.

InfinClauseAfterObj: Identifies infinitive clauses that follow direct objects. The clause if tagged if it contains no strong elements.

ex: We completed all the forms to get a passport.

InfinInfin:Identifies a series of two infinitive phrases where the first is not necessary to the meaning or to the grammatical integrity of the sentence.

ex: We needed to finish to get our diploma.

IsAdjOrAdvClause: Identifies the given word as part of any adverbial or adjectival subordinate clause.

IsAnotherFocus: Returns TRUE when another main focus occurs in the current predicate after the given word location.

IsAnnouncement: Identifies the current verb as a verb of 'announcement'.

ex: We announced that the acquisition was called off.

IsAdjAdvClauseAnywhere: Identifies that the given word is contained in an adverbial or adjectival subordinate clause at ANY level of subordination.

IsAntecedantPrnSubj: Identifies the given pronoun subject as having an antecedent in the current sentence.

ex: Bob said that he would be there later.

IsAsBlankAs: Identifies the given word as part of an 'as WORD as' sequence.

ex: He is as clever as a fox.

IsAuxVerb: Identifies the given word as an auxiliary verb.

ex: He can see the painting.

IsBackRefCompoundNp: Identifies the given conjunction as part of a noun phrase compound where the second element is referring back to previous information.

IsBeComplement: Identifies the given word as a topic in a subject complement.

IsBeEquate: Identifies the given word as a 'be' verb for a coordinated topic.

IsBogusMc: Identifies the given word as an appositive that is syntactically marked as a main clause.

ex: He pleaded guilty to embezzeling from a bank, and to tax evasion, acts committed before he was married.

IsBogusSubject: Identifies the given word as a gerund syntactically marked as a subject.

ex: An excercise machine employing this cam enables the user to produce remarkable growth in strength and muscle size.

IsCompAppositive: Identifies the given word as an appositive that is properly ended.

ex: Bob Smith, a market analyst, said . . .

IsComplexPrep: Identifies the given word as the preposition starting a complex prepositional phrase.

IsCompoundNp: Identifies the given word as part of a compound noun phrase.

ex: Bob caught a tuna and a bass.

IsCryptoNoun: Identifies the given word as an adverb that is syntactically functioning like a noun.

IsDefArtThisNp: Identifies the given word as part of a noun phrase that contains a definite article.

ex: The three bears lived in the woods.

IsDeleteableNounClause: Identifies the given word as part of a noun clause that does not contain strong information.

ex: A general link will find the general area of the document on which the mouse was clicked.

IsDitransNeedPp: Identifies the given word as a prepositional phrase that belongs to a ditransitive verb.

ex: The state declared the land as one of its natural resources.

IsElliptedPassiveClause: Identifies the given word as part of an ellipted passive construction.

ex: These are device independent programs based on the new standard.

IsEndOfClause: Identifies the given word as occuring at the end of any clause structure.

ex: After the game was over, we left for the party.

IsEndOfMc: Identifies the given word as occuring at the end of a main clause.

ex: The bear walked through the woods; Bob never heard it coming.

IsEveryWordToLeftDeleted: Identifies that every word to the left of the given word in the sentence has been marked as non-essential.

IsGoodNounThisPp: Returns TRUE when the given word is in a prepositional phrase that contains a strong or supported noun.

ex: A list of new employees was printed.

IsEmbeddedClause: Identifies the given word as part of a subordinate clause that is embedded in another subordinate clause.

ex: Bob said that the list that was printed was incomplete.

IsImperative: Identifies the given word as an imperative verb.

ex: Write your name on the first line.

IsInNp: Identifies the given word as part of a valid noun phrase.

ex: The bear walked through the woods.

IsInfinitive: Identifies the given word as an infinitive verb.

ex: Bob is going to give me the lamp.

IsInfinitiveClause: Identifies the given word as part of an infinitive clause.

ex: Bob is going to give me the lamp.

IsMainVerb: Identifies the given word as the main lexical verb of a verb phrase.

ex: The ship can usually be identified by its name.

IsModifierSpeechAct: Identifies the given word as a noun that is being modified by a speech act word.

ex: Chapter one is an overview . . .

IsNeededAdjClause: Identifies that the given word is part of an adjectival clause that IS essential to the sentence. The clause is essential when the noun it modifies is weak and needs support, and then the adjectival clause has strong elements.

ex: The person who rang the bell was never found.

IsNegAdvCl: Identifies the given word as part of a subordinate clause that is being negated (a negative word appears in the clause).

ex: When I couldn't jump the ditch they left me behind.

IsNegVerbThisPred: Identifies the given word as part of a predicate that contains a negative verb.

ex: Bob did not hear the bear.

IsNotPartOfSpeech: Identifies the given word as syntactically ambiguous.

IsNounThisDo: Identifies the given word as part of a direct object with a noun head.

ex: Bob heard the bear in the woods.

IsOkAdj: Identifies the given word as an adjective that carries strong thematic content for supporting a noun.

ex: The economic summit was a success.

IsOkCompHead: Identifies the given word as the head word of a subject complement.

IsOneWordClause: Identifies the given word as a subordinate clause with only one word.

ex: The man accused was very nervous.

IsOnlyPossibleTheme: Identifies the given word as the only strong theme in the sentence.

ex: The bear didn't hear me approaching.

IsSubjectVerbMatch: Identifies that the two given word locations agree in number. This is valid only for simple number tests.

ex: The man with the pictures runs my business.

IsNeededPp: Identifies prepositional phrases that are attached to verbs and that are necessary for the proper thematic completion of the verb.

ex: He put the book on the table.

IsOfpNeeded: Identifies possessive prepositional phrases that modify weak noun heads, where the prepositional phrase is necessary to the thematic completion of the main noun.

IsOkTheme: Identifies a particular word as being a valid thematic topic. A noun phrase that is strong or that has strong support in its modifying elements.

IsPassiveVbThisPred: Identifies the main verb phrases of the currently pointed to predicate, and returns TRUE when the verb phrase is a passive verb phrase.

ex: We were expected at the office.

IsPassiveVp: Identifies the current word position as being in a passive verb phrase.

ex: We were usually expected at the office.

IsPluralSubjectOfVerb: Identifies the subject of the verb currently being pointed to, and returns TRUE if this subject is plural.

ex: The boys who were at the store jumped into the car.

IsPosAppositive: Identifies the current word being pointed to as being an appositive for the previous noun phrase.

IsPosMainTopic: Identifies the current word being pointed to as being able to function as the main topic of the sentence. It must be strong or have strong support.

IsPrepPhrase: Identifies the current word being pointed to as part of a prepositional phrase.

ex: The rest of the group were hidden in the back of the house.

IsPreviousAs: Identifies when the current word being pointed to is part of an 'as' subordinate clause.

ex: We need to implement the new plan now, as the old plan cannot be completed on time.

IsPreviousComparative: Identifies when the current word being pointed to is part of a comparative phrase in the predicate of the sentence.

IsPrevAuxNeg: Identifies if the current word being pointed to is a verb in a verb phrase that carries a negative modal verb.

ex: He could not usually talk that long.

IsReducedSubClause: Identifies that the current word being pointed to is part of a reduced subordinate clause.

ex: The bear walking in the woods is very noisy.

IsSameBaseClause: Identifies that the two words being pointed to are part of the same base clause.

IsSameClause: Identifies that the two words being pointed to are part of the same clause.

IsSameNounConstituent: Identifies that the two words being pointed to are part of the same noun constituent.

IsSamePp: Identifies that the two words being pointed to are part of the same prepositional phrase.

IsSectionHeading: Identifies the current sentence as being a heading only, not a complete grammatical sentence.

ex: Formatting New Sections

IsStartMc: Identifies the current word being pointed to as the first word of a main clause.

ex: The bear walked through the woods; Bob could not hear it.

IsSubjDeleted: Identifies that the subject for the clause that is being pointed to has been marked as not being essential to the meaning or to the grammatical integrity of the sentence.

ex: The list was not printed using the laser printer.

IsThereMainAction: Identifies that there is a main clause action in the sentence that has not been marked as weak or unnecessary.

ex: The bear walked through the woods.

IsThereMainFocus: Identifies that there is a main focus in the sentence.

ex: The employee master list was printed with a laser printer.

IsThereMainTopic: Identifies that there is a main topic in the sentence.

ex: The list was printed with a laser printer.

IsThereNcTopic: Identifies that the main topic of the sentence is being expressed by a noun clause.

ex: What the speaker said didn't make much sense.

IsTherePrevDo: Identifies that there is a direct object in the current predicate that occurs prior to the current position being pointed to.

ex: We heard the bear walking though the woods.

IsTherePrevPrepFrom: Identifies a prepositional phrase in the same basic thematic unit that is a 'from' type prepositional phrase.

IsThereSupport: Identifies that the current noun being pointed to has strong modifying information.

ex: An economic decision is best.

IsThereWeakTopic: Identifies that the current word being pointed to is a weak, but usable, topic.

ex: The decision was made.

IsTrueAdj: Identifies that the current word being pointed to is a true adjective, not a participle.

ex: The linguistic program at the college was cancelled.

IsTrueNp: Identifies that the current word being pointed to is part of a valid noun phrase.

ex: The linguistic program at the college was cancelled.

IsThemePh: Identifies that the prepositional phrase being pointed to is part of the main theme of the sentence.

ex: The list of employees was printed on a laser printer.

IsType1Quote: Identifies quoted material with the format—subject+comma+speech act verb+noun phrase+comma+predicate:

ex: But the action, said London financial analyst Bob Smith, was . . .

IsType2Quote: Identifies quoted material with the format—subject+comma+noun+prepositional phrase+comma+speed act+noun clause:

ex: Bob Smith, president of the company, said that the system . . .

IsType3Quote: Identifies quoted material with the format—main clause with no object+comma+noun phrase+speech act:

ex: The yield dropped substantially, market watchers said.

IsType4Quote: Identifies quoted material with the format—main clause with object+comma+noun phrase+speech act:

ex: Commercial banks will reduce the prime rate, analysts said.

IsType5Quote: Identifies quoted material with the format—subject+verb+to+speec act+noun clause:

ex: He declined to say whether the paper was accepted or not.

IsType6Quote: Identifies quoted material with the format—subject+speech act+comma+quoted clause:

ex: She said, "We will probably buy it."

IsType7Quote: Identifies quoted material with the format—subject+comma+noun+prepositional phrase+comma+speec act+comma+quoted noun clause:

ex: Bob Smith, son of Joe, said, "I don't care."

IsType9Quote: Identifies quoted material with the format—subject+speech act+object+noun clause:

ex: The lady told the customers that they were out of peanuts.

IsType10Quote: Identifies quoted material with the following format:

ex: "I don't care who shot the cat," Josh said.

IsType11Quote: Identifies quoted material with the format—quoted main clause with comma+subject+speech act+comma:

ex: "We can do it," he said, and added that it would be difficult.

IsVerbThisClause: Returns TRUE when there is a lexical verb in the clause pointed to.

IsWeakCompoundNp: Identifies weak compound noun phrases.

ex: The line and the list were not long enough.

IsWeakPp: Identifies that the current word being pointed to is in a weak prepositional phrase.

ex: The name on the list was mine.

IsWhatTense: Returns the verb tense for the word being pointed to. Only 'past' and 'present' are valid.

IsProgressiveVp: Identifies the current word being pointed to as a progressive verb phrase.

IsRepeatTopic: Identifies a particular topic as one that has been established in the discourse recently.

ex: The bear was running through the woods. It stopped at a small pond and started to drink. Then the bear raised its head and started sniffing.

IsTooWeakThemeWord: Identifies a given word as one that is too weak to be a topic of the sentence.

ex: The list was printed on the laser printer.

LowAdverbialClauses: Identifies low priority adverbial clauses that are not necessary to the meaning.

MannerAdverb: Identifies 'manner adverbs' that are not essential to the meaning or to the grammatical integrity of the sentence.

ex: He wrote the letter awkwardly.

McIntroConj: Identifies conjunctions starting main clauses where the conjunction is not essential to the meaning or to the grammatical integrity of the sentence. The conjunction would be replaced with a semi-colon.

ex: The soldiers gave a great cheer, for he had won the victory.

Modal: Identifies 'modal auxiliary verbs' that are not essential to the meaning or to the grammatical integrity of the sentence.

ex: We shall arrive on time.

ModDetAdv: Identifies adverbs that modify determiners that are not negative.

MoreAdverbial: Identifies the adverb 'more' in contexts that are not essential to the meaning or to the grammatical integrity of the sentence. This usually indicates additional detail to follow that other theme routines would identify.

ex: Freud contributed more than anyone.

MoreThan: Identifies more . . . than constituents with than functioning as a preposition, with the prepositional phrase not essential to the meaning.

ex: It is more a fish than an animal.

NegativeAdj: Identifies negative adjectives that are not essential to the grammatical integrity of the sentence.

ex: Neither student failed.

NegativePrnSubj: Identifies negative pronoun subjects modified by possessive prepositional phrases.

ex: Neither of the accusations was true.

NeuterProSubj: Identifies 'neuter pronoun subjects' such as 'it, there', that are not essential to the meaning or to the grammatical integrity of the sentence.

ex: It ran into the woods.

NonRestrictiveRel: Identifies syntactic prepositional phrases that are grammatically relative clauses.

ex: Certain buildings such as the RCA building will be destroyed.

NounTimeAdverbial: Identifies noun time adverbials that are not essential to the grammatical integrity of the sentence.

ex: Ed signaled Thursday that he's tired.

ObjectAfterPp: Identifies syntactic direct objects that follow prepositional phrases, which are grammatically appositives or reduced clauses and not essential to the grammatical integrity of the sentence.

ex: The stock closed at 5 ½, a gain of ⅛.

OfInNp: Identifies the 'of' preposition as head of a prepositional phrase that, along with a weak noun it may modify, is not essential to the meaning or to the grammatical integrity of the sentence.

ex: One of the dogs

OneAdj: Identifies where 'one', when used as an adjective, is not essential to the meaning.

ex: We saw one bear running through the woods.

OnBeforeTime: Identifies where 'on', when used before 'time' words, is not essential to the meaning.

ex: The party was held at the office on Tuesday.

OrphanAdjectivalClause: Identifies adjectival clauses whose noun head modifiers have been identified as not essential to the meaning or to the grammatical structure of the sentence.

OrphanAdv: Identifies adjuncts that are not part of verb phrases or noun phrases.

ex: The simple truth is often not simple at all.

OrphanPp: Identifies prepositions that do not have following noun phrases.

PersonalRef: Identifies personal references.

ex: I would expect other banks to follow suit.

PossProObj: Identifies possessive pronouns in prepositional phrases or objects, where the pronoun is not essential to the meaning or to the grammatical integrity of the sentence.

PossProSubj: Identifies possessive pronouns in subjects, where the pronoun is not essential to the meaning.

PreDetNp: Identifies 'predeterminers' such as 'just' that are not essential to the meaning.

ex: Bob thought that just three files were missing.

PrepPhrases: Identifies prepositional phrases that are not essential to the meaning or to the grammatical integrity of the sentence.

PrepPrep: Identifies a preposition followed by another preposition where the second preposition is not essential to the meaning or to the grammatical integrity of the sentence.

ex: The cat is by the heater in the kitchen.

PronounSubjPassive: Identifies 3rd person pronoun subjects with passive verb phrases.

ex: She was sent to the store by Bob.

PseudoMcBreak: Identifies 'in that' clauses where 'in that' could be replaced by punctionation.

ex: We agreed with Bob, in that he was the expert.

PureCoordConj: Identifies 'pure coordinating conjunctions' that could be replaced by commas or other punctuation.

Bob saw the bear, and the bear ran away.

QuoteSource: Identifies the quoted source of statements. Refer to the the individual IsQuote . . . theme routines for detail.

ReflexivePrn: Identifies 'reflexive pronouns' that are not essential to the meaning or to the grammatical integrity of the sentence.

RelThat: Identifies 'relative pronouns' that introduce relative clauses, where the pronoun is not essential to the grammatical integrity of the sentence.

SaveTopic: Identifies every word in the sentence that is not part of the main topic.

ex: The bear ran through the woods.

Semicolons: Identifies main clause boundaries where conjunctions could be replaced with punctuation.

ex: The bear ran through the woods, and Bob ran home.

StrandedInfinClause: Identifies syntactic infinitive clauses that are not essential to the meaning or to the grammatical integrity of the sentence.

StrandedNounClause: Identifies noun clauses that are not essential to the meaning or to the grammatical integrity of the sentence.

StrandedNounPhrase: Identifies temporal noun phrases that are not essential to the meaning or to the grammatical integrity of the sentence.

ex: The tiger at the circus performs twice a day.

StrayAdj: Identifies adjectives not in noun phrases or subject complements.

StrayAdverbial: Identifies adverbials that are not in traditional grammatical locations.

SubjAdvVerb: Identifies adverbs positioned between the subject and verb of a clause, where the adverb is not an orienter.

ex: Bob quickly ran away from the bear.

SubjectSplice: Identifies subordinate clause subjects that are acting as the subject of the main clause.

ex: As the term is used again in the same section of text it loses importance.

SweepNpTrash: Identifies noun phrases that appear stranded after the surrounding context has been identified as non essential.

ThanPrepPhrase: Identifies prepositional phrases beginning with 'than' that are not essential to the meaning.

ex: It is more a fish than an animal.

ThatClauseAdj: Identifies adjectives in 'that' clauses with weak verbs, where the entire clause is not essential to the meaning or to the grammatical integrity of the sentence.

ex: Be aware that similar products often come with different labels.

TimeAdj: Identifies 'adjectives or adverbs of time' that are not essential to the meaning.

ex: Bob walked to the store daily.

TimeAdvInVp: Identifies time adverbs in verb phrases.

ex: Bob walked daily to the store.

TimeInObject: Identifies time noun phrases in objects.

ex: Bob went to Rome each Christmas.

TimeInSubjNp: Identifies time noun phrases in the subject of the sentence.

ex: Every Thursday is a hard day for Bob.

TimeSubject: Identifies simple time subjects, with following subject modifiers, where the time subject can be replaced with the following modifiers.

ex:

TimeTime: Identifies time words that follow other time words, where the second time word is not essential to the meaning.

ToInfinitive: Identifies infinitives marked by 'to' where the 'to' is not essential to the grammatical integrity of the sentence.

ToneAdv: Identifies 'tone adverbs' indicated as 'maximizers, emphasizers or diminishers' that are not essential to the meaning.

TopicalizerPhrase: Identifies topicalizers modifying before possessive prepositional phrases where the topicalizer and the following preposition are not necessary to the meaning or to the grammatical integrity of the sentence.

TopicalClause: Identifies introductions to topical clauses.

ex: It is dynamic in that it can provide feedback.

Transition: Identifies 'transition words' that do not indicate 'time' or 'coordination', and that are not essential to the meaning or to the grammatical integrity of the sentence.

TrashBogusMc: Identifies clauses begun with semicolons where there is not a full main clause and where the clause is not essential to the meaning or to the grammatical integrity of the sentence.

TrasbMc: Identifies main clauses that have all of their major elements marked as non-essential to the meaning and to the grammatical integrity of the sentence, where the entire main clause is actually unnecessary.

TrashStraySubj: Identifies subjects that have become unattached because of insufficient strong information in the rest of the clause.

TrashWholeSent: Identifies entire sentences that don't have any strong thematic content.

UniversalPrn: Identifies 'universal pronouns', 'predeterminers' or 'cardinal determiners' that are not essential to the meaning or to the grammatical integrity of the sentence.

UselessAdj: Identifies weak adjectives in noun phrases.

ex: The late president planted that tree.

UselessPrepPhrase: Identifies meaningless prepositional phrases.

ex: There is a viable alternative to it.

UselessPrnObj: Identifies indirect object pronouns.

ex: Congress gave them the shaft.

UselessPrnSubj: Identifies pronoun subjects that have alternate subject contexts that carry the meaning.

ex: No one except his supporters agree with the senator.

VerbAtEnd: Identifies verbs at the end of subordinate clauses, where the verb is not essential to the meaning or to the grammatical integrity of the sentence.

VerbInit: Identifies initial comment verbs.

ex: Note, however, that the apples were all green.

WeakAdj: Identifies weak adjectives.

ex: The simple solution is to not go.

WeakEquation: Identifies non-negative be-verb clauses that are equating only weak thematic information.

ex: The list was quite large.

WeakPrepPhrase: Identifies weak prepositional phrases.

ex: I would like to know your opinion as to your boss's behaviour.

WeakPrepSeq: Identifies a sequence of prepositional phrases that are collectively weak in thematic content.

ex: It was built on the basis of my invention.

WeakSubjComp: Identifies weak subject complements that have extended contexts.

ex: The motivation for the research was the issue of how to teach pronunciation.

WhAdjClause: Identifies wh-element adjectival clauses that modify strong nouns or that do not carry supporting information.

ex: Boredom is especially trying for young people who have so few opportunities.

WhElement: Identifies wh-element clauses.

WhNounClause: Identifies noun clauses that are not essential to the grammatical integrity of the sentence.

ex: A model for the scientific investigation of language arose which took its problems almost exclusively from British sources.

Wordy: Identifies wordy expressions and single word replacements.

WhileSubordinators: Identifies 'time-indicating' subordinating conjuctions, such as 'while', that are not essential to the meaning or that could be replaced with punctuation.

ex: Please get me some flour while you are at the store.

Theme-Relational Tagging

Theme-relational tagging looks for certain grammatical or thematic relationships and follows a particular line of processing which tags all of the words from a specifically identified start point to a specifically identified end point. There are approximately 15 of these routines.

DelAllAux: Flags each auxillary verb in each verb phrase.

ex: Bob can leave as soon as he is cleared of the charges.

DelAllButNp: Flags each word in the sentence that is not in the current noun phrase being pointed to.

DelClause: Flags each word in the clause (and imbedded clauses) being identified by the given word.

DelCurrPp: Flags each word in the prepositional phrase being pointed to.

DelDo: Flags each word in the direct object being pointed to.

DelLogicBreak: Flags each word in the same logical constituent group indicated by the given word.

DelMc: Flags each word in the main clause being pointed to.

DelObj: Identifies any word in an object being identified by the given word.

DelPp: Flags each prepositional phrase that is not essential to the meaning or to the grammatical integrity of the sentence.

DelRemainderSubj: Flags each word to the right of the current word that is part of the complete subject of the current clause.

DelStraySubj: Flags each word of the complete subject being pointed to when the subject is not essential to the meaning of the sentence.

DelToTheLeft: Flags each word to the left of the given word.

DelToTheRight: Flags each word to the right of the given word.

DelVerb: Flags the current word being pointed to if it is a verb.

DelVp: Flags all words if the verb phrase being pointed to.

Theme-Location Identification

Theme location identification searches for particular grammatical or thematic relationships and returns a location of where this word, phrase or clause starts in a sentence. There are approximately 35 of these routines.

FindIoThisPred: Returns the location of an indirect object in an identified predicate.

FindAllPp: Returns the location of a prepositional phrase where the last word of a string of phrases is needed to support any part of the prepositional phrase string from the beginning.

FindClauseType: Returns the type of subordinate clause at the given location.

FindClauseLevel: Returns the number of subordinate clause levels at the given location.

FindEndNp: Returns the location of the end of the given noun phrase.

FindEndLogicBreak: Returns the location of the end of the logical constituent group being pointed to.

FindEndObj: Returns the location of the end of the object being pointed to.

FindEndPp: Returns the location of the noun head of the prepositional phrase being pointed to.

FindEndSubj: Returns the location of the end of the complete subject being pointed to.

FindEndSc: Returns the location of the end of the subject complement being pointed to.

FindEndSubClause: Returns the location of the end of the subordinate clause being pointed to.

FindEndVp: Returns the location of the end of the verb phrase being pointed to.

FindLastNounInNp: Returns the location of the last noun head of the series of noun phrases identified by the given word.

FindLastVerbInVp: Returns the location of the last verb in the series of verb phrases identified by the given word.

FindNextMc: Returns the location of the start of the next main clause after the given word.

FindNextNoun: Returns the location of the next strong noun after the given word.

FindNextfirstNoun: Returns the location of the next noun after the given word.

FindNextKeptWd: Returns the location of the next word after the given word, where the word has not been marked as non-essential.

FindNounForThisAdj: Returns the location of the noun that the current adjective being pointed to modifies.

FindNounForThisPp: Returns the location of the noun head for the prepositional phrase being pointed to.

FindObject: Returns the location of the next object after the given word.

FindPrevNoun: Returns the location of the last noun before the current given word.

FindPrevNounVerb: Returns the location of the last noun or verb before the current given word.

FindPrepPrep: Returns the location of the last preposition before the current given word.

FindStartNp: Returns the location of the start of the noun phrase being pointed to.

FindPseudoVerbThisPred: Returns the location of the next participle in the predicate being pointed to.

FindStartMc: Returns the location of the start of the main clause being pointed to.

FindStartPp: Returns the location of the start of the prepositional phrase being pointed to.

FindStartSubClause: Returns the location of the start of the subordinate clause being pointed to.

FindStartVp: Returns the location of the start of the verb phrase being pointed to.

FindSubjThisPred: Returns the location of the simple subject after the current given word.

FindUndeletedWrd: Returns the location of the next word before the current given location that is not marked as non-essential to the meaning.

FindVerbThisPred: Returns the location of the first verb of the verb phrase for the current predicate being pointed to.

FindVerbThisSubj: Returns the location of the first verb of the verb phrase for the subject being pointed to.

Each of these assessments has its results stored for each word in the thematic context output area. Any application is now able to take advantage of this information, as well as the grammatical and stylistic information stored previously, to make intelligent observations about the grammar, theme and style of the text, and to perform some helpful operation against it, such as summarizing or outlining the text.

Sample Code

The following sample code shows how several typical theme tagging routines work. The theme parser works by setting a generalization of what each routine is looking for, followed by specific contexts that can either exclude certain sentences from the tagging or specifically include them.

```
PersonalRef(word_ctr)
ub1 word_ctr;
{
  int vbos;
  int endvp;
  int endnp;
  int ctr;
  if (LEX(wd_personal_prn,word_ctr) &&
      LEX(wd_first_person_prn,word_ctr) &&
      verb_phrase[word_ctr+1] &&
      simple_subject[word_ctr] &&
      !subordinate_clause[word_ctr])
```
* The above section tests that the current word being pointed to by word_ctr is a first-person, personal pronoun, functioning as the subject of the clause, followed by a verb phrase. The clause must be a main clause, not a subordinate clause. If these tests pass, the routine continues, otherwise it returns. This test is the first general test to determine if a word is a personal reference type. It is followed by secondary tests the constrain this generalization in certain contextual conditions. Note in this sample routine that the constaints are fairly specific and if met return without doing any tagging. If the reference noun in question does not have these conttsraints, then it is flagged by default. * vbpos=infLastVerbInVp(word_ctr+1); * this locates the last verb in the verb phrase following the word after the current pronoun * if (IsNegVerbThisPred(vbpos)||
    prep[vbpos+1]) * this checks the verb phrase for a negative element anywhere in it, or for a preposition immediately following the last verb in the verb phrase *
{
  return 0; * return when negative verb phrases encountered: We CANNOT forsee any insurmountable problems.*
}
ctr=vbpos+1;*** position to next word following the end of the verb phrase
if (prn[ctr])
{
  return 0;* return if a pronoun follows the verb phrase: I saw HIM the following weekend. *

```
        }
        while (ctr<number_words-3 &&
            predicate[ctr] &&
            IsSameClause(vbpos,ctr))
        {
            if (conj[ctr]) &&
                IsWordCoordConj(ctr) &&
                ctr<number_words-2 &&
                verb[ctr+1])
            {
                vbpos=FindLastVerbInVp(ctr+1);
                if (IsNegVerbThisPred(vpos))
                {
                    return 0; *** Return when the predicate extends
                        with the context of a coordinating conjunction
                        followed by a verb phrase, and where the verb
                        phrase contains a negative element. ***
                }
                break;
            }
            ctr++;
        }
        if (LEX(wd_that_clause_verb,vbpos)||
            LEX(wd_emotion_attitude,vbpos))
        {
            if (LEX(wd_factual_know_verb,vbpos))
            if(!(LEX(wd_speech_act,vbpos)&&
                    LEX(wd_that_clause_verb vbpos)))
                {
                    return 0; *** Checks the last verb in the verb phrase
                        for being either a that-clause verb (say, expect, see
                        . . . ) or a verb of emotion or attitude (disappoint,
                        amazed), and where the verb is a factual knowl-
                        edge verb, but not a speech act verb AND a
                        that-clause verb. Verbs will be those such as 'hate,
                        call . . . ' ***
                }
        }
        if (IsWordQuoteVerb(vbpos)&&
            vbpos<number_words-1 &&
            !IsWordThat(vbpos+1))
        {
        return 0; *** Returns when the verb position is a quotative
            verb, not the last word of the sentence, and where the
            following word is NOT abstractly identified by the
            lexical flags set on 'that'. I will WRITE as soon as I
            can.***
        }
        endvp=FindEndVp(vbpos);
        if (endvp<number_words-1&&
            IsInfinitiveClause(endvp+1))
        {
        return 0; *** Returns when the end of the verb phrase
            (includes adverbs) is followed by an infinitive clause.
            ***
        }
        if (prn[endvp+1]&&
            !LEX(wd_nominative_case_prn,endvp+1))
        {
            endvp++; *** Positions pointer to a subjective case
                pronoun ***
        }
        if (!noun_phrase[endvp+1]&&
            !conj[endvp+1]))
        {
        return 0;*** Returns if the following word is not in a noun
            phrase and not a conjunction. ***
        }
        if (noun_phrase[endvp+1])
        {
            endnp=FindEndNp(endvp+1);
            if(!(conj[endnp+1]&&
                IsWordTo(endnp+1)))
            {
                return 0;*** Returns when the following word in in
                    a noun phrase, and when the next word after the
                    end of the noun phrase is not the an infinitive
                    clause (identified by the abstract features of the
                    word 'to' tagged in a conjunction position, which
                    signals the subordination in the parser).
            }
        }
        for (;word_ctr<=endvp; word_ctr++)
        {
            ThemeTag[word_ctr][PersonalRefCode] TRUE;
            *** Tags all of the words from word_ctr through the
                end of the verb phrase as a personal reference: I
                believe that through revenue growth we will make
                that goal. ***
        }
        if (IsWordThat(word_ctr))
        {
            ThemeTag[word_ctr][PersonalRefCode]=TRUE;
            *** Tags the word that if in the following position
                after the previous tags.*** return 0;
            }
            else
            {
                word_ctr—;*** Sets position at last tagged
                    word. ***
            }
        }
    }
}
AdverbNpInit(word_ctr)
int word_ctr;
{
    int nounpos;
    if (noun_phrase[word_ctr] &&
        !subordinate_clause[word ctr] &&
        IsStartMc(word_ctr))
    {
*** The above code is the opening generalization that
    looks for a noun phrase that is not in a subordinate
    clause, and that starts a new main clause. This is the
    initial condition necessary for determining initial noun
    phrase adverbials. The following code will add con-
    straints for particular contextual conditions. Notice that
    the constraints are fairly general, and that with a few
    basic tests being passed, and a few NOT conditions
    being met, the noun phrase will be tagged of this type.
    ***
        nounpos=FindLastNounInNP(word_ctr);*** Find the
            last noun in the noun phrase currently being pointed
            to from above.
        if (IsTimeNoun(nounpos) &&
            !simple_subject[nounpos] &&
            complete_subject[nounpos])
        {
```

```
*** if the noun head is a time word, not the simple subject
    of the clause, but is classified in the complete subject
    portion of the clause, then it is tagged as being an
    introductory adverbial of time. ex: Early next morning,
    before dawn, they fed the foxes. ***
        TagNp(nounpos);
      }
    }
}
UselessPrepPhrase(word_ctr)
int word_ctr;
{
  int nounpos;
  int envpp;
  int vbpos;
  int temp;
  if (prep[word_ctr] && pp_adj[word_ctr])
  {*** Opening generalization is to allow all preposi-
     tional phrases that are coded as adjectival types to be
     available for the useless prepositional phrase tag-
     ging. The following code will apply constraints to
     this generalization. Unlike the previous examples,
     this example does not return based on the constraints
     as much as it only allows for the preositional tagging
     inside specific constraints.***
     nounpos=FindNounForThisPp(word_ctr); *** find
       the noun head for the prepositional phrase. ***
  if (nounpos=NOT_FOUND)
  {
    return 0; *** return if a valid noun head is not found
      for the preposition. ***
  if (IsGoodNounThisPp(word_ctr))
  {
    return 0;*** return of the noun head is listed as an
      important supporting word for other phrases. It
      cannot be flagged as useless if this is so.***
  }
  endpp=FindEndPp(word_ctr);*** Find the end of the
    prepositional phrase (last word). ***
  if (endpp<number_words-1&& IsWordThan(endpp+
    1))
  {
    return 0;*** If the following word has the abstract
      characteristics of 'than' then return.***
  }
  if (predicate[word_ctr])
  {
  vbpos=FindVerbThisPred(word_ctr);
  if (vbpos<number_words && IsDitransNeedPp
    (vbpos))
  {
    return 0;*** If the word is in the predicate, and the
      main lexical verb for the predicate is ditransitive,
      and is the type of word that needs supporting
      prepositional information, then return. ex: The
      state declared the land as one of its natural
      resources.***
  }
  }
  if (LEX(wd_personal_prn,nounpos)||
    IsWordDemonstrative(nounpos)||
    IsWordNeuterPrn(nounpos))
  {*** A second generalization is made above. This
    states that the noun head identified earlier should be
    a personal pronoun, a demonstrative pronoun, or a
    neuter gender pronoun to be considered in this
    section.***
    if (word_ctr>0&&
      tag_table[word_ctr-1] !=TAG_WD &&
      (verb_phrase[word_ctr-1]||
      IsWordParticiple(word_ctr-1)))
    {
      return 0; *** This constraint exits when the previous
        word has been tagged by another routine as not
        high-priority and was either in a verb phrase or a
        participle. ex: She stood for a while looking at
        everything there was to see.***
    }
    TagPp(word_ctr); *** Now this prepositional
      phrase is tagged as being weak (non-priority). ex:
      There is a viable alternative to it. ***
  }
}
if (word_ctr &&
  prep[word_ctr]&&
  pp_adv[word_ctr]&&
  adj[word_ctr-1]&&
  !apunc[word_ctr-1]&&
  LEX(wd_comparative_adj,word_ctr-1))
{*** This routine allows another generalization to
   attempt the weak prep phrase tagging. If the word is a
   preposition and functioning adverbially, and of the
   prior word is an adjective and is not followed by any
   punctuation mark, and if the prior word is also a
   comparative adjective, then the routine continues. ex: It
   is better for you than for me.***
   nounpos=FindNounForThisPp(word_ctr);
   if (nounpos!=NOT_FOUND &&
     IsWordThan(nounpos+1) &&
     !apunc[nounpos])
       {**** This constraint will allow for the weak
         prep phrase tagging. If the noun head of the
         preposition is followed by the abstract nature
         of the word 'than' and does not have any
         punctuation mark, then the prep phrase is
         tagged as weak. ***
         TagPp(word_ctr);
       }
   }
}
```

USING THE THEME OUTPUT

There are three primary uses of the thematic information stored in the output section:

1. Kernel Sentence Generation
2. Topic Extraction
3. Content Extraction

Kernel Sentence Generation

A sentence can be said to have a main point, or kernel, that embodies the major pieces of information that the writer is communicating to the reader. The kernel is generally a subset of the sentence with additional supporting detail mostly enforcing the main point. Much of the supporting information can be removed without detracting from either the logical truth of the sentence or the general understanding of the point being communicated. The grammar, style and theme of the sentence are used to make the determination of which words can be removed without violating either of the above guidelines. In addition, there is often not a single but a number of reductions that can be made, each moving towards the main kernel in small steps, the last step being the most tersely worded kernel sentence.

To generate these kernel sentences, certain thematic output settings will be checked, and certain low-content, grammatically neutral words removed. The correct thematic assessments are checked to give the desired kernel reduction level. Each of the following tags will be checked against each word in the sentence. Any word that has been thematically tagged with any of the assessments listed here will be removed from the sentence. The words that are left will form the new, reduced sentence.

Levels of Reduction

When a new sentence is generated, thematically-tagged functionality is removed, as opposed to reducing thematic aspects until a certain percent of the sentence remains. Four reduction levels are sufficient to represent summarized forms of sentences. Any more and the noticeable differences between levels becomes insignificant. The individual thematic contextual elements that are tested at each level should also be tested in the order given. If they are not, the reductions may vary. For example, some theme assessments look for 'stranded' clauses, where the prior word removals have caused a clause to be stranded from the main clause. In this case, it should be tested after most other tests, or it may be stranded after the test is made. Some of these routines are using the run-time theme assessments, since they cannot be tested in isolation. The four reduction levels are:

1. Contextual Reduction
2. Base Thematic Reduction
3. Secondary Thematic Reduction
4. Headline Thematic Reduction Contextual Reduction Contextual reduction is a different type of reduction from the three thematic reductions. Thematic reductions function hierarchically, with each reduction level having potentially more information removed than did the previous reduction level. The contextual reduction may be smaller or larger than any of the thematic reductions, depending on the writing style of the sentence. From the original sentence, the following thematic contextual elements are tested and, if present, the corresponding words are removed from the sentence in this reduction type.

QuoteSource
ThatClauseAdj
TopicalClause
TrashStraySubj
OrphanAdjectivalClause
CryptoAdjClause
PrepPhrases
CryptoPrepPhrase
ThanPrepPhrase
PrepPrep
UselessPrepPhrase
AdverbInit
OrphanPp
AdverbialBetweenCommas
WeakSubjComp
ElliptedPassive
Adverbs
TopicalizerPhrase
TimeObject
PossProSubj
AdjDeterminer_b
DemonstrativeSubject
WhElement
ComparativeInSubjComp
MoreThan
WeakAdj
AdvInNp
DemonstrativeModifier
AgoAdverbial
PersonalRef
BogusSubject
StrayAdj
TimeSubject
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Factive
HaveTo
HedgingWd
AttitudeAdv
ConcessiveAdv
OnBeforeTime
TirneAdj
ApproxPrep
ReflexivePrn
UniversalPm
EmptyVerb
WhileSubordinator
TimeTime
Determiner_d
Adverb SplitInfin
NounTimeAdverbial
AdjSubjComp
Compromiser
CorrelConj
McIntroConj
PronounSubjPassive
FinalPrep
MannerAdverb
ModDetAdv
ComparativeInSubject
AdverbEndMc CryptoAdv
WeakPrepSeq
HedgingVerb
VerbInit
TimeInSubjNp
Wordy Base Thematic Reduction This is the first of three hierarchical reductions for a sentence. It is intended that the resulting new sentence is both grammatical and logically correct. It should also be relatively easy to read. The following thematic contextual elements in the original sentence are tested and, if present, the cooresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdj Clause
StrayAdverbial
PseudoMcBreak
CommentInit
ObjectAfterPp
StrandedInfinClause
StrandedNounClause
StrandedNounPhrase
WeakEquation
SubjectSplice
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
StrayAdj
StrayAdverbial
CorrelConj Secondary Thematic Reduction This is the second of three hierarchical reductions for a sentence. It is intended that the resulting new sentence is both grammatical and logically correct. It removes additional information that begins to send the new sentence into a headline mode, but not quite as terse. The following thematic contextual elements in the original sentence are tested and, if present, the cooresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject
CryptoClause
WhElement
ComparativeinSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrasbMc
Semicolons
TrashWholeSent StrayAdj
StrayAdverbial
CorrelConj

Headline Thematic Reduction

This is the last of three hierarchical reductions for a sentence. The new sentence is now reduced to a headline-style sentence, that is not necessarily grammatical nor logically correct. The following thematic contextual elements in the original sentence are tested and, if present, the cooresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDetermiiner_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Detenniner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq HedgingVerb
VerbInit
TimeInSubjNp
Wordy
SweepNpTrash
VerbAtEnd
TrashMc
Semicolons
TrashWholeSent
LowAdverbialClauses
WeakPrepPhrase
NegativePrnSubj
WhNounClause
BeVp
NegativeAdj
WhAdjClause
MoreAdverbial
SweepNpTrash
UselessAdj
OrphanAdv
UselessPrnSubject
UselessPrnObj
TimeAdvInVp
StrayAdverbial As a final stage of processing in the kernel generation section, the punctuation for the sentence is rewritten in order to best reflect the new sentence structure.

Topic Extraction

After the new kernel sentences have been generated, five topic extraction routines will be generated. They locate the main, new topic in the sentence, extract its supporting context, and place the result in one or more of the five topic extraction areas. The five topic extraction areas are:

1. Main Thematic Topic Group
2. Main Thematic Topic
3. Secondary Thematic Topic
4. Main Developed Topic
5. Main Proximity-Developed Topic Main Thematic Topic Group This topic extraction routine looks for the main topic in the sentence, along with its most important supporting context. If the main topic has already been developed, it looks for a secondary topic. If there is not a suitable secondary topic, or if the secondary topic has also already been developed, then the original main topic is selected. There are three processing phases used in establishing the main topic. First, certain thematic assessments are checked, and any associated words removed if they contain the tested assessments. These tests are:

QuoteSource
ThatClauseAdj
TopicalClause
AdverbInit
CommentInit
Appositive
WeakSubjComp Second, the main topic is extracted from the sentence elements that remain after the previous reductions:
SaveTopic Last, contextual elements of specific types are removed from the main topic:

PrepPrep
PrepPhrases
UselessPrepPhrase
SweepNpTrash
WeakAdj
PureCoordConj
UniversalPrn
ConjInNp
Transition
Factive
StrayAdj
DemonsAdj
DemonstrativeModifier
AdverbAfterVerb
AdvInNp
Compromiser
FocusAdv The result is now placed in the main topic extraction output area.

Main Thematic Topic

The main thematic topic is an extended classification of the previous thematic group. If the topic group is located in the actual 'thematic topic' position of the sentence, and not in a secondary focus position, then the main topic group is copied to this output area. This identifies the topic group not only as the main thematic topic of the sentence, but also indicates that it was in the strongest thematic position within the sentence.

Secondary Thematic Topic

The main thematic topic is copied to this output area, and any non-critical supporting information is removed. This moves the topic to just its main head, if possible. This is determined by checking the theme assessments for a 'strong noun' classification. If the topic's head noun is classified as a strong noun, then the supporting information is removed. Otherwise, it stays at this level. If there is nothing in the main thematic topic output area, this output area will also be empty.

Main Developed Topic

This output area copies the main thematic topic into it as long as the main thematic topic head has been a main thematic topic head within the last 20 topics. This indicates that this main topic is one that is not only prominent in the sentence, but also in the discourse at this point.

Main Proximity-Developed Topic

Whenever a main developed topic appears for a second time with a user specified range of text, it is output to the main proximity-developed topic. This output indicates that it is not only a main focal point within the document, but is being reinforced through the writing.

Content Extraction

The final phase of thematic output processing is to identify certain major thematic points in a sentence. This is a superset of the detailed thematic elements, being those that are notably important for turning free form text into structured database fields. The following outputs are produced:

Thematic Head Words
Proper Names
Descriptions
Named Topics
Topic Indicators
Definitions
Developed Proper Names Thematic Head Words This output indicates that the identified word locations is a main focul point for a strong noun phrase. A strong noun phrase can either be a strong noun head or a noun head with strong support. Only the actual head word is specifically identified. Certain words that were initially flagged as strong or strong with support are removed from this list. The logic for this output is as follows:

+noun and
−pronoun and
(+strong noun or+strong support or+knowledgebase concept or
(+gerund and simple subject)) and
−time noun and
−numbers and
−digits and
(+knowledgebase concept or
not((+gerund or participle) and
(−simple subject or -verb phrase))) and
−pro verb and
−perfective verb If this condition is evaluated as true, then the word position is output to this area. Additionally, any adverbs that are marked as topicalizers are also flagged in this area. An example of these words is:

linguistically
aerodynamically

Proper Names

In this output area all of the proper names and places in the sentence are stored. Time nouns are excluded.

Descriptions

The 'description' output specifically identifies every set of noun plus descriptor. These appear as an appositive. Both sides of the description are stored. They must be able to express an equation of 'term1 is a term2'. An example of such a sentence that would generate these conditions is:

John Smith, a market analyst at Big Company, said . . .
This sentence will generate:
Term1 (John Smith) isa Term2(market analysts)

Named Topics

This output area indicates topics that are specifically named in the context of a sentence. An example is:

This is a story about bears.
'Bears' is assigned to this output area.

Topic Indicators

This output area contains all strong orienter words. These are words that indicate a field of study or industry, such as:

computer software
prime interest rate
terrorist abduction

These words indicate the highest possible thematic significance in sentences.

Definitions

This output stores words that are defined in the context of the sentence with a 'be' verb relationship. An example of such a sentence is:

A bear is an animal that lives in the forest.
This would generate two terms with an 'isa' relationship:
Term1(bears) isa Term2(animals)

Developed Proper Names

This output indicates each proper name identified in 'Proper Names' above that mentioned more than one time within a user specified length of text.

COMPUTER SYSTEM

Figure 8:
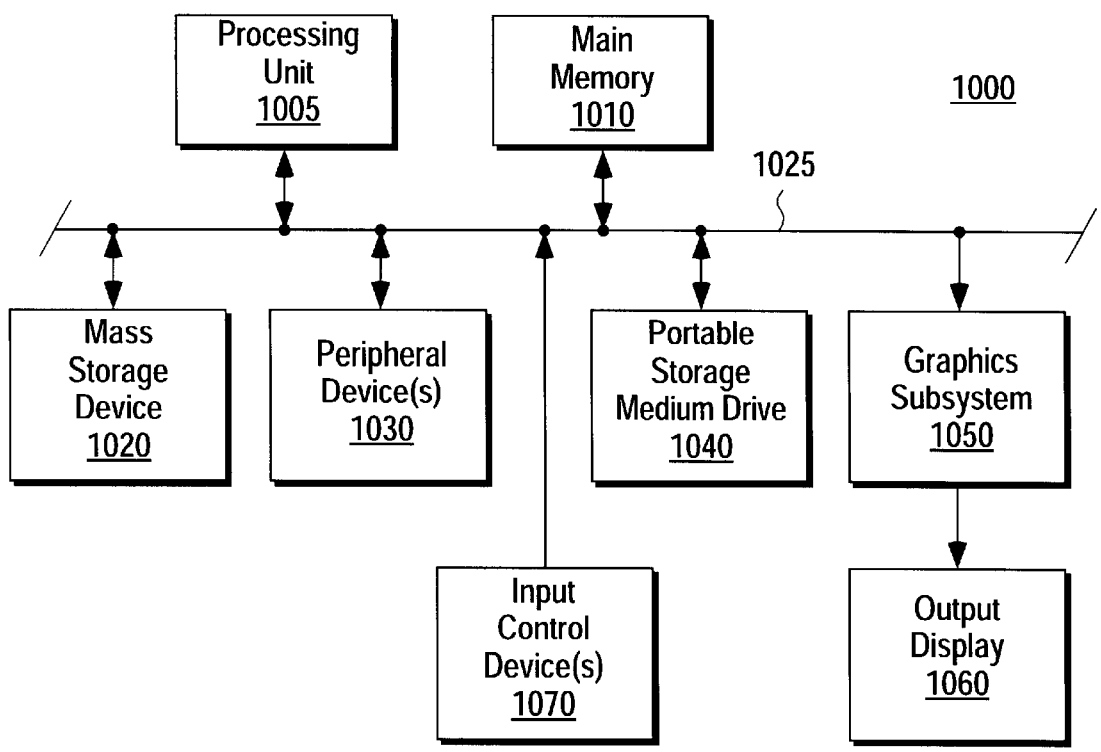
FIG. 8 illustrates a high level block diagram of a general purpose computer system in which the knowledge classification system of the present invention may be implemented.

FIG. 8 illustrates a high level block diagram of a general purpose computer system in which the knowledge classification system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the knowledge classification system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the knowledge classification system software embodiment for loading to the main memory 1010.

The portable storage medium drive 1040 operates in conjunction with a portable non-volatile storage medium, such as a floppy disk, a magnetic tape drive, or a compact disc read only memory (CD-ROM), to input and output data and code to and from the computer system 1000. In one embodiment, the knowledge classification system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input word/terminology may be input to the computer system 1000 via a portable storage medium or a network for processing by the knowledge classification system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for automated classification of information in a computer system, said method comprising the steps of:

storing, in memory of a computer system, a knowledge catalog comprising a plurality of independent ontologies, wherein an independent ontology comprises a plurality of related categories arranged hierarchically in at least one parent-child relationship;

processing documents, which comprise at least two topics, input to said computer system by referencing categories from at least two different independent ontologies in said memory that relate to said topics; and generating a classification for said documents by cross referencing said categories referenced from said different ontologies to create a classification hierarchy that comprises said two different independent ontologies, wherein cross referencing categories from different independent ontologies generates multiple permutations using different independent ontologies to create a detailed classification hierarchy that identifies a plurality of topics for said documents, while minimizing the number of categories stored as said knowledge catalog.

2. The method as set forth in claim 1, wherein the step of storing a knowledge catalog in memory comprises the step of storing a plurality of categories hierarchically such that child categories arranged under parent categories include both semantic and linguistic associations, wherein linguistic associations include associations between at least two concepts where a concept representing a child category is a type of a concept representing a parent category, and semantic associations include associations between at least two concepts, although generally associated together, a concept representing a child category is not a type of a concept representing a parent category.

3. A method for classifying terminology in a computer system, said method comprising the steps of:

storing, in memory of a computer system, a knowledge catalog comprising a plurality of categories arranged hierarchically, such that child categories associated with parent categories include both semantic and linguistic associations, wherein linguistic associations include associations between at least two concepts where a concept representing a child category is a type of a concept representing a parent category, and semantic associations include associations between at least two concepts where a concept representing a child category is not a type of a concept representing a parent category although said two concepts are generally associated together; and processing terminology in said computer system by classifying said terminology in a category related to said terminology, wherein classification of terminology in a hierarchy that includes both semantic and linguistic associations reflects real world relationships among terminology classified.

4. The method as set forth in claim 3, wherein the step of storing a knowledge catalog in memory comprises the step of storing a plurality of independent ontologies, wherein each ontology comprises a plurality of related categories.

5. The method as set forth in claim 3, wherein the step of storing a knowledge catalog in memory comprises the step of storing only high level categories in a static portion of said knowledge catalog, wherein high level categories represent concepts that remain relatively stable over time.

6. The method as set forth in claim 5, wherein the step of storing a knowledge catalog in memory comprises the step of storing, in memory, a dynamic portion, attached beneath said static portion, based on specific terminology being classified.

7. The method as set forth in claim 3, wherein the step of storing a knowledge catalog in memory further comprises the step of separating said knowledge catalog into concrete concepts and abstract concepts.

8. The method as set forth in claim 3, wherein the step of storing a knowledge catalog in memory comprises the step of storing categories that represent concepts independent of language and culture, such that said knowledge catalog provides a world view of knowledge.

9. A computer readable medium comprising a set of instructions stored therein, which when executed by a computer, causes the computer to perform the steps of:

storing, in memory of a computer system, a knowledge catalog comprising a plurality of categories arranged hierarchically, such that child categories associated with parent categories include both semantic and linguistic associations, wherein linguistic associations include associations between at least two concepts where a concept representing a child category is a type of a concept representing a parent category, and semantic associations include associations between at least two concepts where a concept representing a child category is not a type of a concept representing a parent category although said two concepts are generally associated together; and processing terminology in said computer system by classifying said terminology in a category of said knowledge catalog related to said terminology, wherein classification of terminology in a hierarchy that includes both semantic and linguistic associations reflects real world relationships among terminology classified.

10. The computer readable medium as set forth in claim 9, wherein instructions for storing a knowledge catalog comprise instructions for storing a plurality of independent ontologies, wherein each ontology comprises a plurality of related categories.

11. The computer readable medium as set forth in claim 9, wherein instructions for storing a knowledge catalog comprise instructions for storing only high level categories in a static portion of said knowledge catalog, wherein high level categories represent concepts that remain relatively stable over time.

12. The computer readable medium as set forth in claim 11, wherein instructions for storing a knowledge catalog comprise instructions for storing, in memory, a dynamic portion, attached beneath said static portion, based on specific terminology being classified.

13. The computer readable medium as set forth in claim 9, wherein instructions for storing a knowledge catalog comprise instructions for separating said knowledge catalog into concrete concepts and abstract concepts.

14. The computer readable medium as set forth in claim 9, wherein instructions for storing a knowledge catalog comprise instructions for storing categories that represent concepts independent of language and culture, such that said knowledge catalog provides a world view of knowledge.

* * * * *